United States Patent
Kim et al.

(10) Patent No.: US 12,407,475 B2
(45) Date of Patent: Sep. 2, 2025

(54) METHOD FOR TRANSMITTING AND RECEIVING DATA IN WIRELESS COMMUNICATION SYSTEM, AND WIRELESS COMMUNICATION TERMINAL

(71) Applicant: WILUS INSTITUTE OF STANDARDS AND TECHNOLOGY INC., Gyeonggi-do (KR)

(72) Inventors: Sanghyun Kim, Seoul (KR); Juhyung Son, Gyeonggi-do (KR); Geonjung Ko, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 265 days.

(21) Appl. No.: 17/801,235

(22) PCT Filed: Feb. 22, 2021

(86) PCT No.: PCT/KR2021/002220
§ 371 (c)(1),
(2) Date: Aug. 19, 2022

(87) PCT Pub. No.: WO2021/167436
PCT Pub. Date: Aug. 26, 2021

(65) Prior Publication Data
US 2023/0016370 A1 Jan. 19, 2023

(30) Foreign Application Priority Data

Feb. 20, 2020 (KR) .................. 10-2020-0021295
Mar. 17, 2020 (KR) .................. 10-2020-0032896

(Continued)

(51) Int. Cl.
*H04L 5/00* (2006.01)
*H04W 28/06* (2009.01)
*H04W 84/12* (2009.01)

(52) U.S. Cl.
CPC .......... *H04L 5/0053* (2013.01); *H04L 5/0007* (2013.01); *H04W 28/06* (2013.01); *H04W 84/12* (2013.01)

(58) Field of Classification Search
CPC . H04W 28/06; H04W 84/12; H04W 74/0816; H04W 76/15; H04L 5/0007;
(Continued)

(56) References Cited

U.S. PATENT DOCUMENTS 10,939,476 B1 * 3/2021 Chu .................. H04W 76/15
2020/0015271 A1 1/2020 Lee et al.
(Continued)

FOREIGN PATENT DOCUMENTS

CA 3164330 A1 * 7/2021 ........... H04L 5/0037
CN 113132072 A * 7/2021 ............ H04L 5/001
(Continued)

OTHER PUBLICATIONS

International Search Report for PCT/KR2021/002220 mailed on Jun. 28, 2021 and its English translation from WIPO (now published as WO 2021/167436).
(Continued)

*Primary Examiner* — Ayaz R Sheikh
*Assistant Examiner* — Louis Samara
(74) *Attorney, Agent, or Firm* — WOMBLE BOND DICKINSON (US) LLP

(57) ABSTRACT

Disclosed is a method for transmitting and receiving a physical protocol data unit (PPDU) in a wireless communication system. A terminal receives a preamble of the PPDU from an access point (AP). The preamble includes a
(Continued)

(a) 11be MU/SU PPDU (b) 11be TB PPDU (c) 11ax HE PPDU universal signal (U-SIG) field and an extremely high throughput (EHT)-SIG field, wherein the EHT-SIG field may be configured with at least one content channel on a frequency axis. Here, the number of the at least one content channel may be recognized on the basis of the U-SIG field. Subsequently, the terminal receives data of the PPDU on the basis of the U-SIG field and the EHT-SIG field.

16 Claims, 40 Drawing Sheets

(30) Foreign Application Priority Data

Mar. 20, 2020 (KR) .................. 10-2020-0034717
Apr. 3, 2020 (KR) .................. 10-2020-0040707

(58) Field of Classification Search
CPC . H04L 5/0094; H04L 5/0053; H04L 27/2602; H04L 5/0051
See application file for complete search history.

(56) References Cited

U.S. PATENT DOCUMENTS

| | | |
|---|---|---|
| 2020/0029236 A1 | 1/2020 | Segev et al. |
| 2020/0052832 A1 | 2/2020 | Tian et al. |
| 2020/0228380 A1* | 7/2020 | Yang ............... H04L 5/0039 |
| 2021/0045151 A1* | 2/2021 | Chen ............... H04L 27/2602 |
| 2021/0258115 A1 | 8/2021 | Liu et al. |
| 2022/0345276 A1* | 10/2022 | Redlich ............ H04L 5/0053 |
| 2023/0239071 A1* | 7/2023 | Lim ................. H04L 5/0051 370/329 |
| 2023/0354451 A1* | 11/2023 | Jang ............... H04W 74/0816 |

FOREIGN PATENT DOCUMENTS

| | | | |
|---|---|---|---|
| WO | 2019/240441 | 12/2019 | |
| WO | WO-2019240441 A1 * | 12/2019 | ......... H04L 27/2613 |

OTHER PUBLICATIONS

Written Opinion of the International Searching Authority for PCT/KR2021/002220 mailed on Jun. 28, 2021 and its English translation by Google Translate (now published as WO 2021/167436).
Lei et al.: "Discussion on EHT PPDU Formats", IEEE 802.11-20/0031r2, Jan. 16, 2020, slides 1-11.

* cited by examiner (a) 11be MU/SU PPDU (b) 11be TB PPDU (c) 11ax HE PPDU

FIG.18

(a) Virtual Primary channel of non-P80 Segment (b) Virtual Primary per STA parked in non-P80 Segment

METHOD FOR TRANSMITTING AND RECEIVING DATA IN WIRELESS COMMUNICATION SYSTEM, AND WIRELESS COMMUNICATION TERMINAL

CROSS-REFERENCE TO RELATED APPLICATIONS

This application is the U.S. National Stage of International Patent Application No. PCT/KR2021/002220 filed on Feb. 22, 2021, which claims the priority to Korean Patent Application No. 10-2020-0021295 filed in the Korean Intellectual Office on Feb. 20, 2020, Korean Patent Application No. 10-2020-0032896 filed in the Korean Intellectual Office on Mar. 17, 2020, Korean Patent Application No. 10-2020-0034717 filed in the Korean Intellectual Office on Mar. 20, 2020, and Korean Patent Application No. 10-2020-0040707 filed in the Korean Intellectual Office on Apr. 3, 2020, the entire contents of which are incorporated herein by reference.

TECHNICAL FIELD

The present disclosure relates to a wireless communication system and, more particularly, to a method and device for transmitting information for allocation of a channel for data transmission or reception in a wireless communication system.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz hand which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high hit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An aspect of the present invention is to provide a high-speed wireless LAN service for a new multimedia application, as described above.

An aspect of the present disclosure is to provide a method and a device for allocating a resource unit (RU) to a user equipment, for transmission of a physical protocol data unit (PPDU).

An aspect of the present invention is to provide a data format for providing information for a terminal to recognize discontinuously allocated resources when resources are allocated to a plurality of terminals.

Technical tasks to be achieved in the specification are not limited to the technical tasks mentioned above, and other technical tasks that are not mentioned may be clearly understood by those skilled in the art on the basis of the following descriptions.

Solution to Problem

In a method for receiving data by a terminal in a wireless communication system, the terminal includes a communication module, and a processor configured to control the communication module, wherein the processor: receives a preamble of a physical protocol data unit (PPDU) from an access point (AP), wherein the preamble includes a universal signal (U-SIG) field and an extremely high throughput (EHT)-SIG field, the EHT-SIG field includes at least one content channel on a frequency axis, and the number of the at least one content channel is recognized based on the U-SIG field; and receives data of the PPDU, based on the U-SIG field and the EHT-SIG field.

In the present disclosure, when orthogonal frequency division multiple access (OFDMA) is applied, the number of the at least one content channel is two.

In the present disclosure, the U-SIG field includes an uplink (UL)/downlink (DL) field indicating whether the PPDU is an uplink PPDU or a downlink PPDU, and a type field indicating a type of the PPDU.

In the present disclosure, the EHT-SIG field includes a resource unit (RU) allocation field indicating an RU allocated for transmission of the PPDU, based on a combination of the UL/DL field and the type field.

In the present disclosure, based on the combination of the UL/DL field and the type field, if the PPDU is a format to which downlink OFDMA is applied, the EHT-SIG field includes the RU allocation field, and based on the combination of the UL/DL field and the type field, if the PPDU is a format for transmission to a single user or a format to which a full-band multi-user (MU)-multi input multi output (MIMO) is applied, i.e., a format to which OFDMA is not applied, the EHT-SIG field does not include the RU allocation field.

In the present disclosure, a total bandwidth in which the PPDU is transmitted includes multiple segments, and the RU allocation field is recognized according to a center frequency of a segment, in which the PPDU is transmitted, from among the multiple segments.

In the present disclosure, a total bandwidth in which the PPDU is transmitted includes multiple segments, and if the terminal receives the PPDU in a segment, which does not include a primary channel, from among the multiple segments, the preamble is received through a preconfigured 20 MHz channel of a segment in which the PPDU is received.

In the present disclosure, field configurations between content channels having the same index from among multiple content channels transmitted in the same segment among the multiple segments are the same, and field configurations between content channels having the same index from among multiple content channels transmitted in respective different segments among the multiple segments are different from each other.

In the present disclosure, if the PPDU is included in an aggregated PPDU (A-PPDU) in which multiple PPDUs are combined, the A-PPDU includes PPDUs having different formats.

The present disclosure provides a method including: receiving a preamble of a physical protocol data unit (PPDU) from an access point (AP), wherein the preamble includes a universal signal (U-SIG) field and an extremely high throughput (EHT)-SIG field, the EHT-SIG field includes at least one content channel on a frequency axis, and the number of the at least one content channel is recognized based on the U-SIG field; and receiving data of the PPDU, based on the U-SIG field and the EHT-SIG field.

Advantageous Effects of Invention

According to an embodiment of the present invention, discontinuous channel allocation information can be efficiently signaled.

According to an embodiment of the present invention, by notifying a terminal of information for recognition of discontinuously allocated resources, the terminal can efficiently recognize the allocated resources so as to receive data.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 18 illustrates the construct of RUs and a method of allocating constructed RUs to a terminal through an RU allocation field according to an embodiment of the present disclosure;

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
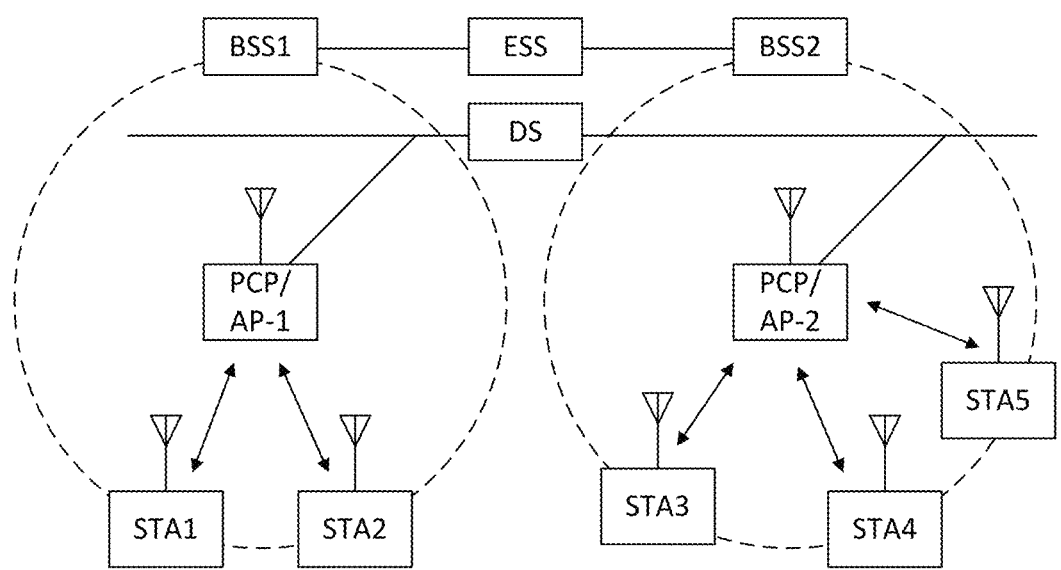
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
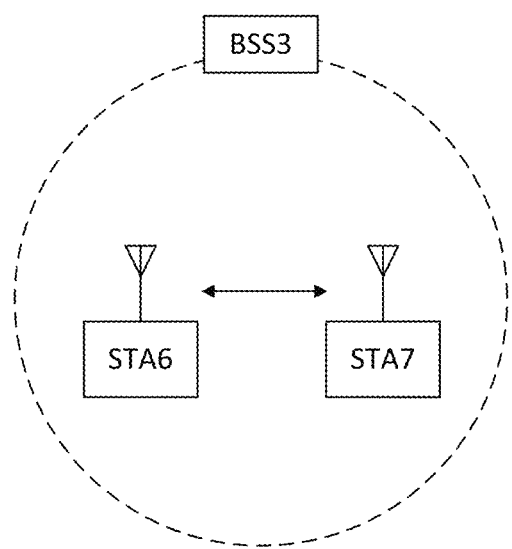
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
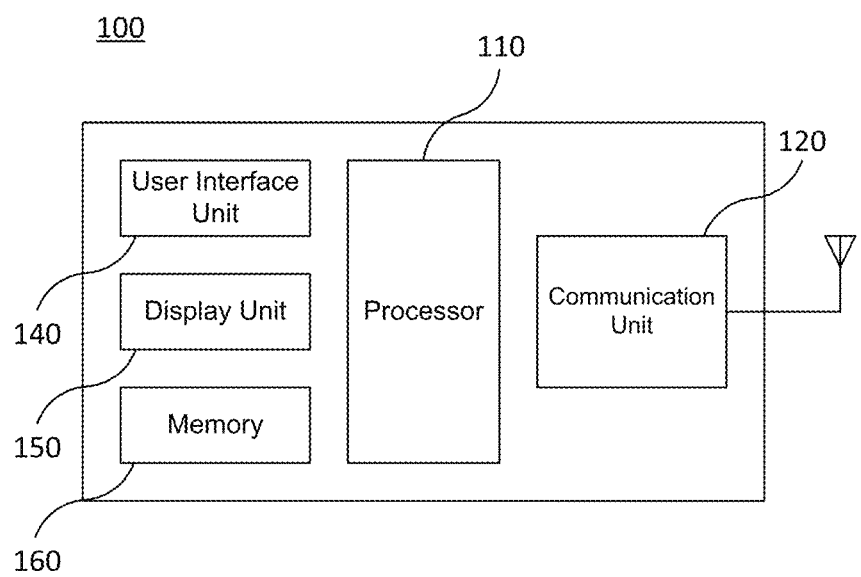
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
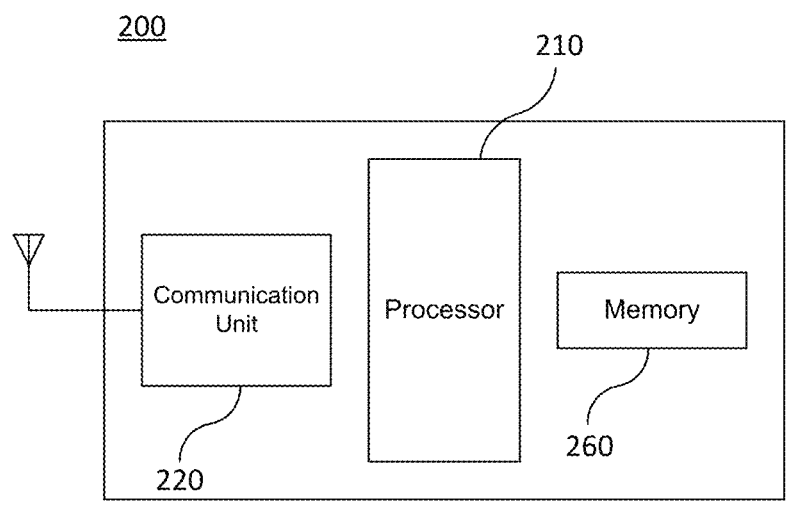
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
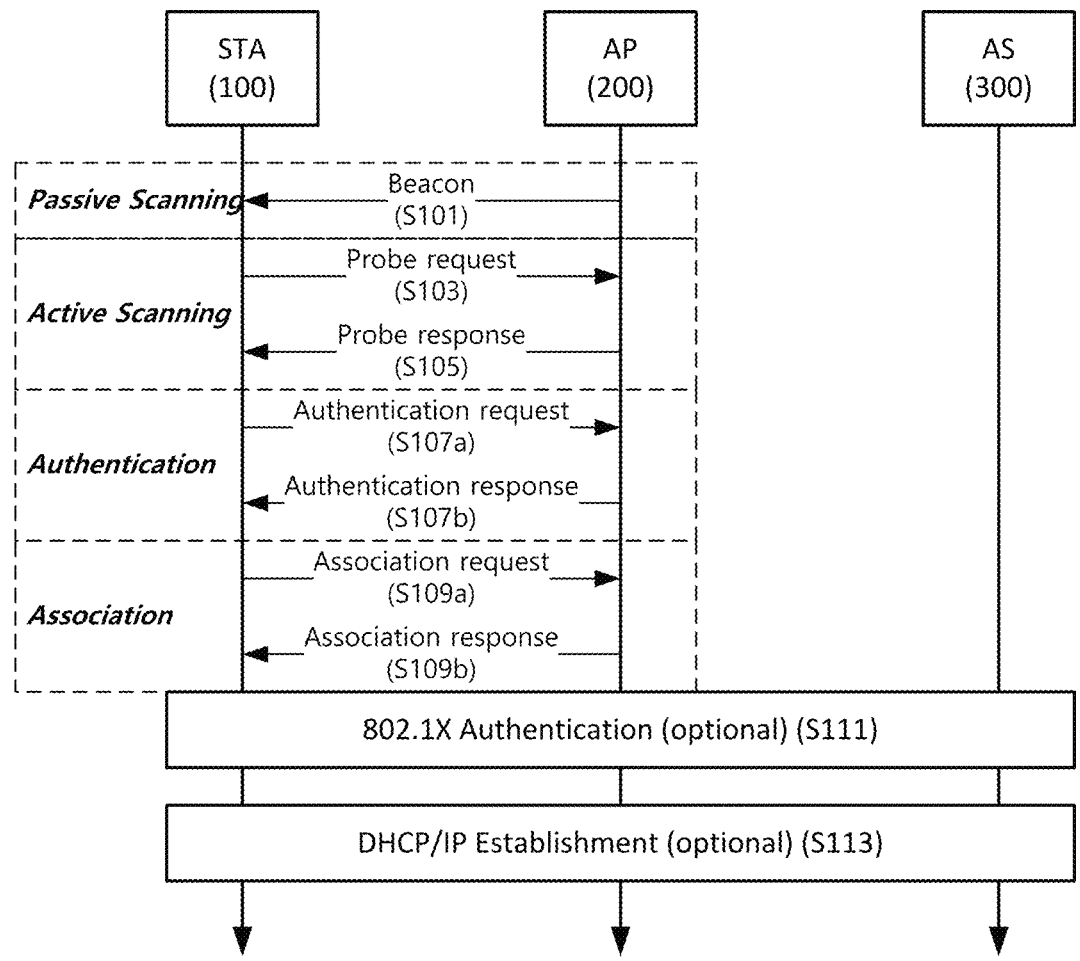
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
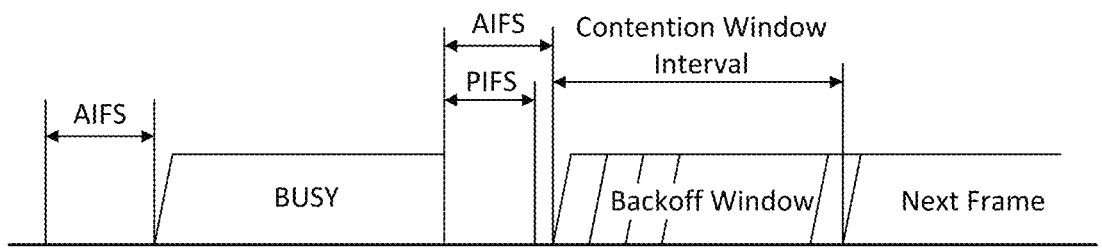
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, in the present disclosure, a UE may be referred to as a non-AP STA, an AP STA, an STA, a reception device, or a transmission device, and the present disclosure is not limited thereto.

<Examples of Various PPDU Formats>

Figure 7:
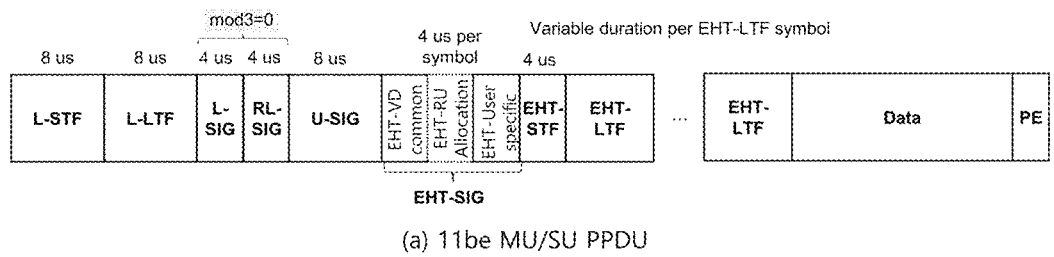
FIG. 7 illustrates a PPDU format of an extremely high throughput (EHT) Wireless LAN according to an embodiment of the present disclosure.
Figure 7:
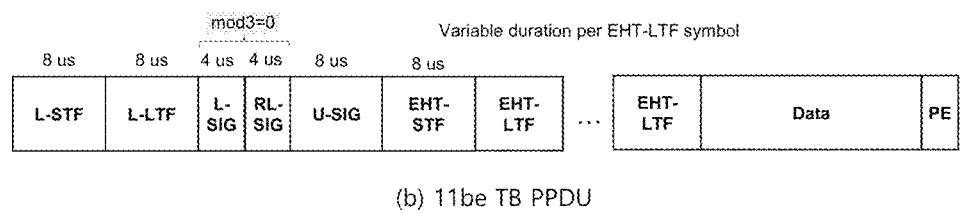
Figure 7:
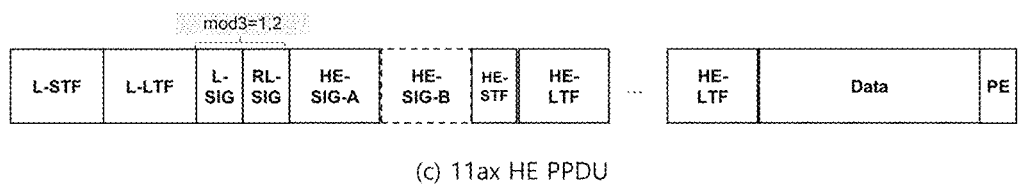

FIG. 7 illustrates a PPDU format of an extremely high throughput (EHT) Wireless LAN according to an embodiment of the present disclosure.

In FIG. 7, (a) illustrates an example of a single/multi-user transmission PPDU format, and (b) illustrates an example of a trigger-based (TB) PPDU format. (c) of FIG. 7 illustrates an example of a high efficient (HE) PPDU format in Wi-Fi 802.11ax which is a previous generation.

As illustrated in (a) to (c) of FIG. 7, a PPDU is divided into a preamble and a data part, and the preamble may commonly include a legacy short training field (L STF), a legacy long training field (L-LTF), a legacy signal field (L-SIG), and a repeated legacy signal field (RL-SIG), which are legacy fields for backwards compatibility.

These legacy fields may be included not only in an EHT PPDU used in 802.11be but also in a preamble of an HE PPDU of 802.11ax of a previous version, as illustrated in (a) to (c) of FIG. 7.

Referring to (a) and (b) of FIG. 7, an 11be MU/SU PPDU and an 11be TB PPDU, which are EHT PPDUs, may further include a universal signal field (U-SIG) in addition to the legacy fields described above, and the SU/MU PPDU may further include an EHT-SIG field as illustrated in (a) of FIG. 7.

The U-SIG field is a field newly introduced in 11be that is an extremely high throughput communication standard, and is a field to be commonly included in a subsequent generation 802.11 standard PPDU including 11be. The U-SIG field may be contiguously included in an EHT PPDU and a wireless LAN PPDU of the subsequent generation, and includes 11be so as to serve to classify a generation of the PPDU. The U-SIG field is a 64 FFT-based OFDM 2 symbol and may transfer a total of 52 bits of information. Interpretation of some fields in the U-SIG field may vary depending on a PPDU type, whether multi-user transmission is performed, and whether OFDMA transmission is performed.

The EHT-SIG field may functionally include an EHT-VD common field, an EHT-resource unit (RU) allocation subfield, and an EHT-user specific field, and interpretation of some fields may vary or some fields may be omitted depending on a PPDU type, whether multi-user transmission is performed, and whether OFDMA transmission is performed.

In this case, the EHT-VD common field and the EHT-RU allocation field may be combined so as to be referred to as an EHT-common field. A configuration and modification (compression or omission) type of the EHT-SIG field will be described in detail via examples below. The EHT-RU allocation field may be referred to as an RU allocation field.

The TB PPDU illustrated in (b) of FIG. 7 is a trigger-based PPDU and refers to a PPDU based on a trigger frame. That is, the PPDU illustrated in (b) of FIG. 7 is a PPDU transmitted in response to a trigger frame, and a preamble includes only a U-SIG field after a legacy field and does not include an EHT-SIG field. Therefore, unlike the MU/SU PPDU in (a) of FIG. 7, the U-SIG does not include information for decoding of an EHT-SIG, and may include spatial reuse information, puncturing mode information for indicating a puncturing mode or whether to perform puncturing, and the like.

Referring to (a) to (c) of FIG. 7, a UE may first receive and decode a preamble of a PPDU, and may receive data on the basis of the preamble. For example, the UE may recognize whether a type of the PPDU received via a U-SIG field included in the preamble is an SU/MU PPDU, and may recognize the number of content channels constituting an EHT-SIG field. Then, the UE may decode the recognized EHT-SIG field and recognize RUs allocated via an RU allocation subfield so as to receive data in the recognized RUs.

Figure 8:
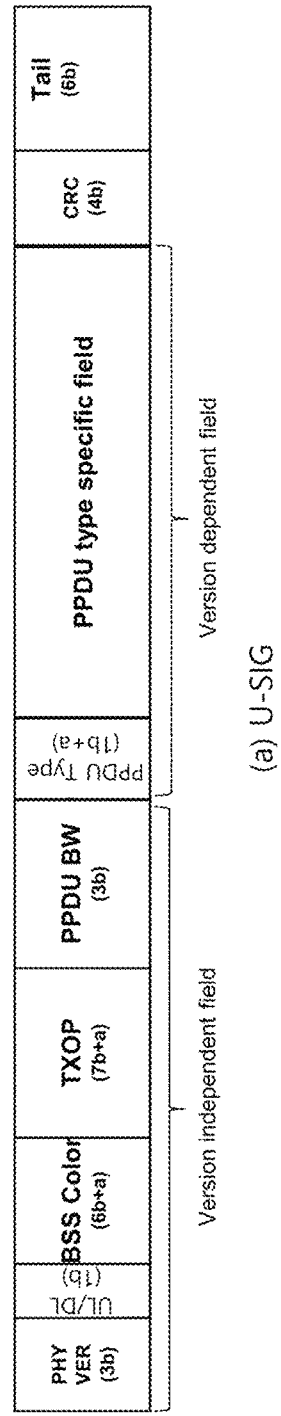
FIG. 8 illustrates a U-SIG field of an EHT PPDU according to an embodiment of the present disclosure.

FIG. 8 illustrates a U-SIG field of an EHT PPDU according to an embodiment of the present disclosure.

A U-SIG field is a field commonly included regardless of a type of an 802.11be EHT PPDU, and includes common information for reception of a PPDU.

Specifically, as illustrated in FIG. 8, the U-SIG field may include 52 bits, and among the 52 bits, 43 bits except for CRC/Tail 9 bits are largely divided into a version independent (VI) field and a version dependent (VD) field. In this case, if information that needs to be provided by the VD field is not included due to limitation of the number of bits, the information may be transmitted while being included in an EHT-SIG field.

The VI field enables a current bit configuration to be maintained even in the future, so that even if a PPDU of a subsequent generation is defined, current 11be terminals may obtain information on the PPDU via VI fields of the PPDU. To this end, the VI field may include a version identifier field, a UL/DL field, a TXOP field, a BSS color field, and a PPDU bandwidth (BW) field.

The version identifier field serves to classify 11be and subsequent generation wireless LAN standards. For example, in a case of 11be, a value of the version identifier field may be configured to 000b.

The UL/DL field indicates whether the PPDU is an uplink/downlink PPDU, and the TXOP field refers to a transmit opportunity duration transferred in a MAC header. By adding the TXOP field to a PHY header, the PPDU may serve to infer a length of the TXOP included therein without having to decode an MPDU and 7 bits or more may be allocated.

The BSS color field refers to an identifier for identifying a BSS defined in 11ax, and has a value of 6 bits or more. The PPDU BW field may refer to a BW occupied by the PPDU, and the bandwidth indicated by the PPDW BW may be a bandwidth before preamble puncturing is applied. 3 or more bits may be allocated to the PPDU BW field. For example, when the PPDU BW field includes 3 bits, the bandwidths as shown in Table 1 below may be indicated according to bit values.

TABLE 1

| Bit value (PPDU BW field) | Bandwidth |
| --- | --- |
| 000 | 20 MHz |
| 001 | 40 MHz |
| 010 | 80 MHz |
| 011 | 160 MHz (80 + 80) |
| 100 | 240 MHz (160 + 80 or 80 + 160) |
| 101 | 320 MHz (160 + 160) |
| 110 | Reserved |
| 111 | |

In Table 1, "110" and "111" may be used in a later version, and may be used to indicate the bandwidth if the bandwidth is 320 MHz or higher. In addition, "110" and "111" may be used in combination with a part of the VD field in order to indicate a bandwidth in the later version.

When 4 or more bits are allocated to the PPDU BW field, a discontiguous channel type for a channel of a bandwidth, in which the PPDU is transmitted, is additionally indicated while the bandwidths of Table 1 is being indicated. That is, for the bandwidth in which the PPDU is transmitted, when some channels (or bandwidths) are excluded for reasons, such as puncturing or allocation to another UE, some discontiguous channel types for the bandwidth may be indicated together with the total bandwidth via the PPDU BW field.

For example, when the PPDU BW indicates some discontiguous channel types, some BW (e.g., punctured primary 80 MHz if primary 80 MHz is punctured) puncturing type may be indicated within the PPDU BW, as shown in BW modes 4 to 7 of 802.11ax.

When the total bandwidth, in which the PPDU is transmitted, is divided into multiple segments, fields and field values constituting a U-SIG may be configured differently for the respective segments. That is, a field configuration and each field value constituting a U-SIG field transmitted in a segment including a primary channel and those constituting U-SIG fields transmitted in the other segments (e.g., in a case where the segments include primary 80 MHz and secondary 80 MHz, etc.) may be different.

For example, if the total bandwidth is 320 MHz and is divided into segments of 80 MHz or 160 MHz, the configuration of the U-SIG field transmitted in each 80 MHz or 160 MHz segment may be different. In this case, the PPDU BW field may indicate discontiguous types of channels for 80 MHz or 160 MHz, which are bandwidths corresponding to respective segments.

The VD field is a field that may be changed in a version subsequent to 802.11be, and may be changed during introduction of a new technology or improvement of signaling efficiency according to each version of Wi-Fi. The VD field included in the EHT PPDU of version 11be includes fields having different configurations according to the PPDU type, and includes a field for signaling the PPDU type.

Accordingly, the VD field may include a PPDU type field and a PPDU type specific field, the configuration and interpretation of which vary according to the PPDU type field. In this case, the PPDU type field may be located before or after the PPDU type specific field, or may be located between respective fields constituting the PPDU type specific field. Hereinafter, the present disclosure will be described based on an example in which the PPDU type field is located before the PPDU type specific field.

The PPDU type field may include 1 bit to distinguish an MU/SU PPDU from a TB PPDU or may include 2 or more bits to distinguish each of an MU PPDU, an SU PPDU, and a TB PPDU. Alternatively, the PPDU type field is configured to 1 bit, and by changing phase modulation applied to 2 symbols in which the U-SIG field is transmitted, a number of PPDU types may be individually indicated via the PPDU type field. In this case, with respect to the MU/SU/TB PPDU, a modulation scheme of binary phase shift keying (BPSK) may be applied to both symbols of each U-SIG, and with respect to an extended range (ER) PPDU, BPSK may be applied to a first symbol of a U-SIG and a modulation scheme of quadrature binary phase shift keying (QBPSK) may be applied to a second symbol of the U-SIG. In this case, determination on the ER PPDU may be indicated in the form of phase modulation, and whether the type of the transmitted PPDU is an MU/SU PPDU or a TB PPDU may be indicated through the PPDU type field.

Hereinafter, the present disclosure will be described based on that a PPDU type field includes 1 bit, but the present disclosure is not limited thereto.

Figure 9:
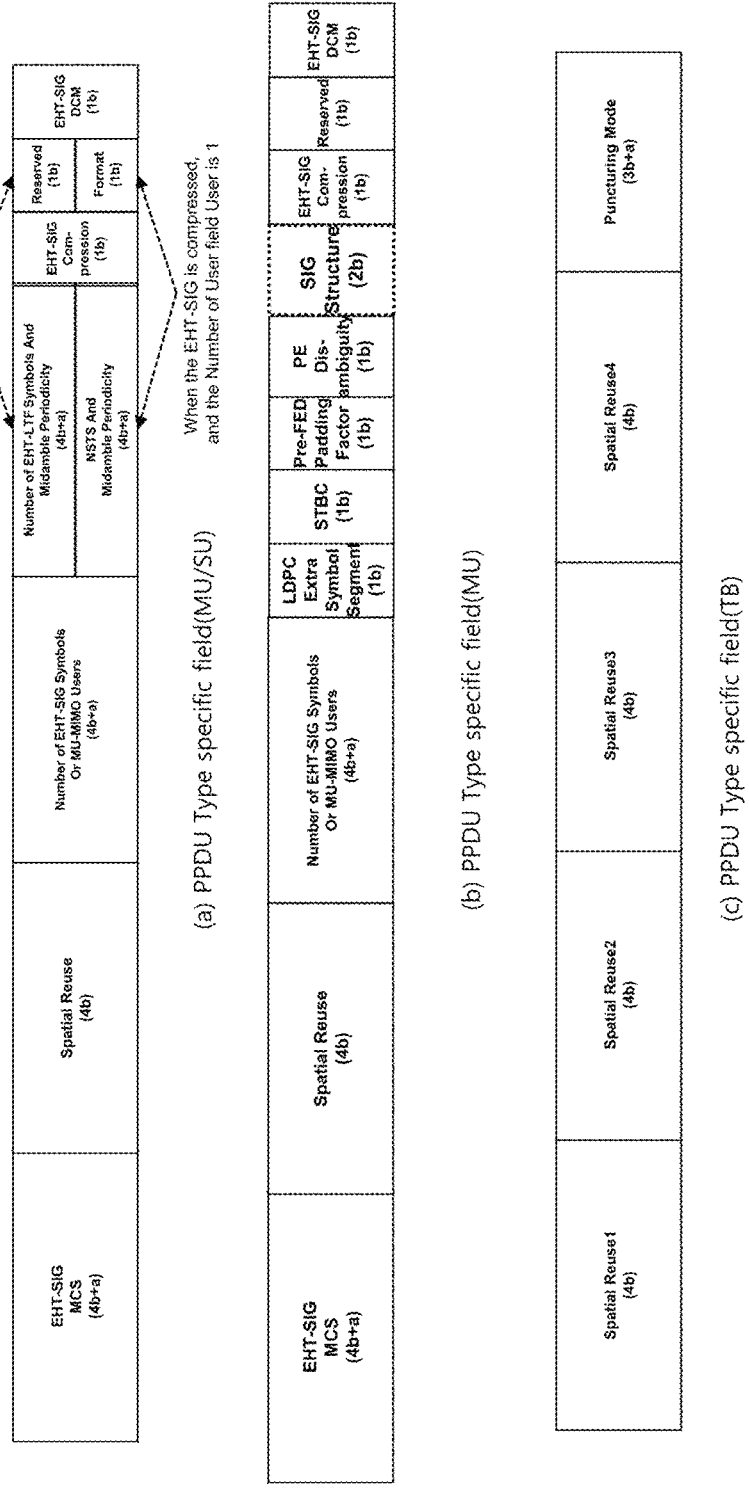
FIG. 9 illustrates a PPDU type-specific field of a U-SIG field according to an embodiment of the present disclosure.

FIG. 9 illustrates a PPDU type-specific field of a U-SIG field according to an embodiment of the present disclosure.

Referring to FIG. 9, in a PPDU type specific field included in a PPDU, configurations of included fields may vary according to a type of the PPDU. (a) of FIG. 9 shows a configuration of a PPDU type specific field when the PPDU is an MU/SU PPDU, and (b) shows a configuration of a PPDU type specific field when the PPDU is an MU PPDU. (c) of FIG. 9 shows a configuration of a PPDU type specific field when the PPDU is a TB PPDU.

As illustrated in (a) of FIG. 9, when a PPDU type field of a VD field indicates an MU/SU PPDU, an EHT-SIG modulation coding scheme (MCS) field of the PPDU type specific field indicates a modulation scheme applied to an EHT-SIG field located subsequent to a U-SIG, and 4 bits or more may be allocated. A spatial reuse field may be the same as the spatial reuse field of 802.11ax, or may be configured in an extended form corresponding to an extended PPDU bandwidth (e.g., 320 MHz if a bandwidth is 240 MHz) of EHT.

An EHT-SIG compression field may indicate whether an RU allocation field among fields included in the EHT-SIG field is compressed and omitted, and 1 bit or 2 bits may be allocated. When the EHT-SIG compression field indicates that the RU allocation field has been compressed, the EHT-SIG does not include the RU allocation field.

For example, when the EHT-SIG compression field is 1 bit, if a bit value is "0", the EHT-SIG compression field indicates that the RU allocation field has not been compressed so that the EHT-SIG field may include the RU allocation field, and if the bit value is "1", the EHT-SIG compression field indicates that the RU allocation field has been compressed and omitted so that the EHT-SIG field may include no RU allocation field. Alternatively, when the EHT-SIG compression field is 2 bits, bit values of the EHT-SIG compression field may be interpreted as shown in Table 2 below.

TABLE 2

| Bit value of EHT-SIG compression field | Description |
| --- | --- |
| 00 | No RU allocation field is compressed |
| 01 | Compression mode 1 |
| 10 | Compression mode 2 |
| 11 | reserved |

In the case of Table 2, if the bit value of the EHT-SIG compression field is "00", the EHT-SIG field may include the RU allocation field, and if the bit value is "01" or "10", the EHT-SIG field may include no RU allocation field.

The EHT-SIG compression field may indicate whether the PPDU is an OFDMA MU PPDU. Specifically, in a case of an OFDMA MU PPDU, RUs allocated to respective STAs may be different, and therefore an AP needs to indicate the RUs allocated to respective STAs or a combination of the RUs. Accordingly, in this case, the AP may transmit RU allocation fields by including the same in the EHT-SIG field, and the STAs may recognize the RUs allocated thereto or a combination form of the RUs via the received RU allocation fields. Therefore, in the OFDMA MU PPDU to which OFDMA MU is applied, the RU allocation field cannot be omitted, and the STA may recognize whether the received PPDU is an OFDMA MU PPDU, by identifying via the EHT-SIG compression field whether an EHT-SIG allocation field has been compressed.

Whether the RU allocation field has been compressed may be implicitly indicated using a combination of values shown in UL/DL and PPDU type fields instead of the EHT-SIG compression field. For example, if a transmission direction of the PPDU is indicated to be a downlink according to a DL/UL field, and a value of the PPDU type field is "0", this may implicitly indicate that the RU allocation field is compressed and is not included in the EHT-SIG field. Alternatively, if the transmission direction of the PPDU is indicated to be a downlink according to the DL/UL field, and the value of the PPDU type field is "1", this may implicitly indicate that the RU allocation field is not compressed and is included in the EHT-SIG field. In this case, for implicit EHT-SIG compression signaling, whether the RU allocation field is compressed may be signaled via whether phase modulation is performed, rather than by the PPDU type field, and specific other fields that are not used in DL transmission may also be used in the same manner.

That is, the RU allocation field may be implicitly indicated by a combination of the PPDU type field and/or the EHT-SIG compression field and the UL/DL field. Specifically, a type (or format) of the transmitted PPDU may be identified by a combination of the PPDU type field and/or the EHT-SIG compression field and the UL/DL field, and the RU allocation field may or may not be included in the EHT-SIG field according to the identified type (format). For example, a downlink PPDU may be identified by the UL/DL field, and a transmitted PPDU may be identified to a PPDU, to which OFDMA is applied, based on the EHT-SIG compression field or the PPDU Type field. In this case, since a UE may correctly receive a transmitted PPDU only when the UE knows an RU or a combination of RUs allocated thereto, EHT-RU allocation information for identification of the allocated RU or combination of RUs may be included in the EHT-SIG field. However, when no OFDMA is applied or in a case of full-band transmission, RU allocation information is not required for PPDU reception, so that the EHT-RU allocation information may be compressed and may not be included in the EHT-SIG field.

The number of content channels may be identified via the same method. That is, the number of content channels may be identified based on information included in the U-SIG field. Specifically, the type (or format) of the PPDU may be identified by a combination of the PPDU type field and/or the EHT-SIG compression field and the UL/DL field, and the number of content channels may be identified based on the identified PPDU type (or format).

For example, if the type (or format) of the PPDU is non-OFDMA transmission, to which OFDMA is not applied, based on the combination of the PPDU type field and/or the EHT-SIG compression field and the UL/DL field, the number of EHT-SIG content channels for transmission of the EHT-SIG field may be one. However, based on the combination of the PPDU type field and/or the EHT-SIG compression field and the UL/DL field, if the type (or format) of the PPDU is OFDMA transmission to which OFDMA is applied or is non-OFDMA transmission to which OFDMA is not applied but the PPDU is transmitted to multiple users (e.g., multi user), there may be two content channels for transmission of the EHT-SIG field.

In a Number Of EHT-SIG Symbols Or MU-MIMO Users field, four or more bits are allocated, and a length of an EHT-user specific field may be signaled so as to assist decoding of the EHT-user specific field. This field refers to the number of MU-MIMO users when a value of the EHT-SIG compression field is not 0 (compressed), and may refer to the number of symbols constituting the EHT-SIG field when the value is 0 (non-compressed). At this time, if the value of the Number Of EHT-SIG Symbols Or MU-MIMO Users field indicates that there is one MU-MIMO user, the corresponding PPDU may be indicated to be an SU PPDU.

For bits, to which two different fields of a Number of EHT-LTF Symbols And Midamble Periodicity field and an NSTS And Midamble Periodicity field are overlappingly allocated, fields are determined according to whether the PPDU is an SU PPDU. When a size of the EHT-SIG compression field is 1 bit, if the value of the EHT-SIG compression field is "1", and the number of MU-MIMO users is 1 according to an MU-MIMO user field, a reception device recognizes the PPDU as an SU PPDU, and the bits, to which two different fields of the Number of EHT-LTF Symbols And Midamble Periodicity field and the NSTS And Midamble Periodicity field are overlappingly allocated, are interpreted as the NSTS And Midamble Periodicity field. If the value of the EHT-SIG compression field is "0", or if neither the value of the Number Of EHT-SIG Symbols Or MU-MIMO field indicates 1 symbol nor the number of MU-MIMO users indicates "1", the reception device identifies that the PPDU as an MU PPDU, and interprets the bits as the Number of EHT-LTF Symbols And Midamble Periodicity field.

(b) of FIG. 9 illustrates a PPDU type specific field when a PPDU type field of a VD field indicates an MU PPDU. Fields identical to those in (a) of FIG. 9 will be omitted.

In (b) of FIG. 9, an SIG-structure field may indicate a configuration type and transmission information of a content channel of an EHT-SIG field. When the SIG-Structure field is 2 bits, if a bit value is "00", this may indicate that the EHT-SIG field (EHT-SIGx-4, x=1, 2, 3, 4) of 4 types of content channels are shown in 80 MHz BW, and if the bit value is "01", this may indicate that the EHT-SIG field (EHT-SIGx-2, x=1, 2) of 2 types of content channels are shown in 80 MHz BW, and content channels of the EHT-SIG field are shown contiguously via Low 40 MHz.

If the bit value of the SIG-Structure field is "10", the SIG-Structure field may indicate that two types of EHT-SIG fields are contiguously transmitted via High 40 MHz in 80 MHz BW. If the bit value of the SIG-Structure field is "11", this may indicate that only one type of EHT-SIG field is transmitted at 80 MHz.

As another embodiment, when the SIG-Structure field includes 3 bits, a type of the EHT-SIG field according to a bit value and a transmission frequency domain may be as shown in Table 3 below.

TABLE 3

| Bit value of SIG-structure field | Number (type) of EHT-SIG fields and frequency domain for transmission |
|---|---|
| "000" | Four types of EHT-SIG fields are transmitted at 80 MHz. |
| "001" | Two types of EHT-SIG fields are transmitted contiguously at low 40 MHz. |
| "010" | Two types of EHT-SIG fields are transmitted contiguously at high 40 MHz. |
| "100" | At 80 MHz, one type of a single EHT-SIG field is transmitted on a lowest 20 MHz sub-channel which is a lowest frequency band. |
| "101" | At 80 MHz, one type of a single EHT-SIG field is transmitted on a low 20 MHz sub-channel. |

TABLE 3-continued

| Bit value of SIG-structure field | Number (type) of EHT-SIG fields and frequency domain for transmission |
|---|---|
| "110" | At 80 MHz, one type of a single EHT-SIG field is transmitted on a high 20 MHz sub-channel. |
| "111" | At 80 MHz, one type of a single EHT-SIG field is transmitted on a highest 20 MHz sub-channel which is a highest frequency band. |

That is, the number of content channels may be determined based on information of the U-STG field.

(c) of FIG. 9 illustrates a PPDU type specific field when a PPDU type field of a VD field indicates a TB PPDU. A TB PPDU includes only a spatial reuse field and a puncturing mode field.

The spatial reuse field may be interpreted with a bandwidth field, and may indicate a transmit power limit in a case of a band, in which spatial reuse is possible, in the total bandwidth indicated by the bandwidth field and a case in which spatial reuse is applied. For example, if the bandwidth field indicates 20 MHz, the spatial reuse field may indicate the transmit power limit and whether spatial reuse of the corresponding band is possible.

When the total bandwidth is 20 MHz or higher and is thus divided into multiple 20 MHz, each corresponding spatial reuse field may indicate a transmit power limit and whether spatial reuse is applied for ¼ of the total bandwidth (at least 20 MHz). For example, if the bandwidth field indicates 40 MHz, spatial reuse field 1 indicates a transmit power limit and whether spatial reuse is applied to first 20 MHz and spatial reuse field 2 indicates a transmit power limit and whether spatial reuse is applied to second 20 MHz. If the bandwidth field indicates 80, 160, 240, or 320 MHz, spatial reuse fields 1, 2, 3, and 4 indicate whether spatial reuse is possible for ¼ (40 MHz for 160 MHz, and 80 MHz for 320 MHz) of the bandwidths, and corresponding transmit power limits, respectively.

A puncturing mode field signals a puncturing mode to be generated when the TB PPDU is transmitted via an UL MU OFDMA, and an STA and an AP of an adjacent BSS may obtain additional information required for spatial reuse via information of the puncturing mode field of the UL PPDU received by the STA and AP. A PPDU type (final type received by the AP) combined with UL MU OFDMA transmission may differ from a type signaled in the puncturing mode of the TB PPDU because actual UL transmission does not occur in some bandwidths according to CCA results of UL STAs.

Figure 10:
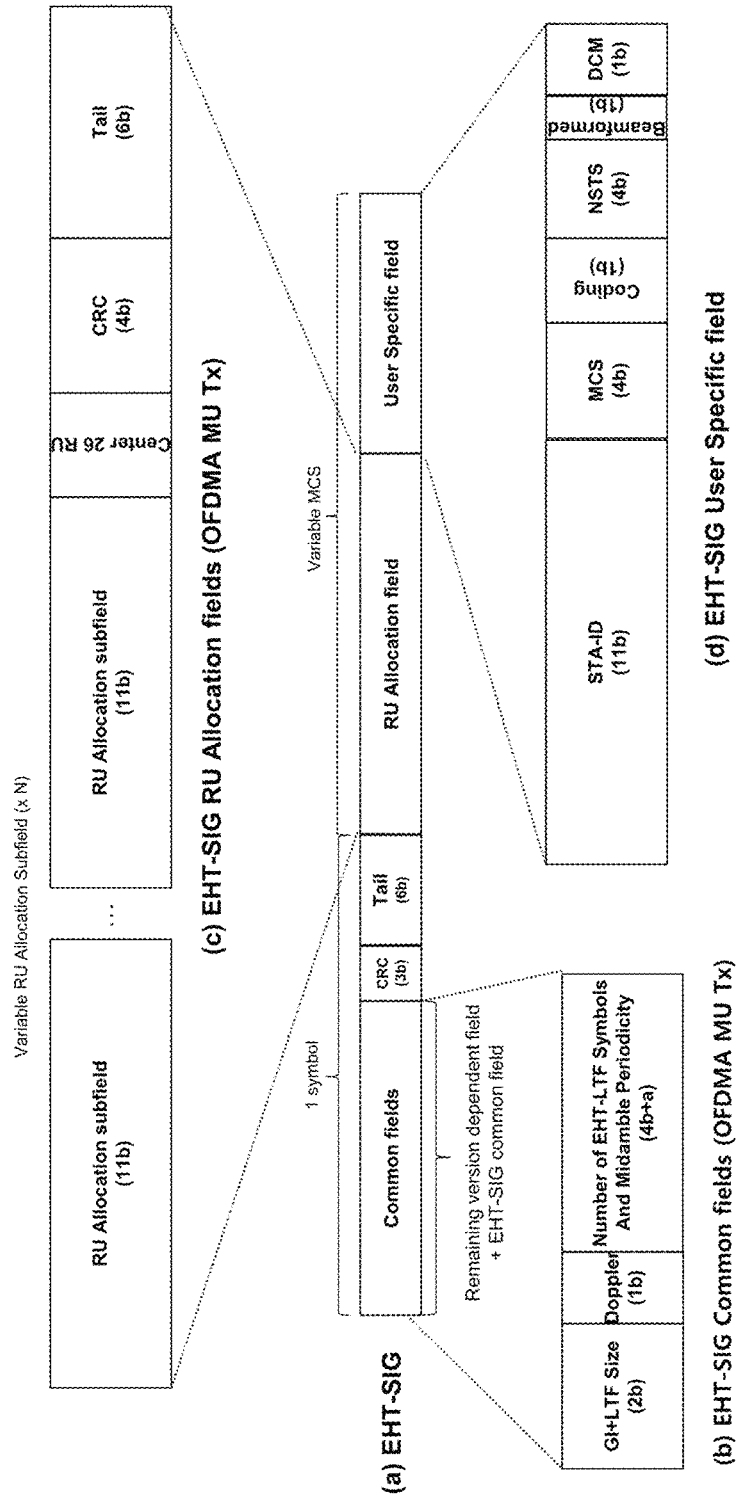
FIG. 10 illustrates an EHT-SIG field of an EHT PPDU according to an embodiment of the present disclosure.

FIG. 10 illustrates an EHT-SIG field of an EHT PPDU according to an embodiment of the present disclosure.

Referring to (a) of FIG. 10, an EHT-SIG field may include a common field, an RU allocation field, and a user specific field. Names of respective fields included in the EHT-SIG field may vary, and classification of the fields may not be specified. Locations of fields shown in an embodiment of the EHT-SIG field may be shown by changing some fields and positions of the aforementioned U-SIG.

Configurations of the fields included in the EHT-SIG field may vary according to information included in a U-SIG. For example, based on a combination of at least one of the UL/DL field, the RU compression field, and the PPDU type field included in the U-SIG field as described above, the EHT-SIG field may include or may not include the RU allocation field.

Due to limitation of the number of bits of the U-SIG field, information that is not included in the U-SIG field may be additionally included in the EHT-SIG field.

(b) of FIG. 10 illustrates a configuration of the common field of the EHT-SIG field. The common field may include a VD field that is not included in the U-SIG field. The common field may include some of the same fields as fields shown in the HE-SIG-A field of 11ax, such as an LDPC extra symbol segment field, an STBC field, a pre-FEC padding factor field, a GI-LTF size field, and a Doppler field, or fields having the same functions as those of the fields shown in the HE-SIG-A field of 11ax, and bits equal to or larger than those of the same field of 11ax may be allocated in consideration of extended performance of 11be.

The common field may be represented by 1 symbol, and for this, 26 bits may be allocated to the common field and coding may be performed with MCS 0, or hits more than 26 bits may be allocated and coding may be performed with an MCS higher than MCS 0.

(c) of FIG. 10 illustrates an example of an RU allocation field. An RU allocation field is shown only in an OFDMA MU PPDU, and may not exist in EHT-SIG fields of an SU PPDU, a TB PPDU, and a full BW MU-MIMO due to omission.

An RU allocation field includes one or more RU allocation subfields, and 8 bits or more may be allocated to each of the RU allocation subfields. An RU allocation subfield may include information on each RU size and RU structure (configuration and combination), and the number of allocated reception devices, and frequency position information of an RU indicated by each RU allocation subfield may be identified according to a sequence in which each RU subfield is shown.

An RU allocation field may include N RU allocation subfields, and N may be indicated by an RU allocation subfield number (number of RU allocation subfields) field appearing before the RU allocation field. The N RU allocation subfields may be preferentially located in the RU allocation field according to a sequence of including a lowest frequency RU among RUs included in each RU allocation field. As an example of the sequence of fields shown in the RU allocation field, it is assumed that 4 RU allocation subfields indicate subfield #1=[−1012:−771 & −495:−254] (two 242-tone RUs), subfield #2=[−770:−529] (242-tone RU), subfield #3=[12:529 & 770:1012] (484-tone RU, 242-tone RU), and subfield #4=[−253:−12 & 529:770] (two 242-tone RUs). In this case, subfield #1 having the RU at −1012 may be located first in the RU allocation field, subfield #2 having the RU at −770 may be located second, subfield #4 having the RU at −253 that is a subsequently lower frequency may be located third, and subfield #3 in which a lowest frequency of the RU is 12 may be located last in the RU allocation field.

The RU allocation subfield may signal a small RU construct within 20 MHz including RUs of 26, 52, and 106-tone sizes, and may include a 78 (26+52 or 52+26)-tone RU that allocates, at once, RUs in which 26 and 52-tone RUs are shown contiguously, and a 132 (26+106 or 106+26)-tone RU that allocates, at once, RUs in which 26 and 106-tone RUs are shown contiguously. The RU allocation subfield may signal a large RU having a size of 242-tone or higher, and may indicate a combination of RUs constituting each large RU and a positional relationship of the constituting RUs in order to signal the combination and positions of the large RUs located non-contiguously.

A center 26 RU field indicates whether 1, 2, and 4 center 26-tone RUs existing in 80 MHz, 160 MHz, and 320 MHz are used respectively, one or more bits may be allocated to the center 26 RU field, and if a PPDU BW is 40 MHz or lower, the center 26 RU field may not be shown. If the center 26 RU field is configured to 1 bit, a center 26-tone RU field of an 80 MHz PPDU indicates whether a center 26-tone RU located in the middle of 80 MHz is used, and an identical value (e.g., 1) may be configured in center 26-tone RU fields of all EHT-SIG content channels. If a value of the center 26-tone RU field is 1, a field of a device to which a corresponding center 26-tone RU is allocated is shown in a user specific field illustrated in (d) of FIG. 10.

Alternatively, if the center 26 RU field is configured to 1 bit, a center 26-tone RU field of a 160 MHz PPDU may be repeated in each of two EHT-SIG content channels, a center 26-tone RU field of EHT-SIG content channel 1 may indicate whether a center 26-tone RU of 80 MHz existing at a relatively low frequency is used, and a center 26-tone RU field of content channel 2 may indicate whether a center 26-tone RU of 80 MHz existing at a relatively high frequency is used. If the center 26 RU field is configured to 1 bit, when 4 EHT-SIG content channels are used for 240 MHz and 320 MHz PPDUs, center 26-tone RU fields existing in EHT-SIG content channels 1, 2, 3 and 4 may indicate whether first, second, third, and fourth (ascending order of frequency) center 26-tone RUs are used, respectively.

If a 320 MHz bandwidth is divided into four 80 MHz segments, the respective segments may represent mutually independent 80 MHz RU allocation subfields. In this case, center 26-tone RU fields existing in the respective 80 MHz segments may signal whether to use the center 26-tone RU fields existing in the respective 80 MHz segments. In a manner similar to the present embodiment of dividing a PPDU into 80 MHz segments, a 320 MHz PPDU may be divided into two 160 MHz segments or a 240 MHz PPDU may be divided into three 80 MHz segments or into one 160 MHz segment and an 80 MHz segment, so that an independent EHT-SIG field may be transmitted for each segment.

(d) of FIG. 10 illustrates a configuration of a user specific field. A basic function of a user specific field is the same as an HE-SIG-B user specific field of 11ax, and each role existing in the user specific field is also the same as that of the corresponding field of 11ax. However, in a user specific field included in the EHT-SIG field, 4 bits are allocated to NSTS in order to signal 16 streams.

As many user specific fields as a total number of reception devices signaled by respective one or more RU allocation subfields may be included, and if the EHT-SIG is configured using two or more EHT-SIG content channels, the number of user specific fields included in a single EHT-SIG content channel is equal to the total number of receptions devices signaled by RU allocation subfields of the corresponding EHT-SIG content channel.

In addition to the configuration of the user specific field illustrated in (d) of FIG. 10, in order to signal one or more RUs with a single user specific field, an RU indicator field (or an additional RU indicator field) indicating whether an additional RU has been allocated in addition to the RU corresponding to the user specific may be further included. When the RU indicator field indicates that an RU allocated to a corresponding reception device is additionally exists, the reception device identifies the additional RU including an STA-ID of the reception device by checking a user specific field that is shown subsequent to a corresponding user specific field.

When one or more RUs are allocated at once to the reception device via the RU indicator field indicating the additionally allocated RU, the number of user specific fields included in the EHT-SIG content channel, which are less than the total number of reception devices signaled by RU allocation subfields of the EHT-SIG content channel, may be included.

<RU Allocation Method and Combination Method of RUs>

In 11be, multiple RUs may be allocated to a single reception device, unlike a conventional WLAN standard. That is, multiple RUs may be allocated to one reception device, unlike in a conventional way in which one RU is allocated to one reception device.

In this case, sizes of multiple RUs allocated to one reception device may be the same or different from each other, and not only contiguously located RUs but also non-contiguously located RUs may be combined and allocated to a single reception device.

Therefore, in addition to small RUs having sizes of 26-tone, 52-tone, and 106-tone and large RUs having sizes of 20 MHz (242-tone), 40 MHz (484-tone), and 80 MHz (996-tone), various types of RUs which may be configured by a combination of RUs may be allocated to a reception device.

For example, when two or more RUs are small RUs (lower than a 242-tone size), only RUs contiguously located on frequency may be allocated together to a single reception device, and in a case of a large RU (a 242-tone size or higher), all contiguously or non-contiguously located RUs may be allocated to a single reception device. However, for a reception device allocated with a small RU, all allocated RUs are small RUs, and a reception device allocated with a large RU may be limited so that all allocated RUs are configured as large RUs. That is, all RUs which may be allocated to an STA within one PPDU may be small RUs or all large RUs.

In order to allocate two or more RUs to a reception device in this way, after each single RU allocated by an RU allocation subfield is signaled, two or more RUs may be allocated by indicating a user specific field of the single reception device two or more times. That is, two or more user specific fields including the same STA-ID are included in the EHT-SIG field, and therefore multiple RUs may be allocated to a single reception device.

Figure 11:
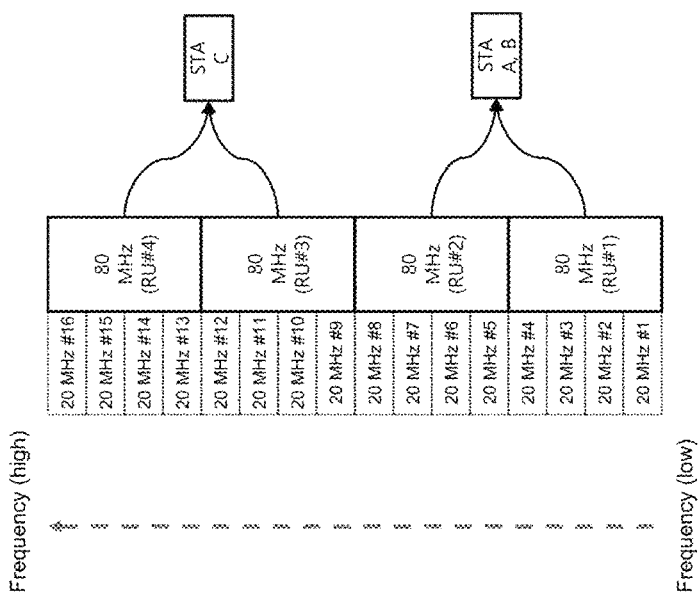
FIG. 11 illustrates a configuration of a content channel of an EHT-signal (SIG) field according to an embodiment of the present disclosure.
Figure 11:
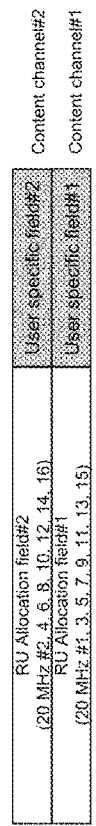

FIG. 11 illustrates a configuration of a content channel of an EHT-signal (SIG) field according to an embodiment of the present disclosure.

Referring to FIG. 11, multiple RUs may be allocated to a single UE within a total bandwidth in which a PPDU is transmitted. Hereinafter, the present embodiment may be applied as generation rules for configuration and generation of an EHT-SIG content channel, an RU allocation subfield, and an RU allocation scenario applied to a signaling embodiment using a basic (legacy) RU and a signaling embodiment using a combined (large) UR in which multiple RUs are combined, which will be described below.

Specifically, as illustrated in (a) of FIG. 11, a total bandwidth in which a PPDU is transmitted is 320 MHz, and 160 MHz may be allocated to each of three reception devices (STAs). In this case, a single 160 MHz large RU may be allocated to an STA, but two 80 MHz RUs may be allocated to STAs A, B, and C as illustrated in FIG. 11.

That is, in 320 MHz, low 160 MHz may be allocated to STAs A and B, and high 160 MHz may be allocated to STA C. 320 MHz includes sixteen 20 MHz channels, so that, for convenience, a 20 MHz channel existing in a low frequency is referred to as 20 MHz #1, and 20 MHz existing at a highest frequency is referred to as 20 MHz #16. (b) of FIG. 11 illustrates an area that is shown in an RU allocation field of each EHT-SIG content channel and a user specific field corresponding to each RU allocation field when two EHT-SIG content channels 1 and 2 are used for signaling for 320 MHz.

Figure 12:
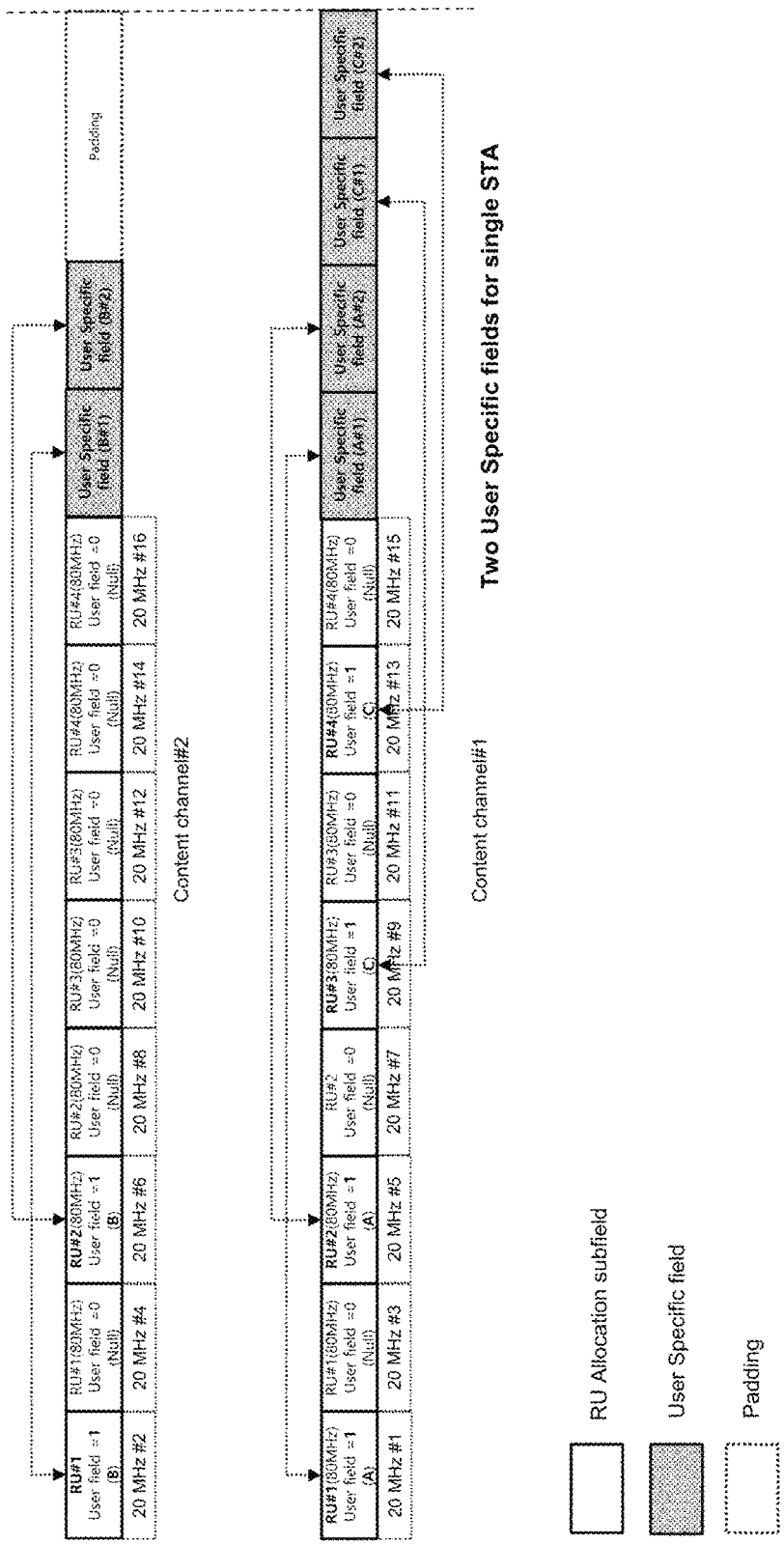
FIG. 12 illustrates configurations of a resource unit (RU) allocation field and a user specific field of an EHT-SIG field according to an embodiment of the present disclosure.

FIG. 12 illustrates configurations of a resource unit (RU) allocation field and a user specific field of an EHT-SIG field according to an embodiment of the present disclosure.

Referring to FIG. 12, an RU of 320 MHz may be allocated based on an 80 MHz RU by an RU allocation field and a user specific field.

Hereinafter, the RU allocation method illustrated in FIG. 12 assumes that the number of EHT-SIG content channels is two. If the number of EHT-SIG content channels is 1 or 3 or more, EHT-SIG content channels 1 and 2 may be combined, or each EHT-SIG content channel may be dispersed.

If a total bandwidth in which a PPDU is transmitted is 320 MHz, sixteen 20 MHz channels may be configured, and therefore two EHT-SIG content channels may be cross-repeated on each of eight 20 MHz channels so as to be signaled. In other words, EHT-SIG content channel 1 may be transmitted on 20 MHz #1 located at a lowest frequency and EHT-SIG content channel 2 may be transmitted on 20 MHz #2, and repeated transmission may be performed in the same manner in which EHT-SIG content channel 1 is transmitted again on 20 MHz #3 and EHT-SIG content channel 2 is transmitted on 20 MHz #4, so that, as a result, EHT-SIG content channel 1 may be transmitted on odd-numbered 20 MHz channels, and EHT-SIG content channel 2 may be transmitted on even-numbered 20 MHz channels.

In EHT-SIG content channels 1 and 2, RU allocation subfields of RUs located in odd-numbered 20 MHz channels (EHT-SIG content channel 1) and even-numbered 20 MHz channels (EHT-SIG content channel 2), in which respective EHT-SIG content channels are shown, may be located in an ascending order of frequencies.

However, as illustrated in FIG. 11, when a size of each RU (#1, 2, 3, and 4) occupies an 80 MHz band larger than 20 MHz, it may be identified that not only an RU allocation subfield for the same RU is shown in both EHT-SIG content channel 1 and EHT-SIG content channel 2, but also transmission is performed a total of 4 times, i.e., twice in each EHT-SIG content channel.

When RU allocation subfields for 80 MHz RU #1, 2, 3, and 4 are first transmitted on respective EHT-SIG content channels, the number of reception devices allocated with corresponding RUs may be signaled, and when an RU allocation subfield for a single RU is duplicated and transmitted on the same EHT-SIG content channel, Null user may be signaled.

Since two EHT-SIG content channels 1 and 2 have RU allocation subfields for the same RU, one STA may be allocated in each EHT-SIG content channel so that a total of two STAs may be allocated to the same RU, as in EHT-SIG content channel 1 and EHT-SIG content channel 2 illustrated in the embodiment of FIG. 10. As such, when the STAs to be allocated to the same RU are distributedly indicated, a load balance may be enhanced by distributing user specific field numbers shown in respective EHT-SIG content channels.

In the present embodiment, an RU allocation field may include a total of eight RU allocation subfields in each EHT-SIG content channel in order to signal a total of four 80 MHz channels existing in a 320 MHz BW, and it may be identified that RU allocation is performed, based on appearing of a user specific field of each STA twice in 80 MHz RUs. Additionally, in a case of RU #4, by allocation to STA C through EHT-SIG content channel 2 instead of allocation to STA C through EHT-SIG content channel 1 (signaling, as Null user, an RU #4 allocation subfield of EHT-SIG content channel 1), the number of user specific fields may be changed so that each of EHT-SIG content channels 1 and 2 has 3 user specific channels (in this case, padding of EHT-SIG content channel 2 of FIG. 12 is removed).

In the embodiment of FIG. 12, repeated appearance of a user specific field of a single STA may be a rather disadvantageous signaling scheme in terms of signaling efficiency and implementation complexity of a reception device. Accordingly, by enabling expression (signaling) of RUs exceeding 60 MHz and 80 MHz at once via a single RU allocation subfield, signaling may be completed even if a user specific field of a reception device is shown only once.

Figure 13:
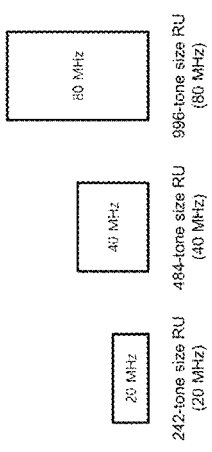
FIG. 13 illustrates a combination of RUs according to an embodiment of the present disclosure.
Figure 13:
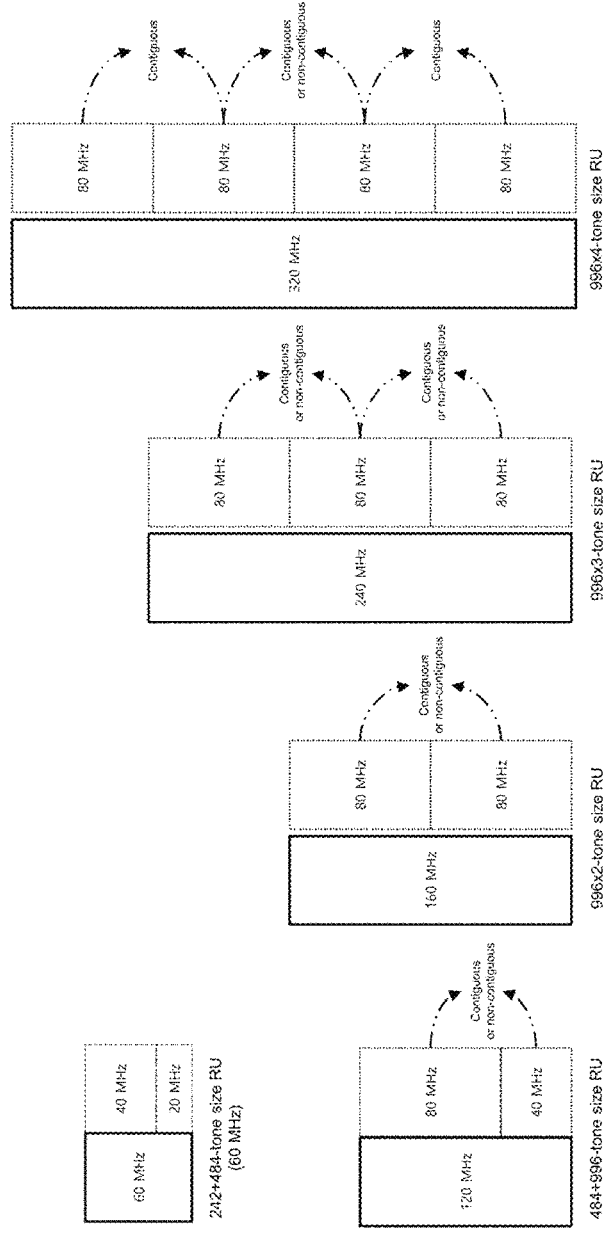

FIG. 13 illustrates a combination of RUs according to an embodiment of the present disclosure.

Referring to FIG. 13, a new type of large RU may be allocated by combining existing large RUs and allocating the same to a single reception device.

Specifically, via a combination of basic RUs (20 MHz, 40 MHz, and 80 MHz) illustrated in (a) of FIG. 13, a new type of large RU may be allocated to a reception device as illustrated in (b) of FIG. 13. In this case, as for a large RU, just as RUs of 20 MHz and 40 MHz are combined to allocate a 60 MHz large RU, RUs of 20 MHz, 40 MHz, and 80 MHz are combined so that a large RU of a new size, such as 120 MHz and 160 MHz, may be allocated to a reception device without defining a separate tone plan or the like. For example, 20 MHz, 40 MHz, and 80 MHz illustrated in (a) of FIG. 13 may be combined to indicate sizes of 60 (20+40) MHz, 100 (20+80 or 40×2+20) MHz, 120 (80+40) MHz, 140 (80+40+20) MHz, 160 (80×2) MHz, 180 (80×2+20) MHz, 200 (80×2+40) MHz, 220 (80×2+40+20) MHz, 240 (80×3) MHz, 260 (80×3+20) MHz, 280 (80×3+40) MHz, 300 (80×3+40+20) MHz, and 320 (80×4) MHz, and a large RUs in which only some of the listed large RUs are combined may be generated.

In this case, the combined RUs may be not only contiguous RUs but also discontiguous RUs which are not contiguous.

Figure 14:
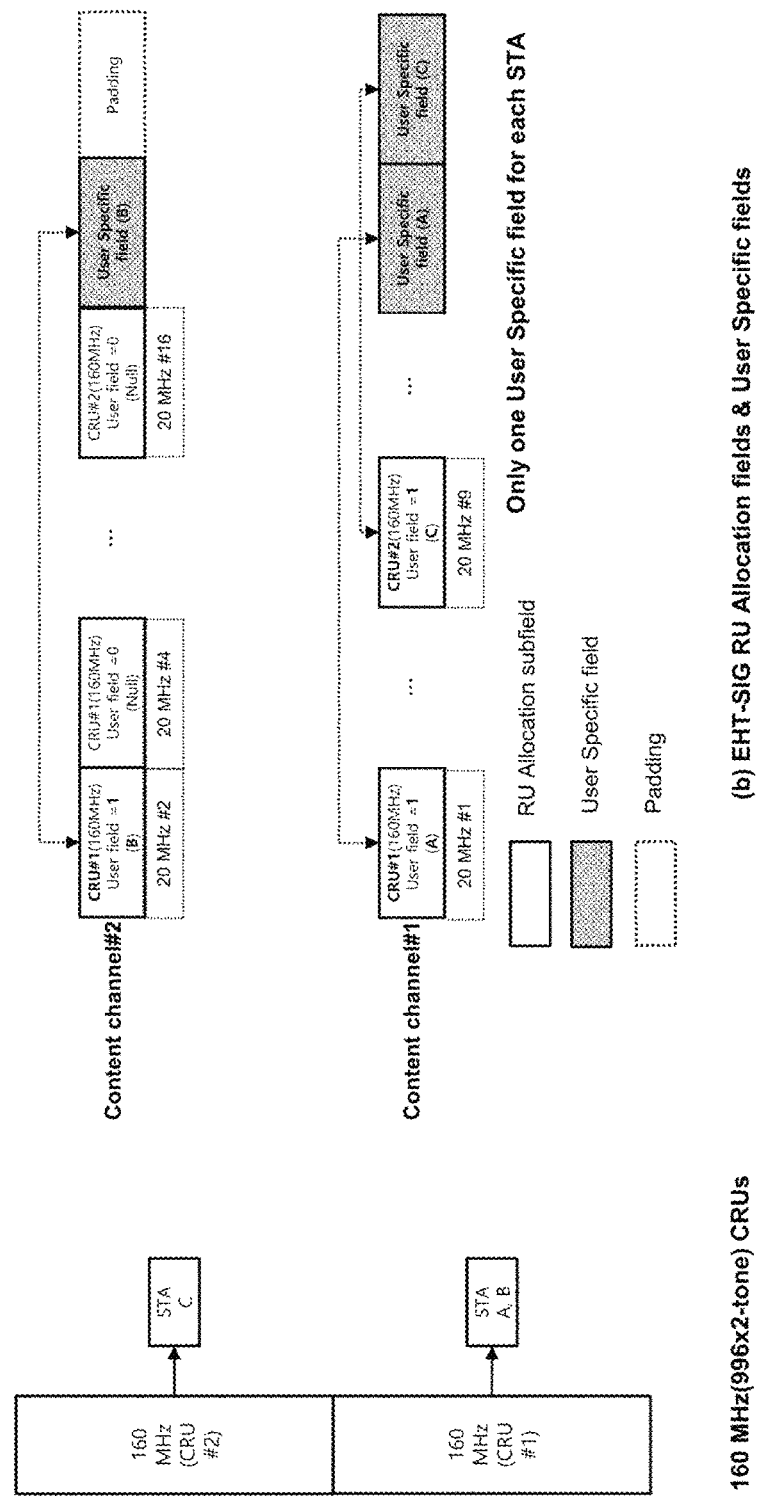
FIG. 14 illustrates a method for combining and allocating multiple RUs according to an embodiment of the present disclosure.

FIG. 14 illustrates a method for combining and allocating multiple RUs according to an embodiment of the present disclosure.

Referring to FIG. 14, when a total bandwidth for PPDU transmission is 320 MHz, two RUs of 80 MHz may be combined, and a 160 MHz RU may be thus allocated to a reception device via an RU allocation field.

Specifically, as illustrated in (a) of FIG. 14, RUs having a size of 160 MHz (996×2-tone size), which are to be allocated to STAs A, B, and C, respectively, may be expressed as 160 MHz CRU #1 and 2, and even if only one CRU is allocated, each STA may recognize that a frequency allocated thereto is a 160 MHz band. In this case, the 160 MHz CRU refers to an RU in which two 80 MHz RUs are combined.

(b) of FIG. 14 illustrates an example of user specific fields and RU allocation fields for signaling using a CRU of 160 MHz size. Each EHT-SIG content channel includes RU allocation fields indicating CRU #1 and CRU #2, each of which is repeated 4 times, and when an RU allocation subfield for allocation of a corresponding CRU in each EHT-SIG content channel is first located, information (the number of reception UEs allocated with the corresponding CRU) on the number of user specific fields included in the corresponding EHT-SIG content channel is included and signaled.

In EHT-SIG content channel #1, the RU allocation subfield of CRU #1 may be located at the forefront, it is indicated that one user specific field is included in response to a corresponding CRU, and STA-ID of STA A is included in a subsequently located user specific field so that CRU #1 (160 MHz) may be allocated to STA A.

Signaling for STA B, which is for allocation with CRU #1, may signal CRU #1 in EHT-SIG content channel #2 and indicate that one user specific field is included in response to a corresponding CRU, and the user specific field corresponding to CRU #1 included in EHT-SIG content channel #2 may include STA ID of STA B so that CRU #1 (160 MHz) may be allocated to STA B.

As illustrated in (a) and (b) of FIG. 14, allocation to STA A and STA B, which use the same RU together, by using MU-MIMO may be signaled by distributing user specific fields to two or more EHT-SIG content channels as described above, or may signal all user specific fields of a specific RU in a single EHT-SIG content channel. In the case of the present embodiment, load balance may be achieved in a manner of distributing user specific fields for a single RU.

Figure 15:
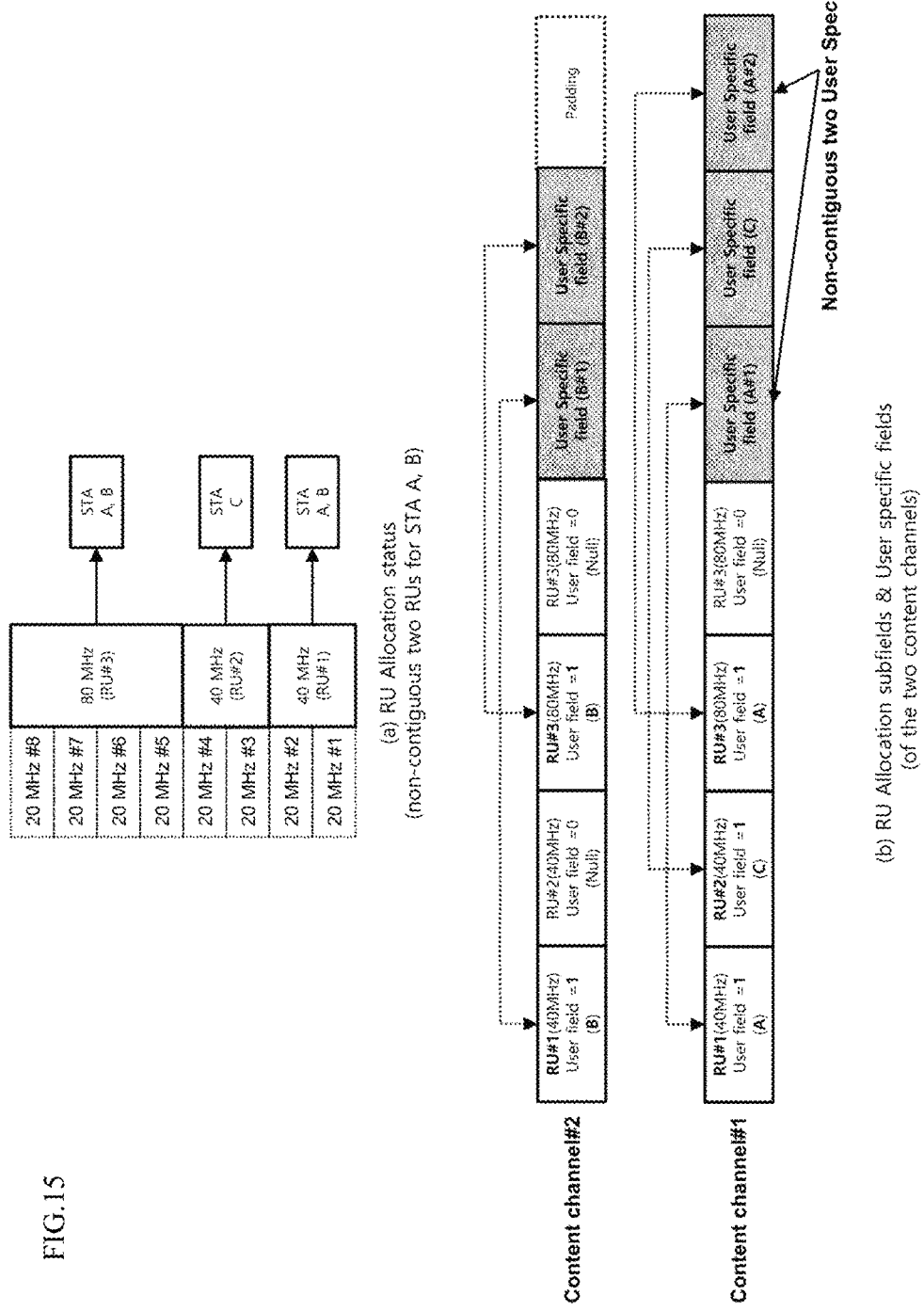
FIG. 15 illustrates configurations of an RU allocation field and a user specific field for allocation of multiple discontiguous RUs to a single terminal, according to an embodiment of the present disclosure.

FIG. 15 illustrates configurations of an RU allocation field and a user specific field for allocation of multiple discontiguous RUs to a single UE, according to an embodiment of the present disclosure.

Referring to FIG. 15, multiple discontiguous RUs may be combined so as to be allocated to a single UE via an RU allocation subfield and a user specific field.

Hereinafter, descriptions are provided by assuming that the number of EHT-SIG content channels is two. If there is one EHT-SIG content channel, each field of two EHT-SIG content channels may be integrated, and if there are three or more EHT-SIG content channels, EHT-SIG content channels of the embodiment to be described below may be implemented in a distributed form.

As illustrated in (a) of FIG. 15, STAs A and B are allocated with non-contiguously located RU #1 (40 MHz) and RU #3 (80 MHz), and STA C is allocated with RU #2 (40 MHz) located between RU #1 and RU #3. RU #1 is located over 20 MHz channels #1 and 2, and RU #1 is thus shown once in RU allocation subfields of EHT-SIG content channels 1 and 2, and RU #2 is also located over 20 MHz channels #3 and 4, and RU #2 is thus signaled once in the RU allocation subfields of EHT-SIG content channels #1 and 2.

On the other hand, RU #3 is located over 20 MHz channels #5, 6, 7, and 8, and RU #3 is thus signaled through two RU allocation subfields in each of EHT-SIG content channels #1 and #2, and as described above, a first RU allocation subfield shown in response to a corresponding RU in each EHT-SIG content channel may include information on the number of user specific fields.

(b) of FIG. 15 illustrates an embodiment of configurations of user specific fields and RU allocation subfields, in which two discontiguous RU #1 and RU #3 are allocated to STAs A and B, and RU #2 located between two RU #1 and RU #3 is allocated to STA C.

In EHT-SIG content channel #1, an RU size is 40 MHz (484-tone size) in a first RU allocation subfield, a bit (bit string), which indicates that the number of reception devices (corresponding user specific fields) allocated with a corresponding RU is 1, may be configured, and STA-ID of STA A is included in a first user specific field so that RU #1 may be allocated to STA A. In this case, in EHT-SIG content channel #2, RU allocation to STA B may be performed in the same manner as that for STA A.

RU #2 has a size of 40 MHz and is thus shown in both EHT-SIG content channels #1 and #2. However, the reception device allocated with RU #2 is only STA C, and thus information, which indicates that one reception device exists only in one (in the present embodiment, content channel #1) of the two EHT-SIG content channels, is included, and the user specific field may include STA-ID of STA C. In this case, in the remaining EHT-SIG content channel, information indicating 40 MHz RU & Null user may be included in the RU allocation subfield and the user specific field, respectively. Then, RU #3 is allocated again to STAs A and B, and may be allocated, in the same manner as the allocation for RU #1, with the RU size changed to 80 MHz (996-tone size).

That is, in order to allocate two or more non-contiguously located RUs to a reception device, the construct of the allocated RUs is indicated by RU allocation subfields of respective unit RUs, and an STA ID that is an identical STA ID may be included in user specific fields corresponding to the RUs constructed by the RU allocation subfields, so that allocation may be performed. That is, a user specific field including an STA ID for identification of a single reception device may be repeatedly included in the EHT-SIG content channel in response to two or more allocated RU allocation subfields.

Figure 16:
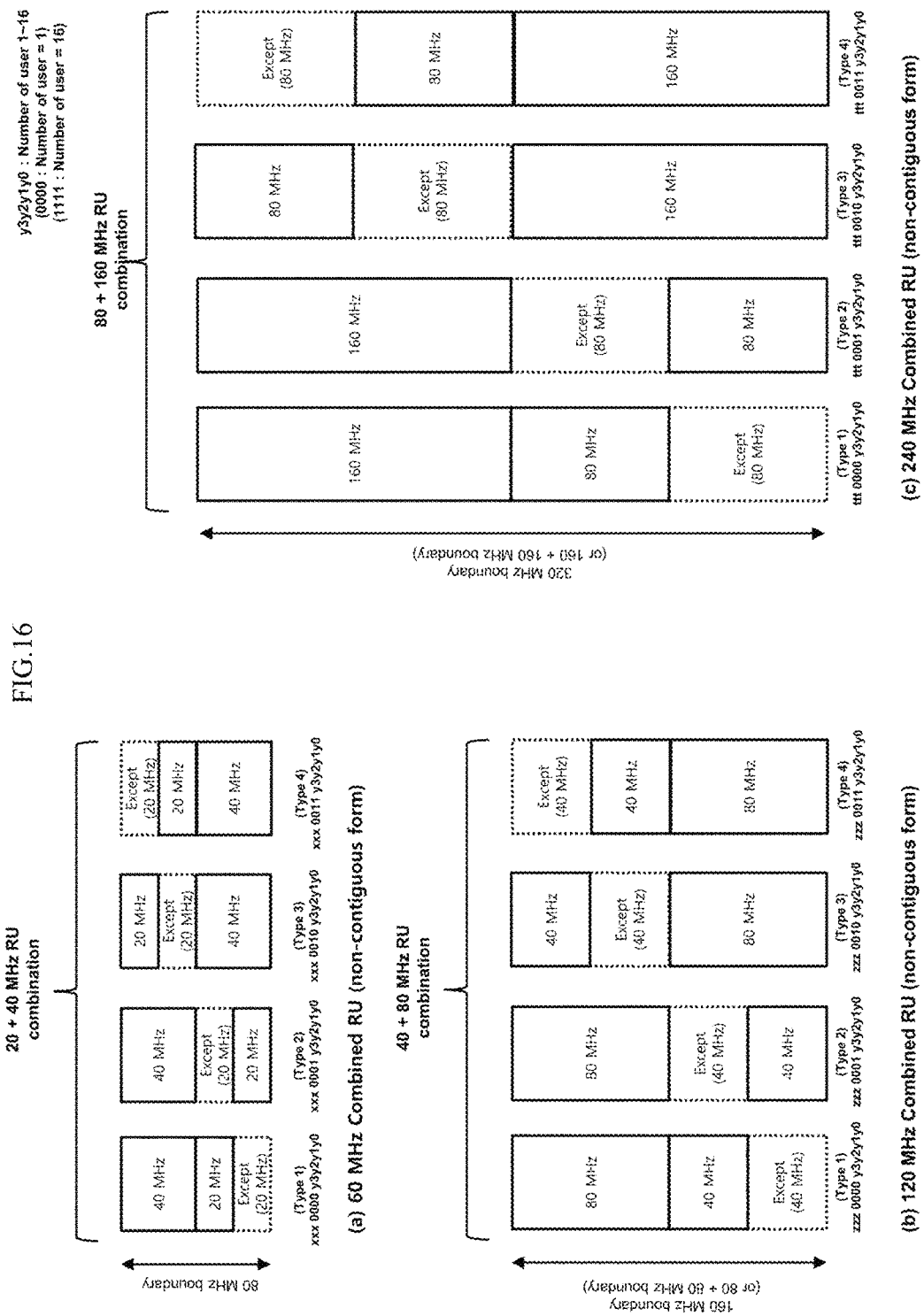
FIG. 16 illustrates a combination of multiple discontiguous RUs allocated to a single terminal according to an embodiment of the present disclosure.

FIG. 16 illustrates a combination of multiple discontiguous RUs allocated to a single UE according to an embodiment of the present disclosure.

Referring to FIG. 16, existing legacy large RUs of 20 MHz, 40 MHz, and 80 MHz are non-contiguously combined so as to be allocated to a single reception device via an RU allocation field and a user specific field of an EHT-SIG content channel.

Specifically, as illustrated in (a) of FIG. 16, a 60 MHz discontiguous CRU (or multiple RU (MRU)) in which RUs of 20 MHz (242-tone size) and 40 MHz (484-tone size) are combined may be allocated to a single UE. In the present embodiment, in cases of type 1 and type 4, 20 MHz and 40 MHz exist in contiguous positions in frequency. However, 20 MHz and 40 MHz are RUs of a BW in which tone plan, etc. are not defined, and should be thus used as 20 MHz+40 MHz, that is, the same may be interpreted as a discontiguous CRU type.

As illustrated in (a) of FIG. 16, a 20+40 MHz CRU is defined as a type in which some 20 MHz of an 80 MHz RU is excluded, and each type may be classified according to a position of the excluded 20 MHz. For example, 20+40 MHz CRU Type1 refers to a type in which a lowest 20 MHz having a lowest frequency band is excluded from the 80 MHz RU, 20+40 MHz CRU Type2 represents a type in which a low 20 MHz that is lower than a center frequency is excluded from the 80 MHz RU, type3 represents a type in which a high 20 MHz that is higher than the center frequency is excluded, and type4 represents a type in which a highest 20 MHz that is a highest frequency band is excluded.

In this case, the excluded frequency band may refer to a frequency band allocated to another reception device or a punctured frequency band. That is, when some of multiple frequency bands allocated to the reception device are allocated to another reception device or are punctured, even if the RUs allocated to the reception device are not contiguously located, a transmission device may combine and allocate the RUs to the reception device, and may indicate the same via a specific bit of the RU allocation field included in a content channel of an EHT-SIG field.

The 40+80 MHz CRU illustrated in (b) of FIG. 16 shows a type in which some 40 MHz of a 160 MHz CRU is excluded, and the 80+160 MHz CRU illustrated in (c) of FIG. 16 shows a type in which some 80 MHz of a 320 MHz CRU is excluded. In (b) and (c) of FIG. 16, each type may be determined in the same manner as in (a) of FIG. 16.

(b) of FIG. 16 illustrates discontiguous 120 MHz CRUs in which 40 MHz (484-tone size) RUs and an 80 MHz (996-tone size) are combined. The 40+80 MHz CRU illustrated in (b) of FIG. 16 may be interpreted as a discontiguous CRU in the same manner as in (a) of FIG. 16.

(c) of FIG. 16 illustrates a 240 MHz discontiguous CRU in which 80 MHz (996-Lone size) RUs and a 160 MHz (996×2-tone size) RU are combined. The 80+160 MHz CRU illustrated in (c) of FIG. 16 may be interpreted as a discontiguous CRU in the same manner as in (a) of FIG. 16.

In (a) to (c) of FIG. 16, each type may be indicated by each bit string of the RU allocation field, and each bit string may be configured in ascending or descending order of index values according to each type. That is, if sizes of the CRUs are the same, index values of each type may be sequentially configured in ascending or descending order of positions of the excluded frequency bands, and each index value may correspond to a bit string of the RU allocation field. For example, the index value of the bit string of 4 bits of the RU allocation field may indicate (or correspond to) the type of each CRU in which multiple discontiguous RUs are combined. Specifically, as illustrated in (a) of FIG. 16, if a bandwidth size is 80 MHz and a size of the CRU allocated to the reception device is 60 MHz, the bit indicating the CRU in the RU allocation field may include 4 bits. In this case, type 1 to type 4 may be configured in ascending order of excluded frequency bands, and each type may have a hit string of "0000", "0001", "0010" and "0011" in ascending (or descending) order. Based on this, the reception device may recognize that the RU allocated thereto is a combination of discontiguous RUs, and may recognize the frequency band excluded from 80 MHz.

That is, some multiple bits in bit strings of the RU allocation subfield may indicate a CRU construct. In other words, multiple discontiguous RUs which are combined and allocated to the reception device, and a configuration, such as an excluded frequency band, may be configured via some bit strings of the RU allocation subfield. In this case, the remaining bit strings of the RU allocation subfield may indicate a total bandwidth in which the PPDU is transmitted and the number of reception devices to which the CRU is allocated, and the bit string indicating the CRU construct may be located between a bit string related to the size of the CRU in which RUs are combined and a bit string indicating the number of reception devices to which the CRU is allocated, when the total bandwidth includes at least one segment.

Even CRUs of the same bandwidth may be indicated by different bit strings depending on a combination type of RUs, and the bit string indicating a combination type may be located between the bit string related to the size of the CRU in which RUs are combined and the bit string indicating the number of reception devices to which the CRU is allocated.

In this case, the bit string related to the size of the CRU may be related to a specific bandwidth in which the CRU is combined. That is, the UE may identify the size of the CRU, the size of the combined RUs, and/or the size of the punctured bandwidth, via the bit string related to the size of the CRU.

The CRU type may be classified into multiple types according to the number of bits of the bit string indicating the CRU construct in the RU allocation subfield. For example, as illustrated in (a) to (c) of FIG. 16, different bit strings corresponding to respective types need to be allocated in the RU allocation subfield, each type of 60 MHz, 120 MHz, and 240 MHz CRUs may be classified into four types. Specifically, in order to signal 60 MHz CRU Type 1, 11 bits, such as xxx 0000 y3y2y1y0, need to be indicated via the RU allocation subfield, and in order to signal 60 MHz CRU Type 3, a bit string of xxx 0010 y3y2y1y0 may be indicated via the RU allocation subfield. The configuration of specific allocation bits, such as xxx, zzz, ttt, 0000, 0001, 0010, and 0011, in (a) to (c) of FIG. 16 may be changed, and is an example using a specific value for understanding. Accordingly, the present disclosure is not limited to these bit values and may be variously changed. That is, a bit configuration shown in the RU allocation subfield may have to be changed according to a type as well as a size of the CRU. Even for CRUs of the same BW (60 MHz, 120 MHz, and 240 MHz), different bit configurations may be configured for bits corresponding to xxx, zzz, and ttt according to a type.

In addition to the bit configuration indicating size and type information of the CRU, y3y2y1y0 may indicate the number of users (or UEs) (the number of user specific fields appearing corresponding to the RU allocation subfield of the CRU) allocated with the CRU, and since up to 16 STAs may be allocated concurrently using MU-MIMO, and 4 bits may be configured as in the present embodiment. However, only 3 bits (y2y1y0) or 2 bits (y1y0) may be shown in consideration that user specific fields are distributed to two or more content channels.

In (a) to (c) of FIG. 16, only 60 MHz, 120 MHz, and 240 MHz CRUs are expressed, but 100 MHz (20+80 MHz), 140 MHz (20+40+80 MHz), 180 MHz (20+80+80 or 20+160), 200 MHz (40+80+80 or 40+160), 220 MHz (20+40+80+80 or 20+40+160), 260 MHz (20+80+80+80 or 20+80+160), 280 MHz (40+80+80+80 or 40+80+160), and various types of combined CRUs may also have classified bandwidths and types so as to be respectively defined in the same way as the 60 MHz, 120 MHz, 240 MHz CRUs. However, it is preferable to selectively define and use only some CRU types among the CRUs in consideration of the implementation complexity and utility.

Table 4 below shows an example of CRUs allocated by the RU allocation subfield.

TABLE 4

| RU Allocation subfield (B10B9B8B7B6B5B4B3B2B1B0) | CRU Construct | BW(MHz) | Number of entries |
|---|---|---|---|
| 100 0011 y3y2y1y0 | 986 × 2 | 100 | 16 |
| 100 0100 y3y2y1y0 | 996 × 3 | 340 | 16 |
| 100 0101 y3y2y1y0 | 996 × 4 | 320 | 16 |
| 100 0110 y3y2y1y0 | 908 (1st 20 MHz excepted) | 60 (80-20) | 16 |
| 100 0111 y3y2y1y0 | 998 (2nd 20 MHz excepted) | | 16 |
| 100 1000 y3y2y1y0 | 996 (3rd 20 MHz excepted) | | 16 |
| 100 1001 y3y2y1y0 | 996 (4th 20 MHz excepted) | | 16 |
| 100 1010 y3y2y1y0 | 996 × 2 (1st 40 MHz e × cepted) | 120 (160-40) | 16 |
| 100 1011 y3y2y1y0 | 996 × 2 (2nd 40 MHz e × cepted) | | 16 |

TABLE 4-continued

| RU Allocation subfield (B10B9B8B7B6B5B4B3B2B1B0) | CRU Construct | BW(MHz) | Number of entries |
|---|---|---|---|
| 100 1100 y3y2y1y0 | 996 × 2 (3rd 40 MHz e × ceptec) | | 16 |
| 100 1101 y3y2y1y0 | 998 × 2 (4th 40 MHz e × cepted) | | 16 |
| 100 1110 y3y2y1y0 | 996 × 2 (1st 20 MHz e × cepted) | 140 (160-20) | 16 |
| 100 1111 y3y2y1y0 | 996 × 2 (2nd 20 MHz e × cepted) | | 16 |
| 101 0000 y3y2y1y0 | 996 × 2 (3rd 20 MHz e × cepted) | | 16 |
| 101 0001 y3y2y1y0 | 998 × 2 (4th 20 MHz e × cepted) | | 16 |
| 101 0010 y3y2y1y0 | 996 × 2 (5th 20 MHz e × cepted) | | 16 |
| 101 0011 y3y2y1y0 | 996 × 2 (6th 20 MHz e × cepted) | | 16 |
| 101 0100 y3y2y1y0 | 996 × 2 (7th 20 MHz e × cepted) | | 16 |
| 101 0101 y3y2y1y0 | 996 × 2 (8th 20 MHz e × cepted) | | 16 |
| 101 0110 y3y2y1y0 | 996 × 3 (1st 80 MHz e × cepted) | 160 (240- 80) | 16 |
| 101 0111 y3y2y1y0 | 996 × 3 (2nd 80 MHz e × cepted) | | 16 |
| 101 1000 y3y2y1y0 | 996 × 3 (3rd 80 MHz e × cepted) | | 16 |
| 101 1001 y3y2y1y0 | 996 × 3 (1st 40 MHz e × cepted) | 200 (240-40) | 16 |
| 101 1010 y3y2y1y0 | 996 × 3 (2nd 40 MHz e × cepted) | | 16 |
| 101 1011 y3y2y1y0 | 996 × 3 (3rd 40 MHz e × cepted) | | 16 |
| 101 1100 y3y2y1y0 | 996 × 3 (4th 40M4Hz e × cepted) | | 16 |
| 101 1101 y3y2y1y0 | 995 × 3 (5th 40 MHz e × cepted) | | 16 |
| 101 1110 y3y2y1y0 | 996 × 3 (6th 40 MHz e × cepted) | | 16 |
| 101 1111 y3y2y1y0 | 996 × 4 (1st 80 MHz e × cepted) | 240 (320-40) | 16 |
| 110 0000 y3y2y1y0 | 996 × 4 (2nd 80 MHz e × cepted) | | 16 |
| 110 0001 y3y2y1y0 | 996 × 4 (3rd 80 MHz e × cepted) | | 16 |
| 110 0010 y3y2y1y0 | 956 × 4 (4th 80 MHz e × cepted) | | 16 |
| 110 0011 y3y2y1y0 | 996 × 4 (1st 40 MHz e × cepted) | 280 (320-40) | 16 |
| 110 0100 y3y2y1y0 | 996 × 4 (2nd 40 MHz e × cepted) | | 16 |
| 110 0101 y3y2y1y0 | 996 × 4 (3rd 40 MHz e × cepted) | | 16 |
| 110 0110 y3y2y1y0 | 996 × 4 (4th 40 MHz e × cepted) | | 16 |
| 110 0111 y3y2y1y0 | 996 × 4 (5th 40 MHz e × cepted) | | 16 |
| 110 1000 y3y2y1y0 | 996 × 4 (6th 40 MHz e × cepted) | | 16 |
| 110 1001 y3y2y1y0 | 996 × 4 (7th 40 MHz e × cepted) | | 16 |
| 110 1010 y3y2y1y0 | 996 × 4 (8th 40 MHz e × cepted) | | 16 |
| 110 1011 y3y2y1y0 | Reserved | | 16 |
| 110 11y5y4y3y2y1y0 | Reserved | | 64 |
| 111 y7y6y5y4y3y2y1y0 | Reserved | | 208 |

In Table 4, "excepted" in CRU construct indicates RU(s), in which excluded 20 MHz, 40 MHz, and 80 MHz BW areas are allocated to other users, or frequency bands that are not used due to application of punctured preambles.

If the size of an RU or a CRU is 242-tone (20 MHz) or greater, y3y2y1y0 of the RU allocation subfield may indicate the number of users (Rx STAs) allocated with the corresponding RU. That is, if y3y2y1y0=0000, this indicates allocation to one user, and if y3y2y1y0=1111, this indicates that RUs or CRUs are allocated to 16 users.

(C)RU types of 100 MHz, 180 MHz, 220 MHz, 260 MHz, and 300 MHz which are bandwidths that are not shown in Table 4 may be allocated to a reception device via the RU allocation subfield in the same manner by using reserved entries. The bit configurations shown in Table 4 are for illustrative purposes and may be configured to any other values.

As another embodiment of the present disclosure, a bit value corresponding to a position of an excluded frequency band may be configured to "1" or "0". For example, if the size of the total bandwidth is 80 MHz including two 20 MHz and one 40 MHz, the transmission device may configure a band allocated to the reception device to a bit value of "1" and may configure an excluded or unallocated band to "0", so as to notify of the same to the UE via the RU allocation subfield of the RU allocation field. For example, in the case of type 1, bit string "011" of the RU allocation subfield of the RU allocation field may indicate that a lowest frequency band has been excluded and only the remaining bands have been allocated.

If a 10-bit or an 8 or 9-bit RU allocation subfield, other than an 11-bit construct, is used or in other cases, only some of the CRU constructs shown in Table 4 may be used.

Figure 17:
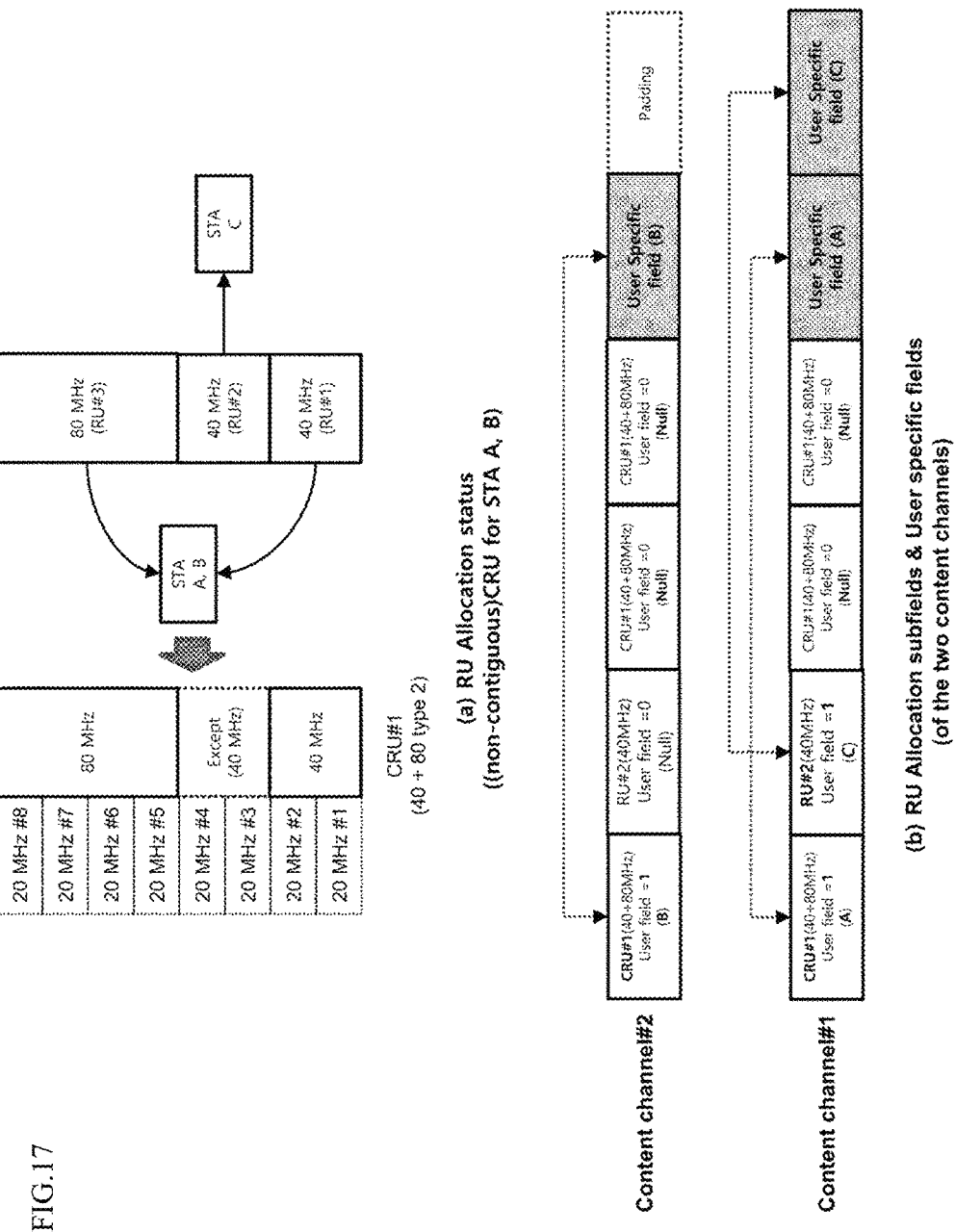
FIG. 17 illustrates a method of allocating multiple discontiguous RUs to a single terminal according to an embodiment of the present disclosure.

FIG. 17 illustrates a method of allocating multiple discontiguous RUs to a single UE according to an embodiment of the present disclosure.

(a) of FIG. 17 illustrates an embodiment in which CRU #1 (40+80 MHz type2) is used to allocate, at once, 40 MHz and 80 MHz (discontiguous) RUs allocated to STAs A and B, in the same RU allocation embodiment as that of FIG. 15. CRU #1 indicates both BWs and types of combined RUs, and STA A and STA B may thus identify, even if a user specific field is shown only once, all RUs allocated thereto in response to an RU allocation subfield of CRU #1.

As a result, the RU subfield and user specific fields illustrated in (b) of FIG. 16 may allocate two discontiguous RUs to STAs A and B, while a user specific field of each reception device (STA) is shown only once for RU allocation.

Even when more than two RUs are allocated to a single reception device, if a type and an RU combination to be allocated are configured to be a CRU, the user specific field of each STA may be included only once in an EHT-SIG field in the same manner as in the present embodiment.

In the present embodiment, EHT-SIG content channel #1 includes the RU construct and type of CRU #1 and the RU allocation subfield indicating that there is one reception device (corresponding user specific field) allocated with CRU #1, and subsequently includes the user specific field indicating STA-ID of STA A, so that CRU #1 is allocated to STA A.

EHT-SIG content channel #2 also includes the RU construct and type of CRU #1 and the RU allocation subfield indicating that there is one STA allocated with CRU #1, and subsequently includes the user specific field indicating STA-ID of STA B, so that CRU #2 is also allocated to STA B.

As described above, load balance may be achieved by causing the user specific fields of STA A and STA B allocated with CRU #1 to appear in different EHT-SIG content channels respectively, and it is also possible that STAs allocated with CRU #1 are signaled at once in EHT-SIG content channel #1 or #2.

RU #2 is shown in EHT-SIG content channels #1 and #2, and in EHT-SIG content channel #1, the RU allocation subfield indicates that one user specific field is shown, and then the user field including STA-ID of STA C is included so that RU #2 may be allocated to STA C.

The EHT-SIG content channel #2 includes the RU allocation subfield indicating RU #2, but 20 MHz (242-tone size) Null user is signaled so as to indicate that the user specific field corresponding to the corresponding RU is not included in the EHT-SIG content channel.

Subsequent to the RU allocation subfield indicating RU #2, an RU allocation subfield corresponding to the remaining BW occupied by CRU #1 is shown repeatedly, and all thereof are signaled as Null user and may not correspond to the user specific field.

<Method and Embodiment of Expressing RU Construct in BW Based on RU>

Based on the RU allocation and CRU usage embodiments described above, a problem in which a user specific field is unnecessarily repeated due to defining of a CRU that is a new RU may be effectively solved.

However, there is still a problem that the RU allocation subfield is unnecessarily repeated for a (C)RU of a size exceeding 20 MHz. This problem is caused by an RU expression method in which a scheme of indicating an RU construct of a total BW by using each RU allocation subfield enables indication to be made sequentially in units of 20 MHz from a lowest 20 MHz channel. In the aforementioned method of expressing an RU construct within a (PPDU) BW, an RU allocation subfield is shown for each 20 MHz channel, and the method may be thus referred to as a 20 MHz channel-based RU construct expression method.

As a configuration element of the present disclosure, an RU construct expression method is proposed, the method including indicating an RU construct within a total (PPDU) BW by using one RU allocation subfield per RU. In the proposed RU construct expression method, one RU allocation subfield is indicated per (C)RU regardless of a size of each RU and a positional relationship on a 20 MHz channel, so that the method may be referred to as an RU reference expression method.

When the proposed RU reference expression method is used, it is possible to solve a problem that, with respect to an RU having a size exceeding 20 MHz, an RU allocation subfield of the same RU is shown repeatedly in each EHT-SIG content channel. For example, a problem in which an RU having a size of 160 MHz is shown four times each in each of EHT-SIG content channels #1 and #2 may be solved.

Hereinafter, detailed descriptions will be provided.

Figure 18:
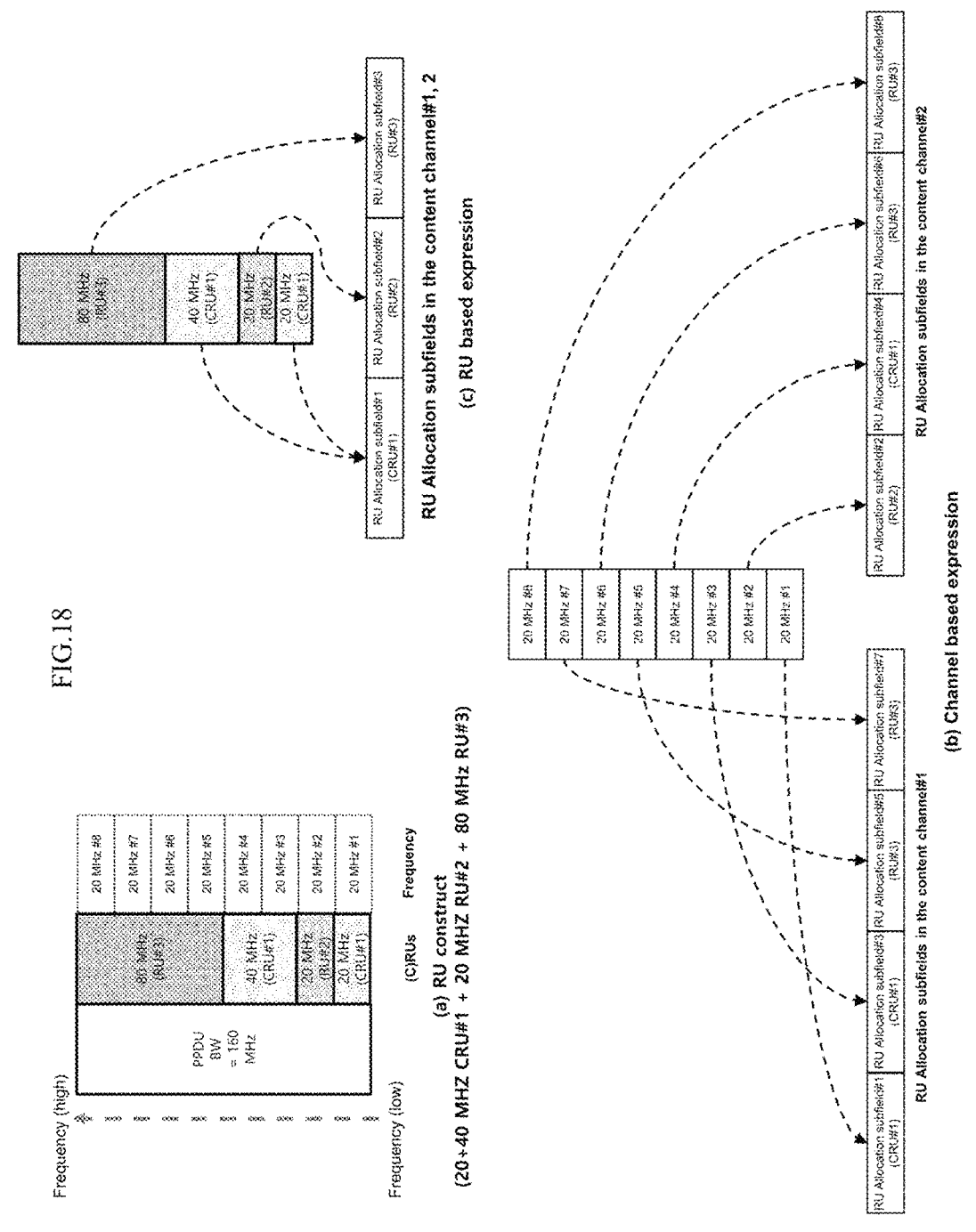

FIG. 18 illustrates configurations of RUs and a method of allocating constructed RUs to a UE through an RU allocation field according to an embodiment of the present disclosure.

Referring to FIG. 18, if a total bandwidth for transmitting a PPDU is 160 MHz, an RU construct may be indicated based on a 20 MHz channel via an RU allocation subfield.

(a) of FIG. 18 indicates a (C)RU type within a 160 MHz bandwidth. A 20 MHz RU of CRU #1 (20+40 MHz) is located in #1 that is a lowest channel based on the 20 MHz channel, and a 40 MHz RU is located over #3 and #4 based on the 20 MHz channel. RU #2 is located in #2 based on the 20 MHz channel, and RU #3 having a size of 80 MHz is located over 20 MHz channels #5, #6, #7, and #8.

(b) of FIG. 18 illustrates an embodiment of configuring an RU allocation subfield, based on a 20 MHz channel in order to indicate the RU construct within the 160 MHz BW illustrated in (a) of FIG. 18. In a sequence of 20 MHz channels, CRU #1 located at 20 MHz #1 is shown in a first RU allocation subfield of EHT-SIG content channel #1. The 20 MHz RU of CRU #1 located at the first 20 MHz #1 is not located at 20 MHz #2, and thus information of CRU #1 (RU allocation subfield) is not shown in EHT-SIG content channel #2.

RU #2 located at 20 MHz #2 is shown in the first RU allocation subfield of EHT-SIG content channel #2, and since RU #2 is not located in a frequency domain corresponding to EHT-SIG content channel #1, RU #2 information is not shown in EHT-SIG content channel #1.

As such, when 20 MHz RU(#2) exists, an RU allocation subfield of the corresponding RU is shown only in one EHT-SIG content channel, so that user specific fields cannot be distributed to EHT-SIG content channels, and all user specific fields need to be signaled in the EHT-SIG content channel in which the RU allocation subfield is shown.

Therefore, the 20 MHz channel-based RU construct expression method may, when an RU indicated only in one EHT-SIG content channel is allocated to multiple reception devices, make a user specific field of a specific EHT-SIG content channel excessively long so as to cause another inefficiency, such as causing padding of the other EHT-SIG content channel.

A 40 MHz RU among RUs constituting CRU #1 is located over 20 MHz #3 and #4, and thus the RU allocation subfield indicating CRU #1 is shown in a second RU allocation subfield in EHT-SIG content channels #1 and #2, and RU #3 is located over 20 MHz #5, #6, #7, and #8, and thus indication is made repeatedly in a third and a fourth RU allocation subfield in EHT-SIG content channels #1 and #2.

(c) of FIG. 18 illustrates an embodiment of configuring an RU allocation subfield, based on an RU in order to indicate the RU construct within the 160 MHz BW illustrated in (a) of FIG. 18. Corresponding RU allocation subfields are shown based on the RUs, and it is thus necessary to define a sequence in which the RU allocation subfields are shown.

In FIG. 18, RU allocation subfields are located in a sequence of (C)RUs having a lowest frequency component. Specifically, in the case of CRU #1, the 20 MHz RU among two RUs (e.g., 20 MHz and 40 MHz) constituting CRU #1 is located at a frequency lower than RU #2, and therefore the RU allocation subfield of CRU #1 is first shown (index determination is also the same).

Each RU allocation subfield signals a size and a construct of an RU starting from a lowest frequency domain among frequencies remaining without being signaled within the (PPDU) BW.

That is, after the RU allocation subfields corresponding to CRU #1 are shown, 20 MHz #2, #5, #6, #7, and #8 except for 20 MHz #1, #3, and #4 are the remaining frequencies without being signaled, and the RU allocation subfield of RU #2 shown second may refer to RU #2 being located at 20 MHz #2 20 MHz #2.

As described above, since the (C)RU signaled by each RU allocation subfield uses frequency domain information remaining after signaling by previous RU allocation subfields, all RU allocation subfields need to be included in each EHT-SIG content channel.

As such, it may be considered that signaling overhead increases as each EHT-SIG content channel includes all the RU allocation subfields for all (C)RUs within a BW. However, for signaling overhead of the RU allocation subfield, similar overhead may be maintained or the overhead may be even reduced as a result of the present embodiment, by solving a problem that the RU allocation subfield is repeated.

Since all RU construct information within a (PPDU) BW may be identified in each EHT-SIG content channel, it is easy to more freely distribute user specific fields so as to match lengths between the EHT-SIG content channels.

Figure 19:
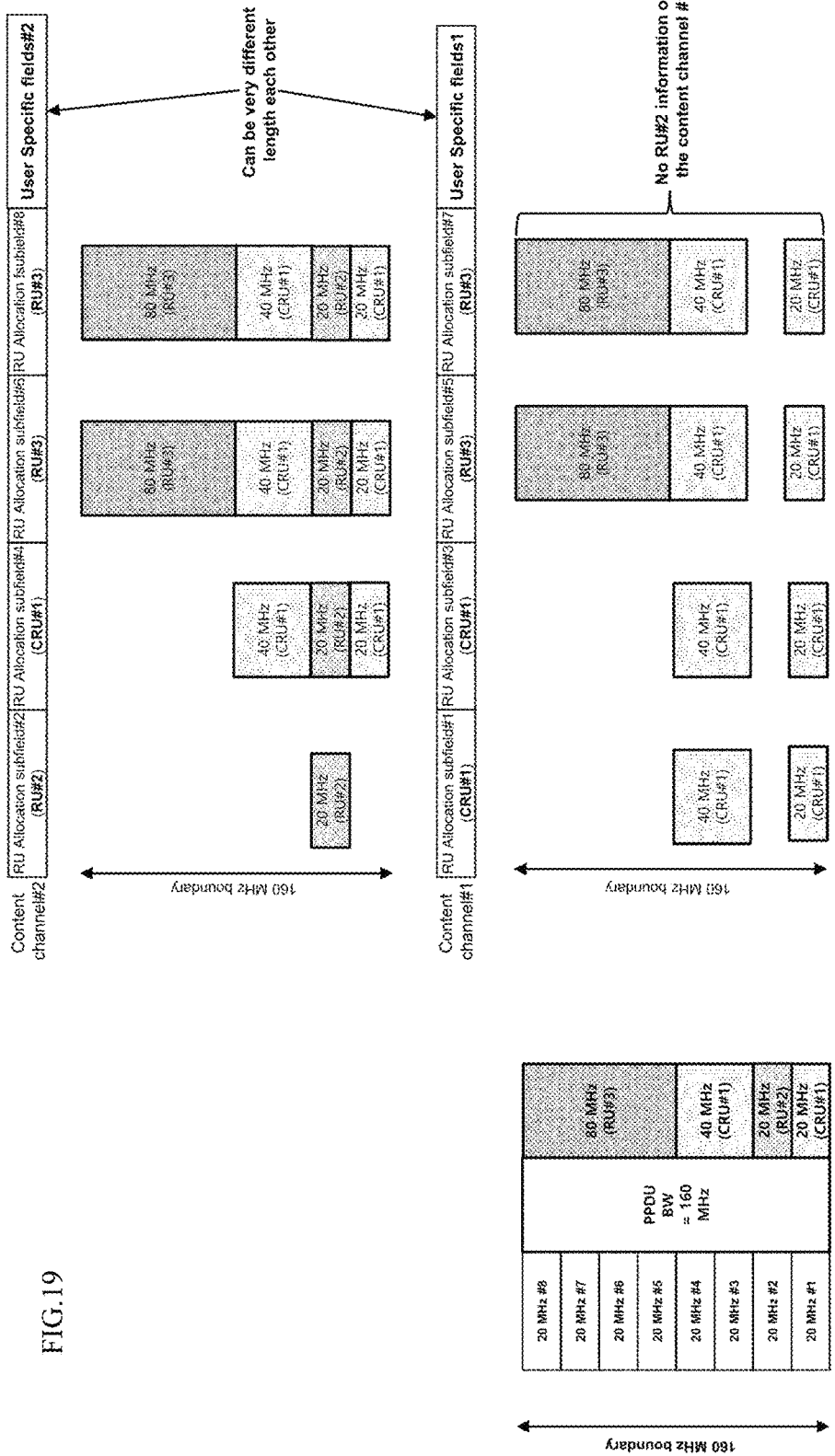
FIG. 19 illustrates a method for transmitting construct information on RUs to a terminal by using each of multiple content channels according to an embodiment of the present disclosure.
Figure 20:
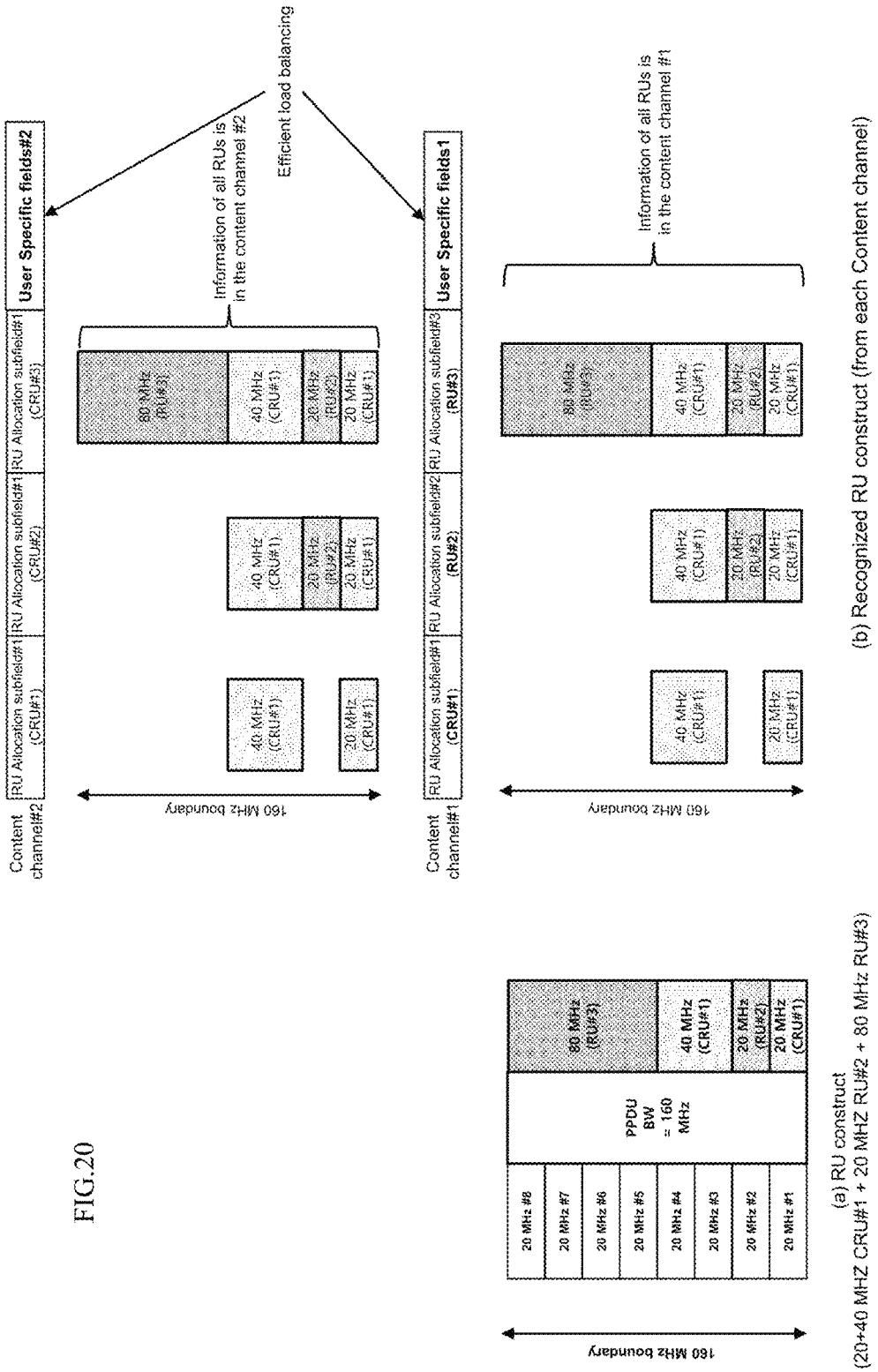
FIG. 20 illustrates another embodiment of a method for transmitting construct information on RUs to a terminal by using each of multiple content channels according to an embodiment of the present disclosure.

When RU allocation signaling is performed using the two types of RU construct signaling methods, RU construct information within a BW, which may be obtained from each EHT-SIG content channel, is compared through FIG. 19 and FIG. 20.

FIG. 19 illustrates a method for transmitting construct information on RUs to a UE by using each of multiple content channels according to an embodiment of the present disclosure.

Referring to FIG. 19, an RU may be allocated based on a 20 MHz channel, based on RU construct information included in an RU allocation subfield of each EHT-SIG content channel.

As illustrated in FIG. 19, in the present embodiment, in an RU construct for transmission of a PPDU, the same construct as that in (a) of FIG. 18 having a bandwidth of 160 MHz has been assumed, and a method of signaling an RU allocation subfield and a user specific field by using two EHT-SIG content channels may be used.

(a) of FIG. 19 illustrates an RU construct within a total BW recognized by a reception device by using RU allocation subfield information indicated in an RU allocation field of each of EHT-SIG content channels #1 and #2 and RU allocation subfield information acquired via each of the EHT-SIG content channels.

EHT-SIG content channel #1 transmits, using four RU allocation subfields, only information of RUs located in 20 MHz channels #1, #3, #5, and #7 among 20 MHz channels #1 to #8 existing in 160 MHz that is a PPDU BW. Therefore, in EHT-SIG content channel #1, CRU #1 located at 20 MHz #1 is transmitted in RU allocation subfield #1, and since CRU #1 is still located also at 20 MHz #3, CRU #2 is configured again in RU allocation subfield #2.

In the same way, since RU #3 having an 80 MHz size is shown in 20 MHz #5 and 20 MHz #7, both RU allocation subfields #3 and #4 allocate RU #3, and then a user specific field of an STA allocated with CRU #1 or RU #3 is transmitted in user specific fields #1 of EHT-SIG content channel #1. When RU allocation fields of respective EHT-SIG content channels #1 and #2 are configured in the above manner, it may be identified that EHT-SIG content channel #1 does not include the RU allocation subfield for RU #2.

When a specific STA identifies a user specific field including its own STA-ID in the user specific fields of EHT-SIG content channel #1 configured as described above, the STA identifies a size and a position of an RU allocated thereto by using RU allocation field information of EHT-SIG content channel #1 including the user specific field of the STA itself. To this end, the STA may identify the number (the number of allocated users) of user specific fields signaled by the respective RU allocation subfields present in EHT-SIG content channel #1, and may find RU allocation subfields corresponding to the user specific fields of the STA itself by comparing the order in which the user specific fields of the STA itself are shown in the user specific fields. For example, if a fifth user specific field among the user specific fields includes STA-ID of the reception device, RU allocation subfield #1 signals 3 users, and by identifying that RU allocation subfield #2 signals 0 user, and that RU allocation subfield #3 signals 2 users, the reception device may identify that the allocated UR is the RU shown in RU allocation subfield #3.

In consideration of the aforementioned procedure of identifying an allocated RU by an STA, it can be identified that the user specific field of the STA allocated with RU #2 which is not shown in EHT-SIG content channel #1 cannot be signaled via EHT-SIG content channel #1.

Therefore, the user specific fields of all STAs allocated with RU #2 of the embodiment may be shown only in EHT-SIG content channel #2, and if RU #2 is allocated to multiple STAs (in a case of being configured by small RUs, using MU-MIMO, or using some RUs (>=106-tone RU) among small RUs as MU-MIMO), user specific field s #2 of EHT-SIG content channel #2 has a relatively longer length than user specific field s #1.

FIG. 20 illustrates another embodiment of a method for transmitting construct information on RUs to a UE by using each of multiple content channels according to an embodiment of the present disclosure.

Referring to FIG. 20, by transmitting RU construct information obtainable through an EHT-SIG content channel, at least one RU may be allocated to a reception device, based on an RU.

For comparison, in FIG. 20, a bandwidth for transmitting a PPDU is 160 MHz in the same way as in FIG. 19, and a construct in 160 MHz is also the same as in FIG. 19. A method of signaling an RU allocation subfield and a user specific field by using two EHT-SIG content channels may be used.

(a) of FIG. 20 illustrates an RU construct within a total BW recognized by a reception device by using RU allocation subfield information indicated in an RU allocation field of each of EHT-SIG content channels #1 and #2 and RU allocation subfield information acquired via each of the EHT-SIG content channels.

EHT-SIG content channels #1 and #2 configured by an RU-based RU construct expression method include RU allocation subfields of all RUs in the total PPDU bandwidth, and therefore, for STAs allocated with any RU, a user specific field of each STA may be freely signaled in EHT-SIG content channel #1 or #2.

Therefore, even if multiple STAs are allocated to a specific RU, user specific fields may be effectively distributed for load balancing between EHT-SIG content channels.

Figure 21:
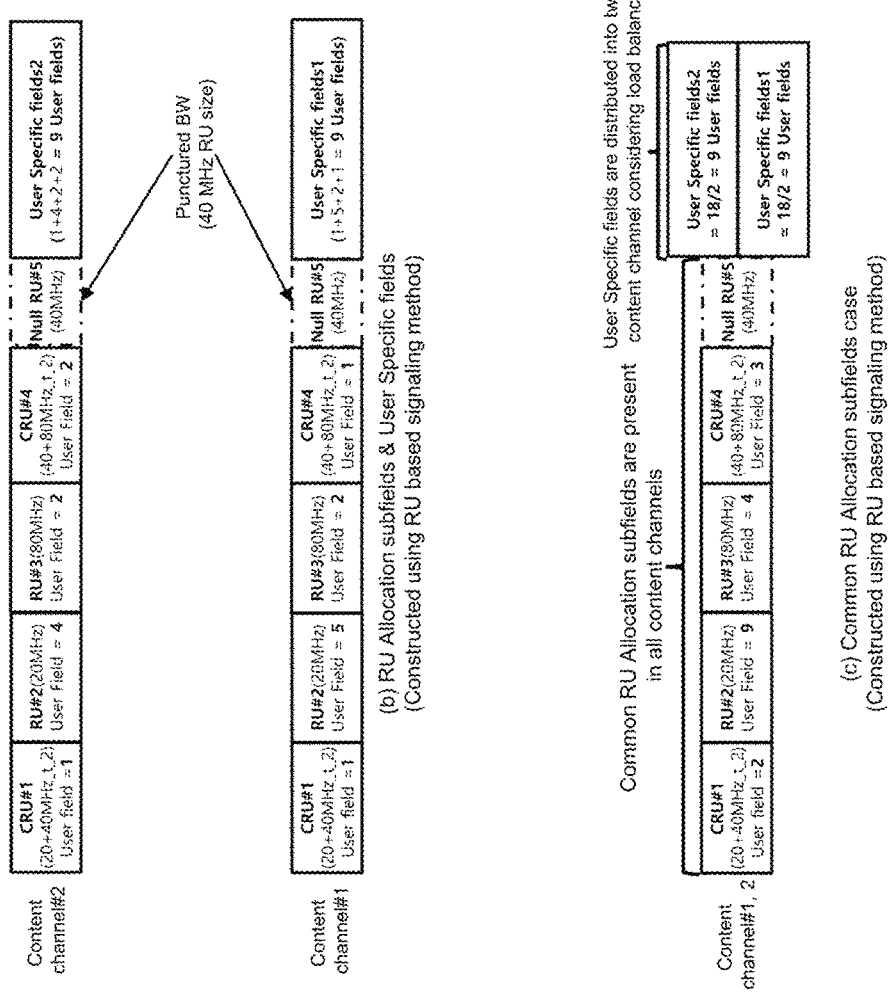
FIG. 21 illustrates an RU allocation method for a punctured bandwidth according to an embodiment of the present disclosure.
Figure 21:
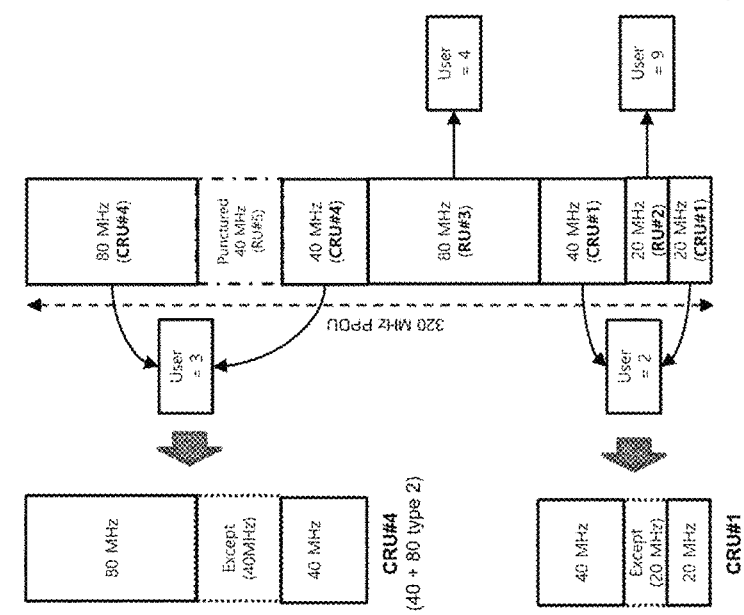

FIG. 21 illustrates an RU allocation method for a punctured bandwidth according to an embodiment of the present disclosure.

Referring to FIG. 21, puncturing applied within a total bandwidth (e.g., 320 MHz) for transmitting a PPDU may be indicated via an RU construct based on a CRU and an RU.

Specifically, (a) of FIG. 21 illustrates, an example of a signaling situation of the present embodiment, an RU construct of a 320 MHz PPDU BW and the number of reception devices (Rx users or Rx STAs) allocated with each RU. As described above, an index of each RU is shown in an RU allocation subfield from an RU having a lowest frequency component among the remaining frequency components. Therefore, a CRU, which has a part of 20 MHz RUs at the lowest frequency and has 20 MHz and 40 MHz shown in the form of type 2, is determined as CRU #1, and a 20 MHz RU located at the lowest frequency except for CRU #1 may be determined as RU #2. RU #3 and CRU #4 are also indexed in the same way as CRU #1 and RU #2, and a 40 MHz area that is not used because puncturing has been applied may be configured as a null RU having a size of 40 MHz and may be expressed as null RU #5.

(b) of FIG. 20 illustrates an embodiment of a configuration of each EHT-SIG content channel indicated for the method described in (a) of FIG. 20. RU allocation subfields are shown in each EHT-SIG content channel according to an index sequence of each (C)RU, and may be configured by appropriately distributing the number of users allocated with each (C)RU.

In an embodiment, RU allocation subfield #1 shown in EHT-SIG content channel #1 causes, by signaling (xxx 0001 0000 in the embodiment of FIG. 15) only one user among a total of two users allocated with CRU #1, only a user specific field of one user among the two users allocated with CRU #1 is shown in EHT-SIG content channel #1.

RU allocation subfield #1 shown in EHT-SIG content channel #2 signals a number (1=2−1) obtained by excluding the number (1) of users signaled by EHT-SIG content channel #1 from the number (2) of total users allocated with CRU #1, and causes EHT-SIG content channel #2 to show user specific fields of all users (among STAs scheduled for the corresponding PPDU), the user specific fields of which are not shown in EHT-SIG content channel #1, from among the user allocated with CRU #1.

The user specific fields of users allocated with each (C)RU in this manner are appropriately distributed to EHT-SIG content channel #1 or EHT-SIG content channel #2, so that the number of user specific fields shown in each EHT-SIG content channel is maintained equal.

(Null) RU #5 is a section, which is not used because puncturing has been applied, and thus indicates RU allocation subfield #5 referring to 40 MHz RU_Null User in all EHT-SIG content channels, as in the above embodiment. Since RU allocation subfield #5 shown in all EHT-SIG content channels are indicated as Null User, no user is allocated to a punctured BW corresponding to RU #5.

As described above, in the present embodiment, PPDU RU construct signaling and RU allocation signaling having a 320 MHz BW are completed by indicating 5 RU allocation subfields and 9 user specific fields in each EHT-SIG content channel.

As described above, the number of RU allocation subfields shown in each EHT-SIG content channel is not fixed due to the PPDU BW and varies according to the RU construct within the BW. Therefore, in the present embodiment, common fields of EHT-SIG or specific fields (Number of RU Allocation fields) of U-SIG signal that the number of RU allocation subfields is 5.

(c) of FIG. 21 illustrates a method of transmitting a common RU allocation subfield through each EHT-SIG content channel, by modifying the embodiment of (b) of FIG. 21. All (C)RUs signaled by respective RU allocation subfields are the same as descriptions in (b) of FIG. 21, but in a single RU allocation subfield shown in common in each EHT-SIG content channel, a total number of users allocated with a corresponding (C)RU is signaled.

Accordingly, when EHT-SIG is configured using two or more EHT-SIG content channels, the number of user specific fields to be shown in each EHT-SIG content channel may not be directly identified in RU allocation subfields shown in each EHT-SIG content channel. However, the number of user specific fields to be shown in each EHT-SIG content channel may be easily calculated using the total number of user specific fields which may be identified via the common RU allocation subfields, and an EHT-SIG content channel number (two in a case of including a type and EHT-SIG content channel #1 and #2) indicated in EHT-SIG.

In each EHT-SIG content channel, an equal number of user specific fields are shown in consideration of load balance, and when signaling is performed via two EHT-SIG content channels #1 and #2 as in the embodiment, the numbers of user specific fields shown in EHT-SIG content channels #1 and #2 may be the same (if a total number of users is an even number) or EHT-SIG content channel #1 may have one more user specific field (if the total number of users is an odd number).

Even if the number of EHT-SIG content channels is changed (one, or three or more), it may be seen that, if the total number of user specific fields identified in the common RU allocation subfield and the number (type) of EHT-SIG content channels are identified, the number of user specific fields to be shown in each EHT-SIG content channel may be simply calculated.

Since the common RU allocation subfield is shown in all EHT-SIG content channels, only user specific fields in EHT-SIG are shown with different values in EHT-SIG content channels #1 and #2, and the RU allocation subfield may be duplicated every 20 MHz.

In another embodiment of the Present disclosure, by expressing, as a CRU, a combination type of two small RUs, the two small RUs may be allocated to each user at once via one user specific field. That is, although FIG. 10 to FIG. 21 have been described with reference to a large RU, the method described with reference to FIG. 10 to FIG. 21 may also be applied to a small RU. That is, a combination between larger RUs may also be expressed as a combination of small RUs, and embodiments for large RUs may also be equally applied to small RUs.

Table 5 below shows an example of RU subfields for allocating combined Small RUs.

TABLE 5

Table 2

| RU Allocation Subfield (B10B9B8 B7B6B5B4 B3B2B1B0 ) | #1 | #2 | #3 | #4 | #5 | #6 | #7 | #8 | #9 | Number of entries |
|---|---|---|---|---|---|---|---|---|---|---|
| 000 0001 0000 | | | 26 | 26 | 26 | 26 | 26 | 26 | 78(26 + 52) | 1 |
| 000 0001 0001 | | | 26 | 26 | 52 | | 26 | 26 | 78(26 + 52) | 1 |
| 000 0001 0010 | | | 52 | | 26 | 26 | 26 | 26 | 78(26 + 52) | 1 |
| 000 0001 0011 | | | 52 | | 52 | | 26 | 26 | 78(26 + 52) | 1 |
| 000 0001 0100 | | | 26 | 26 | 78(52 + 26) | | 26 | 78(26 + 52) | | 1 |

TABLE 5-continued

Table 2

RU Allocation Subfield
(B10B9B8 B7B6B5B4 B3B2B1B0)

| RU Allocation Subfield (B10B9B8 B7B6B5B4 B3B2B1B0) | #1 | #2 | #3 | #4 | #5 | #6 | #7 | #8 | #9 | Number of entries |
|---|---|---|---|---|---|---|---|---|---|---|
| 000 0001 0101 | | 52 | 78(52 + 26) | 26 | 78(26 + 52) | | | | | 1 |
| 000 0001 0110 | 26 | 78(26 + 52) | 26 | 26 | 78(26 + 52) | | | | | 1 |
| 000 0001 0111 | 78(52 + 26) | 26 | 26 | 26 | 78(26 + 52) | | | | | 1 |
| 000 0001 1000 | 26 | 26 | 26 | 26 | 26 | 78(52 + 26) | 26 | | | 1 |
| 000 0001 1001 | 26 | 26 | 52 | 26 | 78(52 + 26) | 26 | | | | 1 |
| 000 0001 1010 | 52 | 26 | 26 | 26 | 78(52 + 26) | 26 | | | | 1 |
| 000 0001 1011 | 52 | 52 | 26 | 78(52 + 26) | 26 | | | | | 1 |
| 000 0001 1100 | 26 | 26 | 78(52 + 26) | 78(52 + 26) | 26 | | | | | 1 |
| 000 0001 1101 | 52 | 78(52 + 26) | 78(52 + 26) | 26 | | | | | | 1 |
| 000 0001 1110 | 26 | 78(26 + 52) | 26 | 78(52 + 26) | 26 | | | | | 1 |
| 000 0001 1111 | 78(52 + 26) | 26 | 26 | 78(52 + 26) | 26 | | | | | 1 |
| 000 0010 0000 | 26 | 26 | 26 | 26 | 78(26 + 52) | 26 | 26 | | | 1 |
| 000 0010 0001 | 26 | 26 | 26 | 26 | 78(26 + 52) | 52 | | | | 1 |
| 000 0010 0010 | 26 | 26 | 52 | 78(26 + 52) | 26 | 26 | | | | 1 |
| 000 0010 0011 | 26 | 26 | 52 | 78(26 + 52) | 52 | | | | | 1 |
| 000 0010 0100 | 52 | 26 | 26 | 78(26 + 52) | 26 | 26 | | | | 1 |
| 000 0010 0101 | 52 | 26 | 26 | 78(26 + 52) | 52 | | | | | 1 |
| 000 0010 0110 | 52 | 52 | 78(26 + 52) | 26 | 26 | | | | | 1 |
| 000 0010 0111 | 52 | 52 | 78(26 + 52) | 52 | | | | | | 1 |
| 000 0010 1000 | 26 | 26 | 78(52 + 26) | 26 | 26 | 26 | 26 | | | 1 |
| 000 0010 1001 | 26 | 26 | 78(52 + 26) | 26 | 26 | 52 | | | | 1 |
| 000 0010 1010 | 26 | 26 | 78(52 + 26) | 52 | 26 | 26 | | | | 1 |
| 000 0010 1011 | 26 | 26 | 78(52 + 26) | 52 | 52 | | | | | 1 |
| 000 0010 1100 | 52 | 78(52 + 26) | 26 | 26 | 26 | 26 | | | | 1 |
| 000 0010 1101 | 52 | 78(52 + 26) | 26 | 26 | 52 | | | | | 1 |
| 000 0010 1110 | 52 | 78(52 + 26) | 52 | 26 | 26 | | | | | 1 |
| 000 0010 1111 | 52 | 78(52 + 26) | 52 | 52 | | | | | | 1 |
| 000 0011 0000 | 26 | 78(26 + 52) | 26 | 26 | 26 | 26 | 26 | | | 1 |
| 000 0011 0001 | 26 | 78(26 + 52) | 26 | 26 | 26 | 52 | | | | 1 |
| 000 0011 0010 | 26 | 78(26 + 52) | 26 | 52 | 26 | 26 | | | | 1 |
| 000 0011 0011 | 26 | 78(26 + 52) | 26 | 52 | 52 | | | | | 1 |
| 000 0011 0100 | 26 | 78(26 + 52) | 26 | 26 | 78(26 + 52) | | | | | 1 |
| 000 0011 0101 | 26 | 78(26 + 52) | 26 | 78(52 + 26) | 26 | | | | | 1 |
| 000 0011 0110 | 26 | 78(26 + 52) | 78(26 + 52) | 26 | 26 | | | | | 1 |
| 000 0011 0111 | 26 | 78(26 + 52) | 78(26 + 52) | 52 | | | | | | 1 |
| 000 0011 1000 | 78(52 + 26) | 26 | 26 | 26 | 26 | 26 | 26 | | | 1 |
| 000 0011 1001 | 78(52 + 26) | 26 | 26 | 26 | 26 | 52 | | | | 1 |
| 000 0011 1010 | 78(52 + 26) | 26 | 26 | 52 | 26 | 26 | | | | 1 |
| 000 0011 1011 | 78(52 + 26) | 26 | 26 | 52 | 52 | | | | | 1 |
| 000 0011 1100 | 78(52 + 26) | 26 | 26 | 26 | 78(26 + 52) | | | | | 1 |
| 000 0011 1101 | 78(52 + 26) | 26 | 26 | 78(52 + 26) | 26 | | | | | 1 |
| 000 0011 1110 | 78(52 + 26) | 26 | 78(26 + 52) | 26 | 26 | | | | | 1 |
| 000 0011 1111 | 78(52 + 26) | 26 | 78(26 + 52) | 52 | | | | | | 1 |
| 000 1001 y3y2y1y0 | 26 | 26 | 78(52 + 26) | 106 | | | | | | 16 |
| 000 1010 y3y2y1y0 | 26 | 78(26 + 52) | 26 | 106 | | | | | | 16 |
| 000 1011 y3y2y1y0 | 78(52 + 26) | 26 | 26 | 106 | | | | | | 16 |
| 000 1100 y3y2y1y0 | 52 | 78(52 + 26) | 106 | | | | | | | 16 |
| 001 0010 y3y2y1y0 | 106 | 26 | 26 | 78(26 + 52) | | | | | | 16 |
| 001 0011 y3y2y1y0 | 106 | 26 | 78(52 + 26) | 26 | | | | | | 16 |
| 001 0100 y3y2y1y0 | 106 | 78(26 + 52) | 26 | 26 | | | | | | 16 |
| 001 0101 y3y2y1y0 | 106 | 78(26 + 52) | 52 | | | | | | | 16 |
| 001 0111 y3y2y1y0 | 26 | 26 | 26 | 26 | 132(106 + 26) | | | | | 16 |
| 001 1000 y3y2y1y0 | 26 | 26 | 52 | 132(106 + 26) | | | | | | 16 |
| 0010 1001 y3y2y1y0 | 52 | 26 | 26 | 132(106 + 26) | | | | | | 16 |
| 001 1010 y3y2y1y0 | 52 | 52 | 132(106 + 26) | | | | | | | 16 |
| 001 1011 y3y2y1y0 | 26 | 78(26 + 52) | 132(106 + 26) | | | | | | | 16 |
| 001 1100 y3y2y1y0 | 78(52 + 26) | 26 | 132(106 + 26) | | | | | | | 16 |
| 001 1101 y1y0z1z0 | 106 | 132(106 + 26) | | | | | | | | 16 |
| 001 1110 y3y2y1y0 | 132(106 + 26) | 26 | 26 | 26 | 26 | | | | | 16 |
| 001 1111 y3y2y1y0 | 132(106 + 26) | 26 | 26 | 52 | | | | | | 16 |
| 010 0000 y3y2y1y0 | 132(106 + 26) | 52 | 26 | 26 | | | | | | 16 |
| 010 0001 y3y2y1y0 | 132(106 + 26) | 52 | 52 | | | | | | | 16 |
| 010 0010 y3y2y1y0 | 132(106 + 26) | 26 | 78(26 + 52) | | | | | | | 16 |
| 010 0011 y3y2y1y0 | 132(106 + 26) | 78(52 + 26) | 26 | | | | | | | 16 |
| 010 0100 y3y2y1y0 | 132(106 + 26) | 106 | | | | | | | | 16 |

Among small RU constructs shown in Table 5, small CRUs with the bold 78-tone size and 132-tone size represent a combination of two contiguously located 26, 52, and 106-tone size RUs. The bit configurations shown in Table 2 are for illustration, wherein these bit configurations may be configured to any number of different values, and a 10-bit or an 8 or 9-bit RU allocation subfield may be configured instead of an 11-bit configuration, or a CRU of a small RU may be expressed in a type including only some of the CRU constructs.

<Implicit Large-CRU Allocation Scheme>

In another embodiment of the present disclosure, a CRU, in which large RUs are combined, may be allocated to a reception device by using an implicit method, rather than being directly allocated using a method such as a bit string of the RU allocation subfield.

In order to allocate a CRU by using an implicit method, the single RU allocation subfield is interpreted together with RUs indicated by adjacent RU allocation subfields so as to indicate, as a result, a combined type of large RUs, rather than directly indicating a large-CRU type through a bit string. In this case, the adjacent RU allocation subfields may allocate RUs of different sizes to overlapping frequency domains. Among the RUs indicated by the adjacent RU allocation subfields, a specific RU may correspond to a frequency domain including another RU. The large RU including another RU may be implicitly interpreted as indicating an RU in an area excluding small RUs included therein. In this case, an STA allocated with the large RU may identify other RU allocation subfield(s) existing in (corresponding to) the frequency domain of the large RU allocated thereto, and when small RU(s) included in the RU (frequency domain) allocated to the STA itself are shown in the other RU allocation subfield(s), the STA may identify that the remaining RUs except for the small RU correspond to the CRU actually allocated to the STA itself.

By implicitly signaling the CRU as described above, a combined large RU may be allocated without configuration of a separate RU allocation subfield for expressing the allocated CRU. As an effect of the present disclosure, multiple (combined) RUs may be allocated to an 11be STA while concurrently scheduling an 11ax STA and the 11be STA, by using the same construct of the RU allocation subfield as that of the RU allocation subfield of 11ax.

Figure 22:
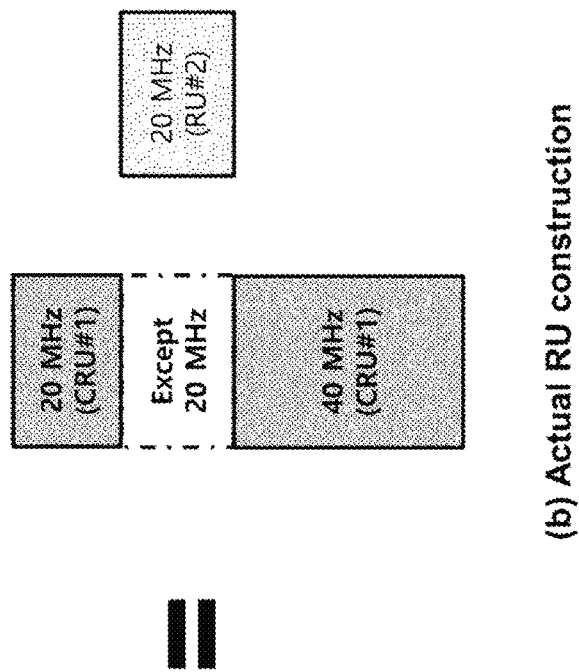
FIG. 22 illustrates a large-combined RU (CRU) in which multiple RUs are combined, according to an embodiment of the present disclosure.
Figure 22:
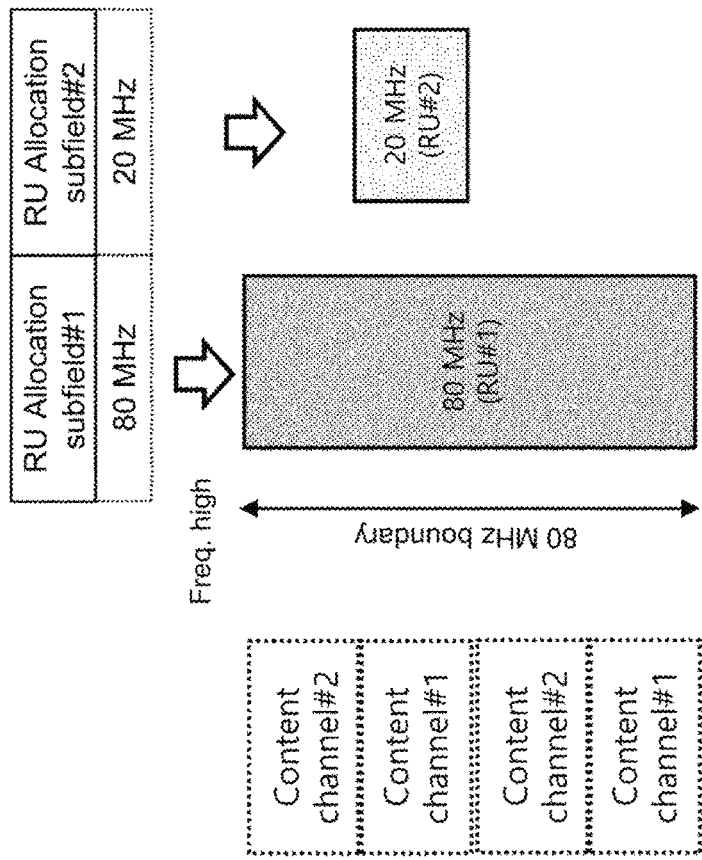

FIG. 22 illustrates a large-combined RU (CRU) in which multiple RUs are combined, according to an embodiment of the present disclosure.

Referring to FIG. 22, RUs on the frequency axis allocated via an RU allocation subfield may overlap.

Specifically, as illustrated in (a) of FIG. 22, two RU allocation subfields shown in EHT-SIG content channel #1 indicate an 80 MHz RU and a 20 MHz RU, respectively. Frequency components of 80 MHz RU #1 indicated by RU allocation subfield #1 and 20 MHz RU #2 indicated by RU allocation subfield #2 may overlap each other. In this case, RU allocation subfield #1 (80 MHz RU #1) including a larger frequency domain may be interpreted as CRU #1 including 40 MHz (+except 20 MHz)+20 MHz, based on. RU allocation subfield #2 indicating 20 MHz RU #2 included in the large frequency domain.

That is, as in RU allocation subfields #1 and #2, two or more RU allocation subfields signal different RUs within the same frequency band, so that a CRU may be implicitly allocated. In other words, two or more RU allocation subfields are signaled to RUs overlapping each other in the frequency domain in order to implicitly transfer a type in which two or more RUs are combined, so that a discontiguous type of larger RUs may be configured.

The STA allocated with CRU #1 needs to identify RU allocation subfield #1 in order to identify whether the RU allocated to the STA itself is an 80 MHz RU or a CRU existing within an 80 MHz RU boundary, and then decode RU allocation subfield #2.

In other words, when the RU allocation subfield allocated to a reception device itself indicates an RU of 40 MHz or higher, the reception device needs to decode another RU allocation subfield corresponding to a frequency domain of the indicated RU, thereby identifying a frequency domain excluded from the frequency area of the indicated RU. In this case, another RU allocation subfield that needs to be identified includes not only an EHT-SIG content channel in which an RU allocation subfield corresponding to its own RU, but also an RU allocation subfield of another EHT-SIG content channel.

That is, the reception device needs to identify an RU boundary thereof by identifying the RU allocation subfield corresponding to a user specific field including initial STA-ID of the reception device itself, and identify RU allocation subfields shown in accordance with the identified RU boundary, regardless of the EHT-SIG content channel. Thereafter, the reception device may finally identify that a (C)RU allocated thereto is a (C)RU obtained by excluding frequency components of RU(s) signaled by other RU allocation subfields within the identified RU boundary.

In this case, some of the other RU allocation subfields within the RU boundary that the reception device needs to identify may not be required to be decoded according to limitation on a (C)RU type that may be allocated to the STA.

Figure 23:
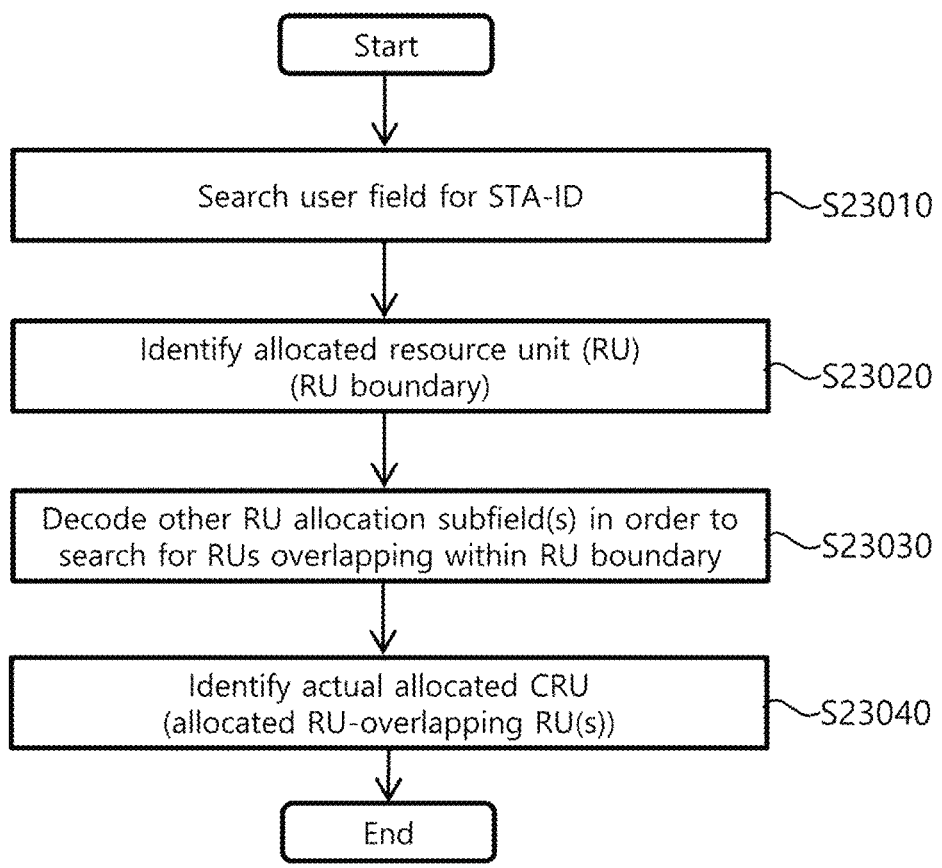
FIG. 23 is a flowchart illustrating a method for a terminal to recognize an RU allocated thereto according to an embodiment of the present disclosure.

FIG. 23 is a flowchart illustrating a method for a UE to recognize an RU allocated thereto according to an embodiment of the present disclosure.

Specifically, a non-AP STA which is a reception device receives a preamble of a PPDU from an AP STA.

The non-AP STA may decode a U-SIG field of a preamble, and may acquire information (e.g., information on whether an RU allocation field is compressed, the number of EHT-SIG content channels of an EHT-SIG field, etc.) for decoding of an EHT-SIG field by decoding the U-SIG field. Then, the non-AP STA decodes and identifies the EHT-SIG field included in the preamble so as to identify whether there is an RU allocated to the non-AP STA itself. In this case, the RU allocated to the non-AP STA may be identified by decoding a user specific field of an EHT-SIG content channel of the EHT-SIG field. That is, the non-AP STA identifies, in operation S22010, whether its own STA-ID is included in the user specific field, and identifies, in operation S22020, an RU corresponding to the STA-ID via an RU allocation subfield, so as to recognize whether the RU has been allocated to itself, based on the STA-ID corresponding to an RU construct. That is, the non-AP STA may recognize the size, construct, and position information of the RU allocated to itself, and/or a combination type when RUs are combined and allocated, based on the STA-ID and the RU allocation subfield corresponding to the STA-ID of the non-AP STA.

That is, when the non-AP STA identifies the user specific field including its own STA-ID, the non-AP STA may decode the RU allocation subfield included in the EHT-SIG content channel in which the user specific field is shown, and may identify the number of user specific fields corresponding to each RU allocation subfield, thereby finding the RU allocation subfield corresponding to the user specific field of the non-AP STA itself.

In this case, when the RU allocation subfield corresponding to its own user specific field indicates an RU exceeding 40 MHz, the non-AP STA may recognize that the RU allocated thereto may be a CRU. Therefore, the non-AP STA needs to identify an actual type of the RU allocated thereto.

To this end, the non-AP STA may decode, in operation S22030, one or more other RU allocation subfields (regardless of the EHT-SIG content channel) corresponding to the frequency domain of the RU (exceeding 40 MHz) allocated to the non-AP STA itself.

When the RU allocated to the STA is 80 MHz, one RU allocation subfield shown in the same EHT-SIG content channel and two RU allocation subfields shown in response to a corresponding 80 MHz band in another EHT-SIG content channel may be decoding targets (when the RU allocation subfield corresponding to each 20 MHz is signaled using two content channels).

If it is identified (by the other RU allocation subfields) that an RU smaller than the RU allocated to the non-AP STA exists within a frequency range of the allocated RU, the non-AP STA may identify, in operation S22040, that the allocated RU is actually a CRU from which a range of the small RU has been excluded.

Figure 24:
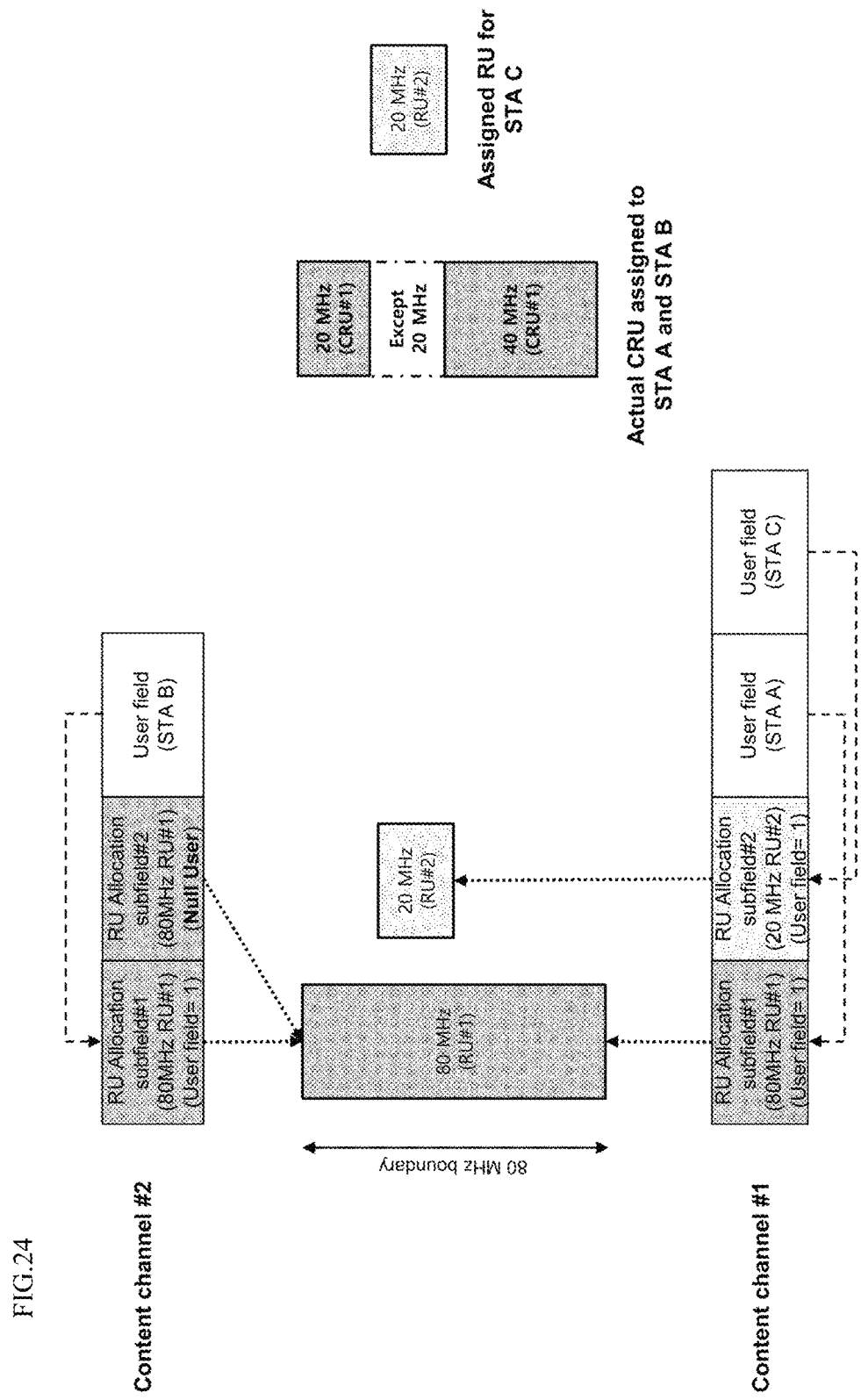
FIG. 24 illustrates signaling for large-CRU allocation according to an embodiment of the present disclosure.

FIG. 24 illustrates signaling for large-CRU allocation according to an embodiment of the present disclosure.

Referring to FIG. 24, RU allocation subfield #1 in each of EHT-SIG content channels #1 and #2 signals 80 MHz RU #1 while concurrently signaling that one STA has been allocated to each 80 MHz RU #1. In this case, STA A having identified that its own RU is 80 MHz RU #1 via EHT-SIG content channel #1 may decode RU allocation subfields #1 and #2 of EHT-STG content channel #2 and RU allocation subfield #2 of EHT-SIG content channel #1 in order to identify whether 80 MHz RU #1 allocated to STA A itself is an actual 80 MHz RU or a CRU having an 80 MHz boundary. By decoding RU allocation subfield #2 of EHT-SIG content channel #1, STA A may identify that 20 MHz RU #2 is located in the middle of the 80 MHz RU allocated to STA A, and therefore, STA A may recognize that 80 MHz RU #1 allocated thereto via RU allocation subfield #1 is actually CRU #1 of 40+20 MHz.

In addition, STA B identifies that an RU allocated thereto is 80 MHz RU #1 via RU allocation subfield #1 of EHT-SIG content channel #2, and then may decode RU allocation subfield #2 of EHT-SIG content channel #2 and RU allocation subfields #1 and #2 of EHT-SIG content channel #1 in order to identify whether the RU allocated to STA B itself is an 80 MHz RU or a CRU having an 80 MHz boundary. By decoding RU allocation subfield #2 of EHT-SIG content channel #1, STA B may identify that 20 MHz RU #2 is located in the middle of the 80 MHz RU allocated to STA B, and therefore, STA B may recognize that 80 MHz RU #1 allocated thereto via RU allocation subfield #1 is actually CRU #1 of 40+20 MHz.

In this case, excluded 20 MHz in the middle of the 80 MHz RU may be allocated to other STA(s) by being used as a 20 MHz RU or a small-RU or may be a punctured 20 MHz channel, as in the present embodiment. That is, in FIG. 24, even if the 20 MHz RU is signaled as Null User, the STA needs to interpret the 80 MHz RU as a 40+20 MHz CRU in which an overlapping 20 MHz RU has been excluded (punctured).

Figure 25:
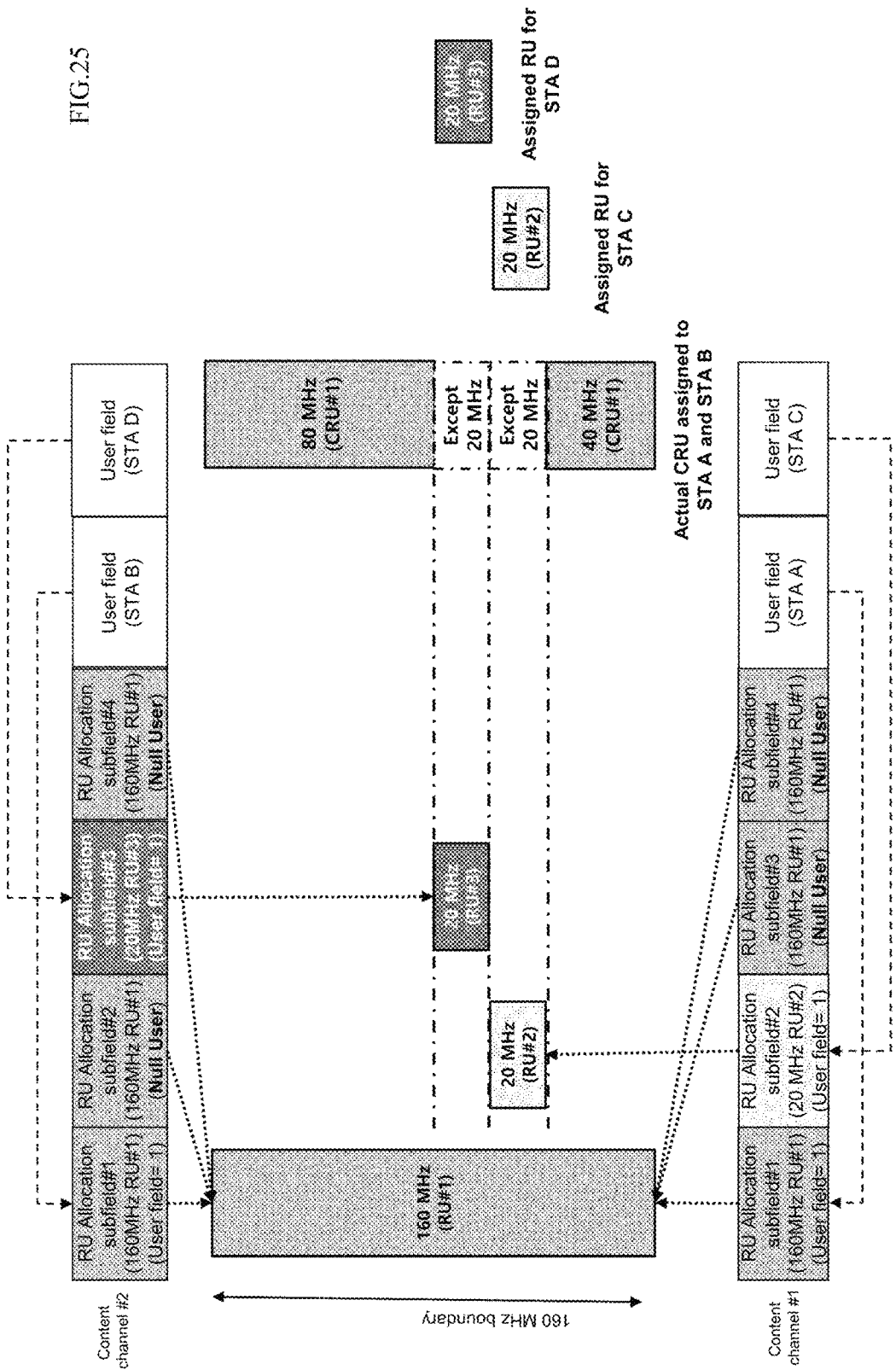
FIG. 25 illustrates another example of signaling for large-CRU allocation according to an embodiment of the present disclosure.

FIG. 25 illustrates another example of signaling for large-CRU allocation according to an embodiment of the present disclosure.

Referring to FIG. 25, a large-CRU type may be identified using two or more overlapping RUs. The present embodiment is an embodiment of allocating an 80+40 MHz CRU of a 160 MHz RU boundary in the same way as the aforementioned embodiment of large-CRU allocation in FIG. 23. In this case, STA A and STA B allocated with 160 MHz RU #1 may decode other RU allocation subfields in order to identify whether RUs thereof are actual 160 MHz RUs or CRUs of a 160 MHz boundary, respectively. As a result, the existence of 20 MHz RU #2 and RU #3 may be identified within the boundary of 160 MHz RU #1, and STA A and STA B may identify that the RUs allocated thereto are 40+80 MHz CRU #1.

<Implicit Small-CRU Allocation Scheme>

In another embodiment of the present disclosure, an implicit allocation method may be used to allocate a small-CRU to an STA. For implicit allocation of a small-CRU, allowable small-CRUs can be combined only within a 20 MHz boundary, and combination constraints of small RUs, in which the combined small RUs have contiguous positions, may be used.

According to an embodiment of the present disclosure, the combined small RUs may be allocated to an STA by using a (small) RU allocation subfield of 11ax as it is. In this case, when the RU allocation subfield of 11ax is used as it is for combined small RU signaling, a 11ax UE and a 11be UE may be concurrently signaled using the same RU allocation subfield, in which case the 11be UE may be allocated with the combined small RU.

For understanding, a method of small RU signaling of 11ax will be described. RU allocation subfields indicating a small RU construct in a 20 MHz band signal the size and arrangement of small RUs located in the 20 MHz band, and as many user fields as the number of the signaled small RUs are shown correspondingly. In this case, STAs having STA-IDs indicated in respective user fields are sequentially allocated with the small RUs located in the 20 MHz band according to a sequence in which the respective user fields are shown.

Figure 26:
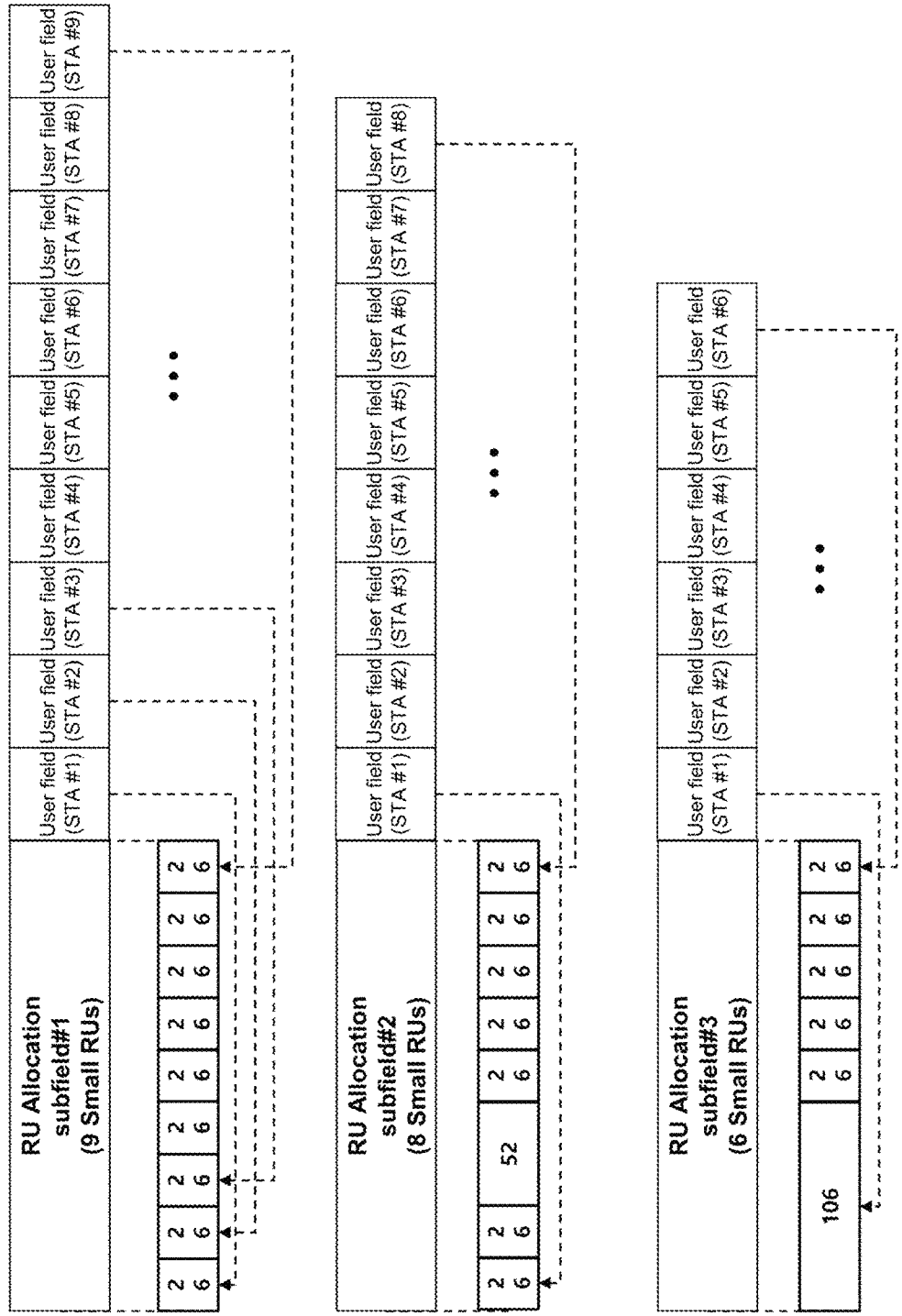
FIG. 26 illustrates a method of RU allocation through an RU allocation subfield according to an embodiment of the present disclosure.

FIG. 26 illustrates a method of RU allocation through an RU allocation subfield according to an embodiment of the present disclosure.

Referring to FIG. 26, RU allocation subfield #1 indicates 20 MHz including nine 26-tone size RUs, and nine user fields corresponding to the respective 26-tone RUs are shown so that STAs 1 to 9 are allocated with the 26-tone RUs, respectively.

RU allocation subfield #2 indicates 20 MHz including seven 26-tone RUs and one 52-tone RU, and may specifically indicate that the 52-tone RU is a third small RU from the front. Accordingly, among user fields correspondingly shown in RU allocation subfield #2, a field of STA #3 corresponds to the 52-tone RU, and as a result, STA #3 is allocated with the 52-tone RU. Based on the description of RU allocation subfield #2, it may be intuitively understood that RU allocation subfield #3 and 6 user fields corresponding thereto allocate one 106-tone RU and five 26-tone RUs, respectively.

Figure 27:
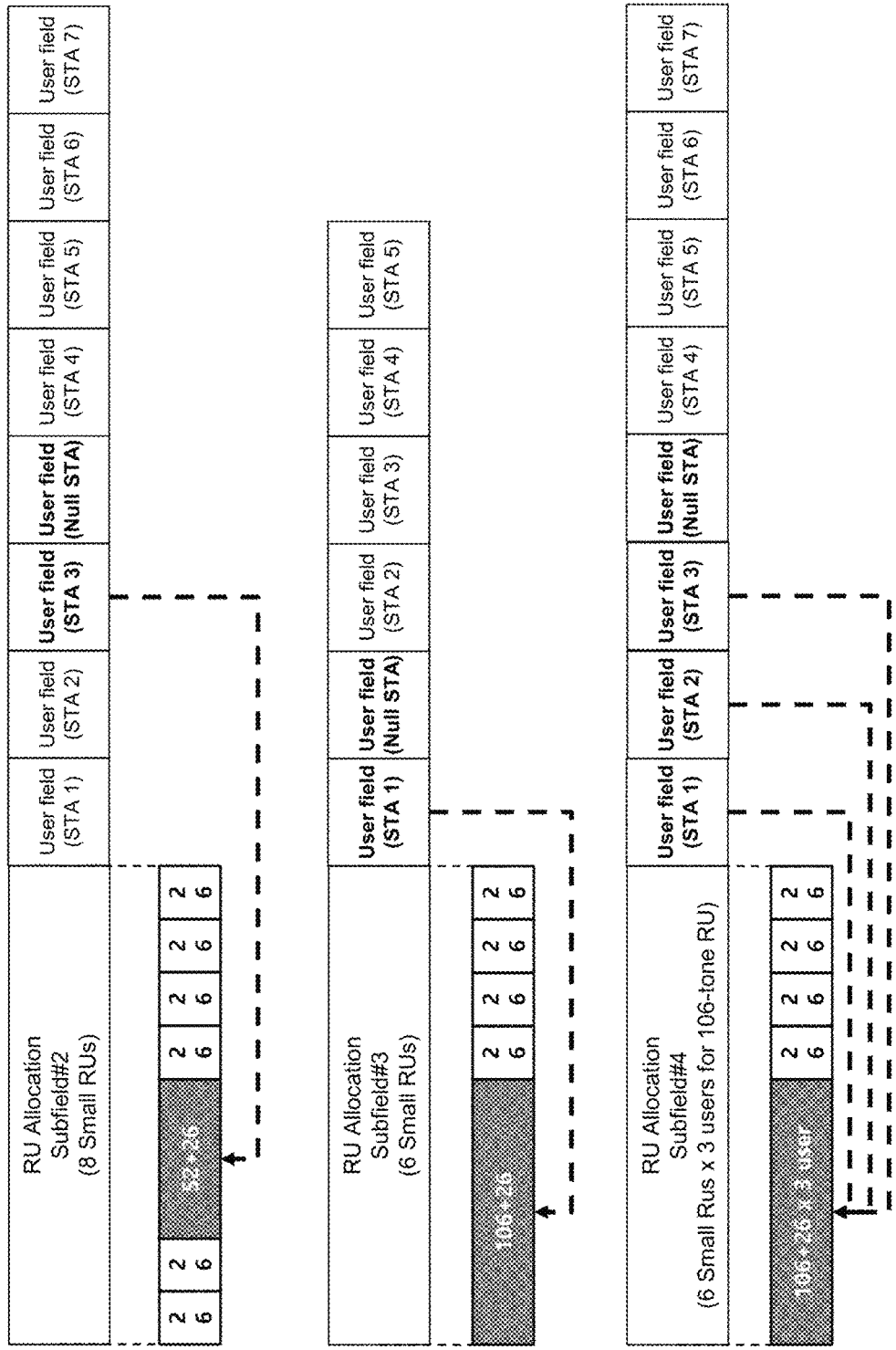
FIG. 27 illustrates a method of combining and allocating multiple RUs through an RU allocation subfield according to an embodiment of the present disclosure.

FIG. 27 illustrates a method of combining and allocating multiple RUs through an RU allocation subfield according to an embodiment of the present disclosure.

Referring to FIG. 27, combined small RUs in which small RUs are combined may be allocated to an STA by using an RU allocation subfield for small RU allocation.

As described above, RU allocation subfields indicating small RUs indicate fixed small RU constructs and positions, and respective user fields determine RUs, which are to be allocated to STAs of the respective user fields, from among small RUs signaled by the RU allocation subfields according to a sequence of showing.

As illustrated in FIG. 27, a user field corresponding to one of contiguous two small RUs to be combined and allocated is configured to Null STA, so that the contiguous two small RUs may be allocated at once to an STA indicated in the remaining one user field. The user field configured to Null STA may be a user field corresponding to an RU shown second among the combined small RUs. In other words, when a specific user field is configured to Null STA, a small RU corresponding to the user field configured to Null STA may also be allocated to an STA indicated in an immediately previous user field.

In this case, the two contiguous small RUs may be one of a 26+52-tone RU and a 26+106-tone RU. As illustrated in FIG. 27, in the same way as RU allocation subfield #2 in FIG. 26, RU allocation subfield #2 may indicate that seven 26-tone RUs and one 52-tone RU are located in a 20 MHz band, and may signal that the 52-tone RU is shown third.

In this case, the 52-tone RU is allocated to STA 3 via a third user field, and Null STA is signaled in a fourth user field, so that a 26-tone RU corresponding to the fourth user field may also allocated to STA 3.

After each STA identifies a small RU allocated thereto, if a small RU having a size combinable with the small RU of the STA itself is shown immediately next to the STA (right side in FIG. 26), the STA needs to identify whether a user field signaled subsequent to its own user field is a user field configured to Null STA. When the user field shown subsequent to the user field of the STA itself is configured to Null STA, the STA may recognize that the small RU corresponding to its own user field and the small RU corresponding to the user field configured to Null STA are combined so as to be allocated to the STA itself.

As illustrated in RU allocation subfield #4 of FIG. 27, it may be identified that, when a combined small RU of an 106+26-tone RU is multiplexed and allocated to three STAs of STA 1, STA 2, and STA 3, user fields of respective STAs 1, 2, and 3 are shown in sequence, and the user field configured to Null STA is located subsequently, so that the 106+26 RU is multiplexed and allocated to previously shown STAs 1, 2, and 3. In this case, STA 1 needs to identify, instead of identifying a user field located immediately to the right of its own user field, whether a (fourth) user field located to the right by the number (three) of STAs, in which the RU corresponding to its own user field is multiplexed, is a user field configured to Null STA. That is, in cases of embodiments using RU allocation subfields #2 and #3, instead of identifying a user field located immediately to the right of a user field of an STA, since there is one STA (the STA itself) allocated to an RU corresponding to its own user field, it may be understood that a user field located to the right by one is identified to be a user field configured to Null STA.

<RU Allocation Subfield Construct for Implicit CRU Allocation>

As described above, it has been noted that combined large RUs may implicitly signal a CRU via whether RUs indicated by respective RU allocation subfields overlap, and that combined small RUs may allocate small RUs to an STA by configuring, to Null STA, a user field corresponding to one of combined RUs.

In the case of small RUs, combined small RUs may be signaled using only the RU allocation subfield defined in 11ax, but in the case of large RUs, several large RUs may be defined to allocate RUs exceeding 80 MHz to a single reception device. Large RUs (996×2, 996×3-tone RUs) that need to be added may be added using an index remaining as "reserved" in the RU allocation subfield of 11ax.

Table 6 below shows an example of RU allocation subfields for allocating an RU exceeding 80 MHz.

TABLE 6

Table 3

| RU Allocation subfield 8 bits (B7B6B5B4 B3B2B1B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | | 52 | 1 |
| 2 | 26 | 26 | 26 | 26 | 26 | | 52 | 26 | 26 | 1 |
| 3 | 26 | 26 | 26 | 26 | 26 | | 52 | | 52 | 1 |
| 4 | 26 | 26 | | 52 | 26 | 26 | 26 | 26 | 26 | 1 |
| 5 | 26 | 26 | | 52 | 26 | 26 | 26 | | 52 | 1 |
| 6 | 26 | 26 | | 52 | 26 | | 52 | 26 | 26 | 1 |
| 7 | 26 | 26 | | 52 | 26 | | 52 | | 52 | 1 |
| 8 | | 52 | 26 | 26 | 26 | 26 | 26 | 26 | 26 | 1 |
| 9 | | 52 | 26 | 26 | 26 | 26 | 26 | | 52 | 1 |
| 10 | | 52 | 26 | 26 | 26 | | 52 | 26 | 26 | 1 |
| 11 | | 52 | 26 | 26 | 26 | | 52 | | 52 | 1 |
| 12 | | 52 | | 52 | 26 | 26 | 26 | 26 | 26 | 1 |
| 13 | | 52 | | 52 | 26 | 26 | 26 | | 52 | 1 |
| 14 | | 52 | | 52 | 26 | | 52 | 26 | 26 | 1 |
| 15 | | 52 | | 52 | 26 | | 52 | | 52 | 1 |
| 16-23 | | 52 | | 52 | — | | 106 | | | 8 |
| 24-31 | | | 106 | | — | | 52 | | 52 | 8 |
| 32-39 | 26 | 26 | 26 | 26 | 26 | | 106 | | | 8 |
| 40-47 | 26 | 26 | | 52 | 26 | | 106 | | | 8 |
| 48-55 | | 52 | 26 | 26 | 26 | | 106 | | | 8 |
| 56-63 | | 52 | | 52 | 26 | | 106 | | | 8 |
| 64-71 | | | 106 | | 26 | 26 | 26 | 26 | 26 | 8 |
| 72-79 | | | 106 | | 26 | 26 | 26 | | 52 | 8 |
| 80-87 | | | 106 | | 26 | | 52 | 26 | 26 | 8 |
| 88-95 | | | 106 | | 26 | | 52 | | 52 | 8 |
| 96-111 | | | 106 | | — | | 106 | | | 16 |
| 112 | | 52 | | 52 | — | | 52 | | 52 | 1 |
| 113 | | | | 242-tone RU empty (with zero users) | | | | | | 1 |
| 114 | | | | 484-tone RU: constibues zero User fields to the User Specific field in the same content channel as this RU Allocation subfield | | | | | | 1 |
| 115 | | | | 996-tone RU: constibues zero User fields to the User Specific field in the same content channel as this RU Allocation subfield | | | | | | 1 |
| 116 | | | | 996 × 2-tone RU: constibues zero User fields to the User Specific field in the same content channel as this RU Allocation subfield | | | | | | 1 |
| 117 | | | | 996 × 3-tone RU: constibues zero User fields to the User Specific field in the same content channel as this RU Allocation subfield | | | | | | 1 |

TABLE 6-continued

Table 3

| RU Allocation subfield 8 bits (B7B6B5B4 B3B2B1B0) | #1 | #2 | #3 | #4 | #5 | #6 | #7 | #8 | #9 | Number of entries |
|---|---|---|---|---|---|---|---|---|---|---|
| 118-119 | | | | | Reserved | | | | | 2 |
| 120-127 | | | | | Reserved | | | | | 8 |
| 128-191 | | | 106 | | 26 | | 106 | | | 64 |
| 192-199 | | | | | 242 | | | | | 8 |
| 200-207 | | | | | 484 | | | | | 8 |
| 208-215 | | | | | 996 | | | | | 8 |
| 216-231 | | | | | 996 × 2 | | | | | 16 |
| 232-247 | | | | | 996 × 3 | | | | | 16 |
| 248-255 | | | | | Reserved | | | | | 8 |

In table 6, an 11ax STA cannot recognize RU allocation subfield indices indicating the added 996×2-tone RU and 996×3-tone RU, and therefore, when the added indices are shown in the RU allocation subfields, the 11ax STA cannot identify the number of user fields corresponding to the added indices during searching for an RU allocation subfield corresponding to the user field of the STA itself, so that RU allocation signaling may fail.

Therefore, it is preferable that RU allocation subfields of the added large RUs are signaled after all the RU allocation subfields allocated to the 11ax STA are shown, and the RU allocation subfields of the added large RUs may be indicated by being disposed at the rearmost in a sequence of the RU allocation subfields.

Hereinafter, a configuration of an EHT-SIG content channel will be described.

<EHT-SIG Content Channel>

Figure 28:
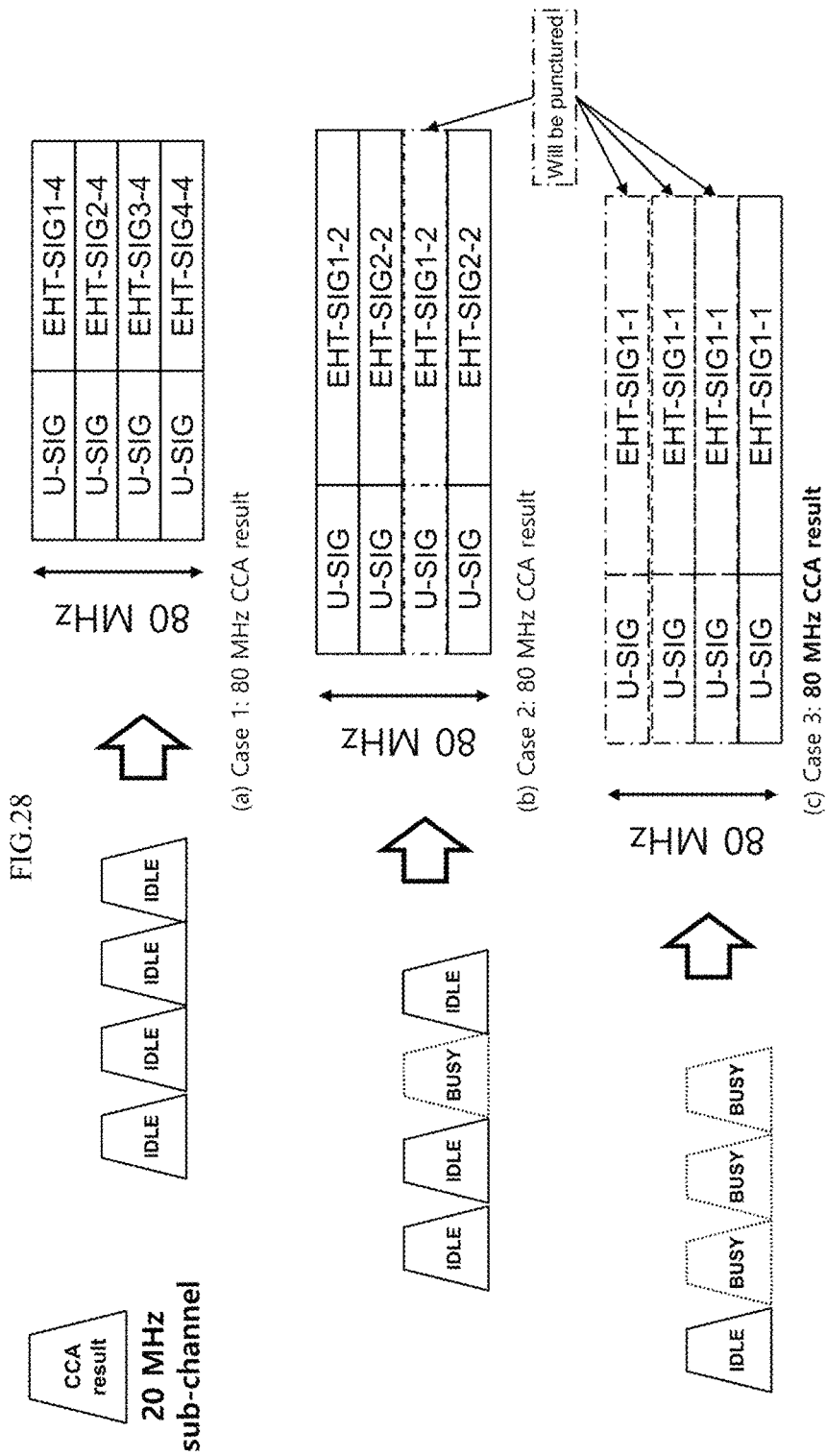
FIG. 28 illustrates a method of configuring a content channel for an EHT field according to an embodiment of the present disclosure.

FIG. 28 illustrates a method of configuring a content channel for an EHT field according to an embodiment of the present disclosure.

Referring to FIG. 28, multiple EHT-SIG content channels may exist for an EHT-SIG field and may be configured differently according to a segment of a bandwidth.

Specifically, multiple EHT-SIG content channels of an EHT-SIG field may be configured according to a bandwidth, and depending on whether segments are the same, an EHT-SIG content channel of the same configuration may be repeatedly transmitted, or EHT-SIG content channels of different configurations may be transmitted. As described above, the number of EHT-SIG content channels may be one or multiple so as to be different in each segment.

For example, (a) of FIG. 28 illustrates, an example of a configuration of an EHT-SIG field, which may be used when all of four 20 MHz sub-channels constituting an 80 MHz bandwidth are idle. Since all four 20 MHz sub-channels existing within the 80 MHz bandwidth are idle, a PPDU including 80 MHz may be transmitted by repeating PHY headers of L-STF, L-LTF, L-SIG, RL-SIG, U-SIG, and EHT-SIG four times at 20 MHz of 80 MHz.

An AP may differentiate the EHT-SIG content channel for the EHT-SIG field that is shown repeatedly four times at 80 MHz into EHT-SIG1-4, EHT-SIG2-4, EHT-SIG3-4, and EHT-SIG4-4 so as to transmit the same in respective 20 MHz sub-channels. Respective four EHT-SIGx-4 content channels may quarter some RU allocation-related information (user field, etc.) to be transmitted in the EHT-SIG content channel, so as to transmit each of the same. As such, instead of repeating the same EHT-SIG content channel four times at 80 MHz, EHT-SIGx-4 obtained by quartering the EHT-SIG field are transmitted in 20 MHz sub-channels, respectively, so that signaling overhead for EHT-SIG transmission is reduced. The four EHT-SIGx-4 may include different user fields.

That is, information to be transmitted via the EHT-SIG field may be divided into four so as to be transmitted to a reception device through respective EHT-SIG content channels. Accordingly, although the field configurations of respective EHT-SIG content channels are the same, information (or values) included in respective fields may be different.

(b) of FIG. 28 illustrates an example of a configuration of an EHT-SIG content channel for an EHT-SIG field when one sub-channel among four 20 MHz sub-channels existing within 80 MHz is occupied (busy). If, among the four 20 MHz sub-channels existing within 80 MHz, a specific channel is determined to be busy as a result of CCA, the AP may need to perform configuration using puncturing so that the PPDU is not transmitted in the specific channel determined to be busy.

Therefore, as in (a) of FIG. 28, when the AP configures EHT-SIGx-4 by quartering the EHT-SIG field, some information may not be transmitted to the reception device due to puncturing of a 20 MHz channel, through which some of EHT-SIGx-4 had to be signaled, so that transmission of the EHT-SIG field may fail.

Therefore, in order to prevent the transmission failure of the EHT-SIG field, when all the four types of EHT-SIGx-4 cannot be transmitted on an 80 MHz channel, the EHT-SIG field may be divided into two, instead of 4, so as to transmit EHT-SIGx-2. An EHT-SIG1-2 content channel and an EHT2-SIG2-2 content channel may be configured to include user fields having different information (or values). As such, since the EHT-STG is divided into only two EHT-SIGx-2 content channels, each of the EHT-SIGx-2 content channels may be repeatedly transmitted twice through four 20 MHz sub-channels existing within 80 MHz. However, due to puncturing, some 20 MHz sub-channels, are punctured, and therefore, as a result, EHT-SIGx-1 is shown once or twice in an 80 MHz BW, and EHT-SIGx-2 may be transmitted one or twice.

The method described in (b) of FIG. 28 is applicable to not only when one sub-channel is in busy, but also when two 20 MHz sub-channels are busy. In this case, each of EHT-SIG1-2 and EHT-SIG2-2 may be signaled once to each of two non-punctured 20 MHz sub-channels within the 80 MHz BW. In a case of channels, on which the same EHT-SIGx-2 (EHT-SIG1-2 or EHT-SIG2-2) need to be transmitted on two 20 MHz sub-channels identified to be busy, only one of the two types of EHT-SIGx-2 may be transmitted twice, in which case, as illustrated in (c) of FIG.

28, only the EHT-SIG1-1 content channel is configured, so as to transmit all RU allocation information of the STA while including the same in the EHT-SIG1-1 content channel.

(c) of FIG. 28 illustrates an embodiment of a method of configuring an EHT-SIC content channel for transmitting an EHT-SIG field when three of four 20 MHz sub-channels existing in an 80 MHz BW are determined to be busy. Even when two of four 20 MHz sub-channels existing in the 80 MHz BW are busy, the EHT-SIG configuration described in (c) of FIG. 28 may be followed depending on positions of the 20 MHz sub-channels determined to be busy.

As illustrated in (c) of FIG. 28, when three of four 20 MHz sub-channels existing in the 80 MHz BW are determined to be busy, a channel that is shown after puncturing is applied to 80 MHz is only one 20 MHz channel. Therefore, when the EHT-SIG field is divided into four or two, such as EHT-SIGx-4 or EHT-SIGx-2, as in the aforementioned embodiment, all information required to be transmitted in the EHT-SIG field may not be transmitted. Accordingly, in order to transmit all information of the EHT-SIG field by using only one 20 MHz sub-channel, the EHT-SIG field may be configured by only a single-type EHT-SIG1-1 content channel so as to be transmitted.

In this case, EHT-SIG1-1 content channel may be shown repeatedly twice only in some of cases in which two 20 MHz sub-channels in 80 MHz are identified to be busy (a case in which it is determined that only two odd-numbered 20 MHz sub-channels are busy or only two even-numbered 20 MHz sub-channels are busy in the 80 MHz band).

However, as an exception, in the U-SIG field before the EHT-SIG field is shown, even when two even-numbered or two odd-numbered 20 MHz sub-channels within 80 MHz are busy, signaling information included in the EHT-SIG field may be divided into two EHT-SIGx-2 and transmitted, wherein information related to positions, at which the EHT-SIG1-2 content channel and the EHT-SIG2-2 content channel are transmitted within 80 MHz, is included and transmitted in the sub-channels.

Referring to the cases of changing the configurations of the EHT-SIG content channels of the EHT-SIG field, described in (a) to (c) of FIG. 28, the AP may determine the number of EHT-SIG content channels to be obtained by dividing information of the EHT-SIG field, according to a CCA result of the 80 MHz channel, and then may perform signaling using 4 EHT-SIGx-4, 2 EHT-SIGx-2, or EHT-SIG1-1. In this case, the information related to the position and the EHT-SIG type shown in 80 MHz may be signaled via an SIG-structure field of the U-SIG described above.

That is, a non-AP STA may identify, based on information on at least one specific field included in the U-SIG field, the number of EHT-SIG content channels including information of the EHT-SIG field, and based on this, the non-AP STA may receive the EHT-SIG content channels so as to acquire information of the EHT-SIG field. Specifically, the non-AP STA may recognize a format (e.g., whether OFDMA is applied, etc.) of the transmitted PPDU, based on at least one specific field included in the U-SIG field, and may identify the number of EHT-SIG content channels through which information of the EHT-SIG field is transmitted, based on the recognized PPDU format. Accordingly, the non-AP STA may receive the PPDU by receiving EHT-SIG content channels, based on the format of the PPDU identified by at least one specific field of the U-SIG field.

For example, in four EHT-SIGx-4 content channels, quartered user fields required to be signaled in the EHT-SIG field may be shown, wherein quartering may be a result of division into four according to positions of RUs allocated to respective users (non-AP STAs), rather than referring to arithmetic ¼. For example, when a total of 8 user fields are required to be included in the EHT-SIG field, each of four EHT-SIG content channels may include two user fields, but the four EHT-SIG content channels may include one user field, three user fields, two user fields, and two user fields, respectively.

The user fields divided into four according to the positions of RUs may be distributed, in consideration of load balancing, among EHT-SIGx-4 in which RU allocation subfields for a specific RU from among four EHT-SIGx-4 are shown in a duplicated manner.

In an embodiment, when the RU allocation subfields of the 80 MHz RU are shown in all four EHT-SIGx-4, the user fields allocated to the 80 MHz RU may be freely distributed to the four EHT-SIGx-4, and when a 40 MHz RU is shown only in EHT-SIG3-4 and EHT-SIG4-4, user fields allocated to the 40 MHz RU may be freely distributed only to EHT-SIG3-4 and EHT-SIG4-4.

Figure 29:
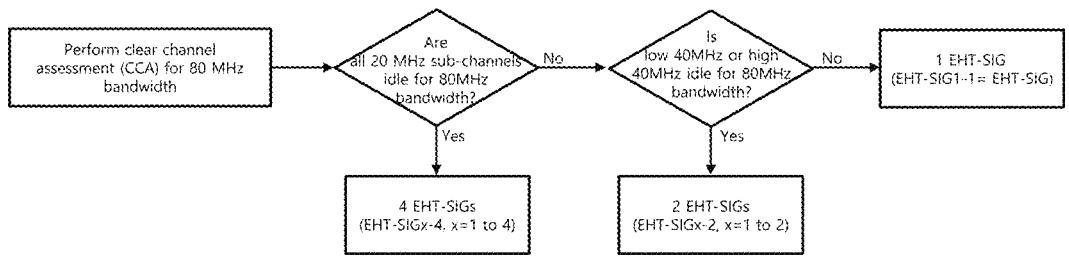
FIG. 29 illustrates a method of determining the number of channels configuring an EHT-SIG, based on clear channel assessment (CCA) according to an embodiment of the present disclosure.

FIG. 29 illustrates a method of determining the number of channels configuring an EHT-SIG, based on clear channel assessment (CCA) according to an embodiment of the present disclosure.

Referring to FIG. 29, an AP may divide fields to be included in an EHT-SIG field into multiple EHT-SIG content channels and transmit the same according to a result of CCA.

Specifically, the AP may determine whether each sub-channel is idle or busy, by performing clear channel assessment (CCA) on a bandwidth for PPDU transmission. For example, if a signal strength measured in a specific sub-channel is less than a preconfigured threshold value, the specific channel may be determined to be idle.

If all four 20 MHz sub-channels existing within 80 MHz are idle, four EHT-SIG content channels for the EHT-SIG field may be transmitted at 80 MHz even after puncturing is applied, so that the EHT-SIG field may be configured by being divided into four EHT-SIGx-4 con Lent channels. In this case, since contents of the EHT-SIG field are divided into four EHT-SIGx-4 content channels, each EHT-SIGx-4 may be expected to have a relatively small signaling overhead.

If, as a result of CCA, only two EHT-SIGx-2 content channels are transmittable because all sub-channels are not idle and only low 40 MHz or high 40 MHz are idle so that only two 20 MHz sub-channels are idle, signaling overhead may become greater compared to a case of transmitting four EHT-SIGx-4 content channels. However, since only two EHT-SIGx-2 content channels are configured, even if the EHT-SIG content channels are not transmitted through some 20 MHz sub-channels after puncturing, the reception device may receive all RU allocation information through 80 MHz.

However, if, as a result of CCA, all sub-channels are not idle and only one 20 MHz sub-channel is idle, so that only one EHT-SIG1-1 content channel is transmittable, the EHT-SIG1-1 content channel may include all contents of the EHT-SIG field.

<Adaptive Signaling Field Configuration Embodiments Applied to Various PPDU BWs>

Figure 30:
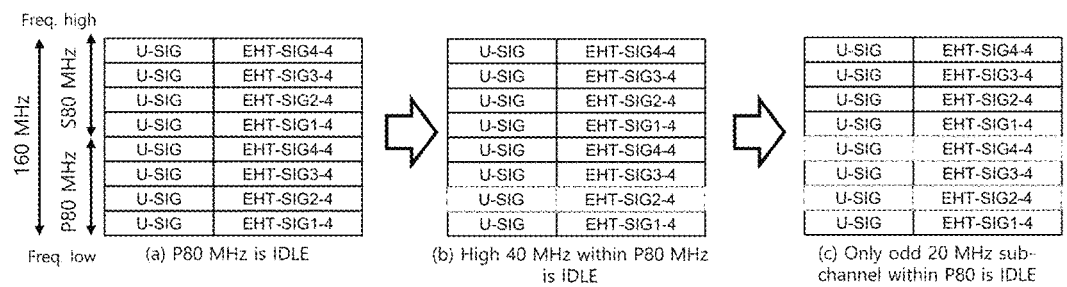
FIG. 30 and FIG. 31 illustrate adaptive signaling field configurations according to bandwidths according to an embodiment of the present disclosure.
Figure 31:
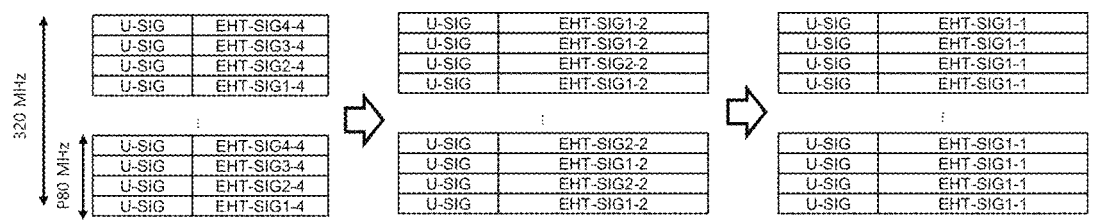

FIG. 30 and FIG. 31 illustrate adaptive signaling field configurations according to bandwidths according to an embodiment of the present disclosure.

FIG. 30 illustrates an embodiment of an adaptive signaling field configuration applied to a 160 MHz PPDU.

A 160 MHz PPDU may include eight 20 MHz sub-channels when puncturing is not applied. In this case, a configuration of a signaling field may be determined according to CCA results of four sub-channels included in primary 80 MHz which is a primary channel in the 160 MHz PPDU.

The configuration of the signaling field determined by primary 80 MHz may be repeatedly shown in the same configuration also in a 20 MHz sub-channel existing in secondary 80 MHz.

In the case of FIG. 30, EHT-SIGx-4, EHT-SIGx-2, and EHT1-1 indicate a case of signaling RU allocation information of 160 MHz which is a total bandwidth in which the PPDU is transmitted. In another embodiment, signaling of primary 80 MHz and secondary 80 MHz may be performed separately, and the signaling field may be configured separately for each 80 MHz.

For example, when the total bandwidth in which the PPDU is transmitted is divided into multiple segments, a non-AP STA that receives the PPDU in a segment including primary 20 MHz, which is a primary channel, may receive a preamble including a U-SIG field at primary 20 MHz. However, in a case of a non-AP STA that receives the PPDU in a segment including no primary channel, a channel for receiving the preamble is not specified, and when puncturing of 20 MHz is applied, there occurs a problem that the preamble cannot be received in the punctured channel. Accordingly, in this case, the preamble may be transmitted in a preconfigured 20 MHz sub-channel of a separate secondary segment.

That is, the preamble (e.g., the U-SIG field included in the preamble) may be received through a preconfigured specific sub-channel of a segment in which a reception device receives the PPDU. In this case, the specific sub-channel for the reception device to receive the preamble is a preconfigured and agreed channel between the reception device and a transmission device, and may be indicated by the transmission device via a frame, such as a control frame (e.g., a management frame), or may be determined via negotiation between the transmission device and the reception device. Alternatively, the reception device may receive and identify all sub-channels of secondary 80 MHz.

Referring to (a) of FIG. 30, when all primary 80 MHz (P80 MHz) is idle, contents of the EHT-SIG field are divided into four EHT-SIGx-4 (x=1, 2, 3, 4) content channels and transmitted, and EHT-SIGx-4 is duplicated and shown in secondary 80 MHz (S80 MHz). In this case, the same U-SIG field is repeatedly transmitted in eight 20 MHz sub-channels existing at 160 MHz, and there may be a 20 MHz sub-channel that is punctured and thus transmits no PPDU from among four 20 MHz sub-channels included in S80 MHz.

When the signaling field is configured as illustrated in (a) of FIG. 30, even if the reception device receives only EHT-SIGx-4 content channels signaled through primary 80 MHz, an RU construct of the total 160 MHz and allocation information of each RU may be identified.

Referring to (b) of FIG. 30, when some 20 MHz channels existing in P80 MHz are busy and high 40 MHz is idle, the contents of the EHT-SIG field are divided into two EHT-SIGx-2 (x=1, 2) content channels so as to be signaled. In this case, the two EHT-SIGx-2 content channels are shown repeatedly every 40 MHz over 160 MHz that is the total PPDU BW. A 20 MHz sub-channel, which has been punctured and no PPDU is thus transmitted, may exist in the total PPDU BW.

In this case, the reception device may identify the RU construct of the total 160 MHz and allocation information of each RU by receiving only two EHT-SIGx-2 shown in high 40 MHz of P80 MHz.

Referring to (c) of FIG. 30, illustrated is a case in which two even-numbered 20 MHz sub-channels based on frequency components from among 20 MHz channels existing in P80 MHz are busy, and all contents of the EHT-SIG are signaled through the EHT-SIG1-1 content channel. The EHT-SIG1-1 is shown repeatedly in all non-punctured 20 MHz sub-channels in 160 MHz that is the total PPDU BW.

In this case, the reception device may identify the RU construct of the total 160 MHz and allocation information of each RU even by receiving only EHT-SIG1-1 shown at P20 MHz.

FIG. 31 illustrates an embodiment of an adaptive signaling field configuration applied to a 320 MHz PPDU. An embodiment of 320 MHz may be intuitively understood via an embodiment of a 160 MHz PPDU of FIG. 30, and therefore a detailed description thereof will be omitted. However, an EHT-SIGx-4 content channel, an EHT-SIGx-2 content channel, and an EHT-SIG1-1 content channel include an RU construct of a 320 MHz that is a total bandwidth and RU allocation information, and are shown at 80 MHz, 40 MHz, and 20 MHz in 320 MHz, respectively.

<Embodiment of Adaptive Signaling Field Configuration Applied to Each Segment of PPDU>

The adaptive signaling field configurations described in FIG. 30 and FIG. 31 may be individually applied in each segment within a bandwidth, instead of a total bandwidth in which a PPDU is transmitted. As an embodiment, for the PPDU having 320 MHz, 320 MHz may be classified into respective four 80 MHz segments, and signaling for the respective 80 MHz segments may be performed. Different U-SIG field and EHT-SIG field configurations may be shown in the 80 MHz segments.

That is, a U-SIG field value and a field configuration of an EHT-SIG field may be individually configured for each segment, and therefore the U-SIG field value and the field configuration of an EHT-SIG content channel for the EHT-SIG field, which are included in each segment, may be different. That is, in the same segment, a value of a U-SIG field and an EHT-SIG content channel of an EHT-SIG field, which have the same index, have the same field configuration, but even if a value of a U-SIG field and an EHT-SIG content channel of an EHT-SIG field, which are included in different segments, have the same index, field configurations thereof may be different from each other. In this case, the U-SIG field configurations are the same even if segments are changed.

Therefore, when the 320 MHz PPDU is divided into four 80 MHz segments, U-SIG(1), U-SIG(2), U-SIG(3), and U-SIG(4) may be shown in the respective 80 MHz segments. Contents of the EHT-SIG field may also be divided for each 80 MHz segment. Accordingly, EHT-SIG(1), EHT-SIG(2), EHT-SIG(3), and EHT-SIG(4) content channels having different contents may be shown in respective 80 MHz segments. EHT-SIG(x) (x=1, 2, 3, 4) shown in each 80 MHz may be divided into EHT-SIG(x)-y-4 (y=1, 2, 3, 4) so as to be shown once in respective 20 MHz sub-channels in an x-th 80 MHz segment, may be divided into EHT-SIG(x)-y-2 (y=1, 2), each of which is shown twice in the four 20 MHz sub-channels of the 80 MHz segment, or may include only EHT-SIG(x)-1-1 so as to be repeatedly shown in the 20 MHz sub-channels of the x-th 80 MHz segment. In this case, the number of times each EHT-SIG(x)-y-z is repeatedly shown may vary depending on the number and positions of (non-punctured) 20 MHz sub-channels existing in each 80 MHz segment after puncturing has been applied.

That is, the aforementioned adaptive signaling field configuration method may be independently applied in each segment, and the signaling field configuration independently applied to each segment is independently determined according to a CCA result of a BW corresponding to each segment.

Figure 32:
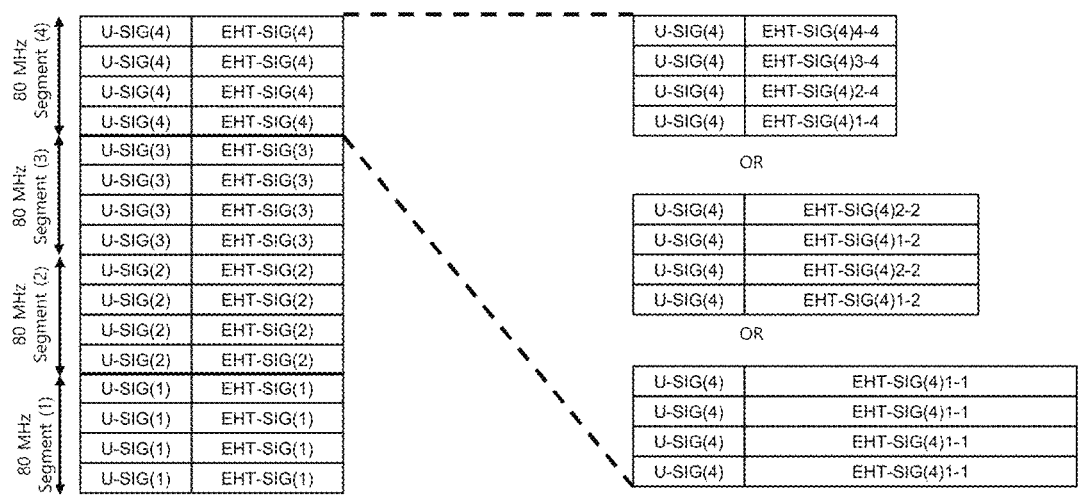
FIG. 32 and FIG. 33 illustrate an adaptive signaling field configuration applied to each 80 MHz segment when orthogonal frequency division multiple access (OFDMA) is applied, according to an embodiment of the present disclosure.
Figure 33:
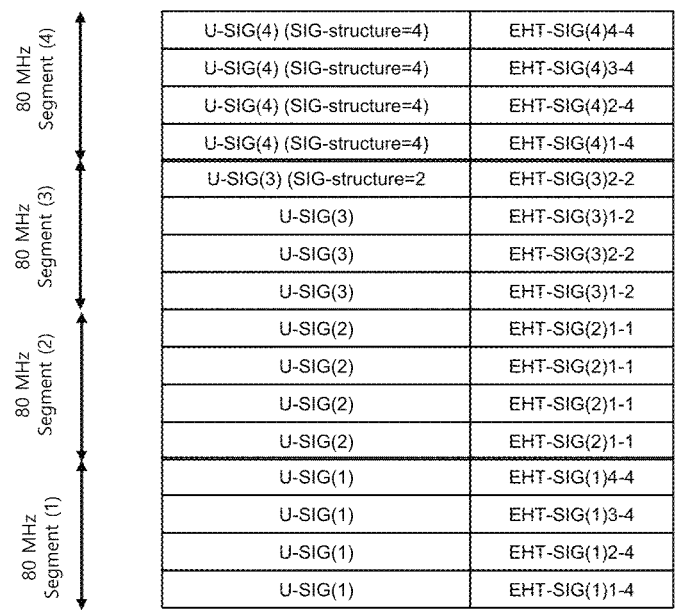

FIG. 32 and FIG. 33 illustrate an adaptive signaling field configuration applied to each 80 MHz segment when orthogonal frequency division multiple access (OFDMA) is applied, according to an embodiment of the present disclosure.

FIG. 32 illustrates an embodiment of an adaptive signaling field configuration applied to each 80 MHz segment of a 320 MHz OFDMA-MU PPDU.

Referring to FIG. 32, a 320 MHz BW is divided into so as to include four 80 MHz segments (1 to 4), and different U-SIGs (1 to 4) and EHT-SIGs (1 to 4) are signaled in respective 80 MHz segments. BW fields of the U-SIGs (1 to 4) may signal 320 MHz that is a total BW of the PPDU, and BW information of a current segment, that is, 80 MHz, may be signaled via a BW field or a partial BW field.

SIG-Structure fields of the respective U-SIG (1 to 4) may be signaled corresponding to respective EHT-SIG SIG structures of each 80 MHz segment in which respective U-SIG (1 to 4) are shown. That is, when contents to be signaled in an EHT-SIG(4) are divided into four EHT-SIG(4)x-4 content channels (x=1, 2, 3, 4) so as to be signaled, an SIG-structure field of a U-SIG(4) may signal that four types of EHT-SIGs are shown in an EHT-SIG field of a fourth 80 MHz segment.

Referring to FIG. 32, in the EHT-SIG field of the 80 MHz segment (4) which is the fourth segment in the four 80 MHz segments, EHT-SIG(4)x-4 content channels (x=1, 2, 3, 4), EHT-SIG(4)x-2 content channels (x=1, 2) or EHT-SIG(4) 1-1 content channels may be shown according to a CCA result of a BW corresponding to the 80 MHz segment (4). Similarly, for the EHT-SIGs (1 to 3) of respective 80 MHz segments (1 to 3), according to CCA results of BWs in which respective corresponding 80 MHz segments exist, 4, 2, or 1 EHT-SIG(s) (1 to 3) may be configured so as to be signaled.

Therefore, when all 320 MHz is idle, four types of EHT-SIG fields are shown in respective four 80 MHz segments constituting the 320 MHz PPDU, and as a result, the RU construct of the 320 MHz PPDU and allocation information may be divided into 16 EHT-SIG contents so as to be transmitted.

FIG. 33 illustrates an embodiment of an adaptive signaling field configuration individually applied to each 80 MHz segment of a 320 MHz OFDMA-MU PPDU.

Specifically, as for 80 MHz segment (1) and segment (4), both 80 MHz are idle as CCA results of 80 MHz BWs in which respective 80 MHz segments exist, and therefore EHT-SIG contents include each of four EHT-SIG(1, 4)x-4 (x=1, 2, 3, 4).

In a case of 80 MHz segment (3), one of four 20 MHz sub-channels included in an 80 MHz segment BW has been determined to be busy, and therefore 80 MHz segment (3) cannot be configured by four EHT-SIG(3)x-4, but is configured by EHT-SIG(3)x-2 (x=1, 2) so as to be transmitted. The U-SIG signals that the BW bands, in which EHT-SIG (3)x-2 are shown, are areas corresponding to low 40 MHz in the frequency domain of the 80 MHz segment (3), so as to indicate a position in which a reception device may receive contents (EHT-SIG(3)) of the 80 MHz segment.

As for 80 MHz segment (2), only a lowest 20 MHz is idle as a CCA result of 80 MHz corresponding to a BW of the corresponding segment, and therefore EHT-SIG(2)1-1 is transmitted including all EHT-SIG(2) contents.

Referring to FIG. 33, 80 MHz segment (3) has performed signaling of three 20 MHz sub-channels with two EHT-SIG (3)x-2 so as to have slightly longer EHT-SIG overhead compared to EHT-SIG(1, 4)x-4 and EHT-SIG(2)1-1. In this case, padding may be added to the EHT-SIG field of each segment so as to match an EHT-SIG length of a segment having largest overhead.

As a result, as illustrated in FIG. 33, the 320 MHz PPDU may be divided into four 80 MHz segments according to BW positions so as to transmit respective U-SIG (1 to 4) and EHT-SIG (1 to 4) fields, and a signaling field configuration of an EHT-SIG shown in each segment is adaptively divided into 4, 2, or 1 so as to be signaled, so that EHT-SIG signaling for RU allocation may be completed with shortest possible signaling overhead while using all idle 20 MHz sub-channels.

As another embodiment, an adaptive signaling field configuration embodiment for the adaptive signaling field configurations for a case in which 240 MHz is divided into three 80 MHz segments and a case in which 160 MHz includes two 80 MHz segments may be fully understood via the aforementioned embodiment of FIG. 33, in which the 320 MHz PPDU is divided into four 80 MHz segments and signaling fields of respective 80 MHz segments are adaptively determined, so as to be omitted.

Figure 34:
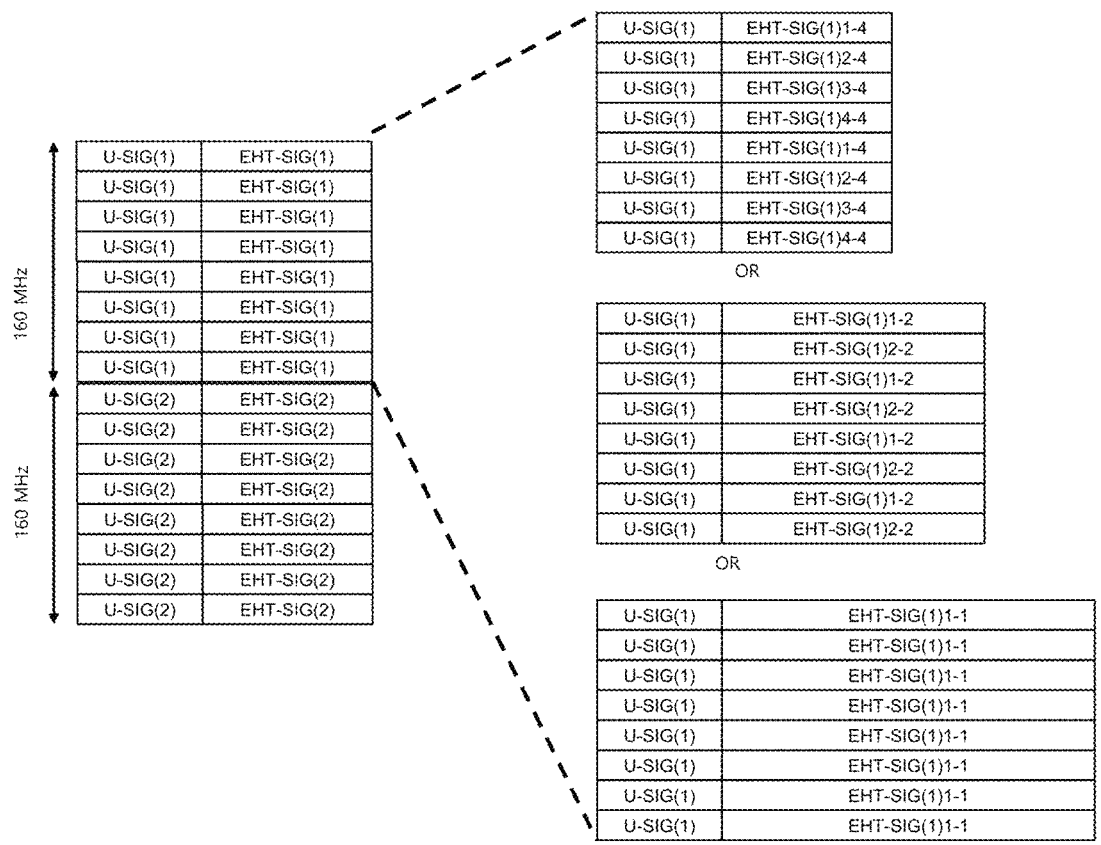
FIG. 34 illustrates an adaptive signaling field configuration applied to each 160 MHz segment when orthogonal frequency division multiple access (OFDMA) is applied, according to an embodiment of the present disclosure.

FIG. 34 illustrates an adaptive signaling field configuration applied to each 160 MHz segment when orthogonal frequency division multiple access (OFDMA) is applied, according to an embodiment of the present disclosure.

Referring to FIG. 34, when 320 MHz is divided into two 160 MHz segments, different U-SIGs (1, 2) and EHT-SIGs (1, 2) are signaled in each 160 MHz segment. EHT-SIG(1) and EHT-SIG(2) adaptively include 4, 2, or 1 EHT-SIG(s) according to CCA results of (virtual) primary 80 MHz BWs of respective 160 MHz segments.

EHT-SIG configurations (EHT-SIG(1, 2)x-4, EHT-SIG(1, 2)x-2, or EHT-SIG(1, 2)1-1) configured according to the CCA results of primary 80 MHz may be duplicated in secondary 80 MHz obtained by excluding (virtual) primary 80 MHz from the 160 segment, so as to be signaled. In this case, a method same as or similar to the method described with reference to FIG. 33 may be applied to the adaptive signaling field configuration, based on the primary 80 MHz CCA result of the 160 MHz segment.

<Segment-Specific Signaling Field (Preamble) Reception Method 1—Virtual Primary 20 MHz Configuration>

As for Wi-Fi 802.11ax, in order to allocate RUs for transmitting a PPDU(OFDMA-MU PPDU) by applying an OFDMA-MU exceeding 80 MHz, two HE-SIG-B (content channels) having different RU allocation subfields and user fields are transmitted. A non-AP STA that is a reception device configured to receive the OFDMA-MU PPDU receives HE-SIG-B1 and HE-SIG-B2 which are two type of content channels received via primary 80 MHz, so as to identify whether there is an RU allocated to the non-AP STA itself in the OFDMA-MU PPDU. When two types of content channels for HE-SIG-B cannot be transmitted via primary 80 MHz, an AP does not perform discontiguous PPDU transmission using puncturing, and performs transmission using only primary 20 MHz in which backoff has been performed.

Therefore, non-AP STAs connected to the AP which is a transmission device identify, while receiving the PPDU via only primary 20 MHz, that the PPDU is an OFDMA-MU and BWs are 80 MHz or higher in an HE-SIG-A field, and then decode two 20 MHz sub-channels in primary 40 MHz or secondary 40 MHz in order to receive both types of HE-SIG-B fields shown in the PPDU, which are being received only on the 20 MHz channel.

However, when the bandwidth in which the PPDU is transmitted is divided into multiple segments, if the primary channel in which the preamble is transmitted is not included in a segment to which the non-AP STA belongs, the non-AP STA cannot receive the preamble and therefore cannot recognize an RU allocated thereto, so that there occurs a problem that the PPDU itself cannot be received.

Therefore, in order to solve this problem, a method, in which a preamble is transmitted in each segment and thus a non-AP STA receives the preamble through a specific 20 MHz channel of a segment for reception of a PPDU, is described below.

Figure 35:
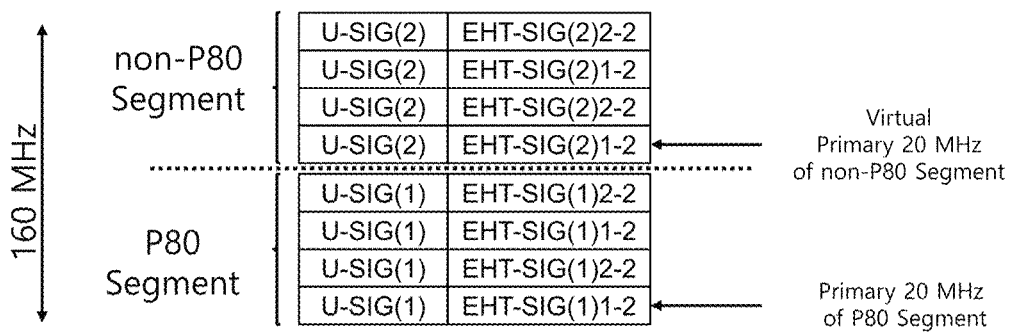
FIG. 35 illustrates a method of receiving a preamble in a segment including no primary channel according to an embodiment of the present disclosure.
Figure 35:
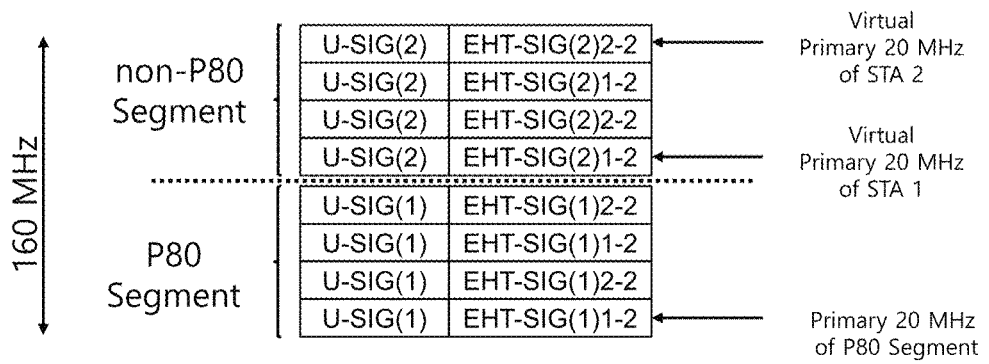

FIG. 35 illustrates a method of receiving a preamble in a segment including no primary channel according to an embodiment of the present disclosure.

(a) of FIG. 35 illustrates a preamble transmission method of configuring a specific channel (e.g., a virtual primary channel (virtual primary 20 MHz)) for transmitting a preamble in a segment including no primary 20 MHz channel that is a primary channel, so that each segment includes a U-SIG field and an EHT-SIG field.

Specifically, as illustrated in (a) of FIG. 35, virtual primary 20 MHz for reception of a preamble of a PPDU may be configured for each non-P80 segment including no primary 20 MHz channel, and reception devices that performs reception in the non-P80 segment may receive the preamble of the PPDU via the configured virtual primary 20 MHz.

The virtual Primary 20 MHz channel configured for the non-P80 segment may be changed via a method agreed between a transmission device and STAs bound to the corresponding segment. That is, the preamble may be received even in the non-P80 segment through a preconfigured 20 MHz channel between the reception device and the transmission device, and the preconfigured 20 MHz may be changeable via the configuration between the reception device and the transmission device.

For example, while using a virtual primary sub-channel of a specific non-P80 segment as first lowest 20 MHz, an AP may change the virtual primary sub-channel of the non-P80 segment to highest 20 MHz, and the AP may indicate the changed virtual primary sub-channel to a non-AP STA via a specific frame (e.g., a management frame or a control frame).

Alternatively, as for the virtual primary sub-channel, a preconfigured 20 MHz sub-channel agreed between the reception device and the transmission device may be used in a fixed manner.

In (b) of FIG. 17, each STA bound to a non-P80 segment may configure a virtual primary 20 MHz sub-channel to receive a preamble, or an AP may configure a virtual primary 20 MHz channel of each STA bound to a non-P80 segment. In this case, the virtual primary 20 MHz channel configured for each non-P80 segment may not exist. That is, a separate individual 20 MHz sub-channel for receiving the preamble may be configured for each reception device in the non-P80 segment.

When each non-AP STA bound to the non-P80 segment configures its own virtual primary 20 MHz, the AP may allocate RUs via primary 20 MHz of the STA bound to the non-P80 segment. In other words, when the non-AP STA configures its own virtual primary 20 MHz, a user field of the non-AP STA may be transmitted only via the virtual primary 20 MHz of the non-AP STA in order to allocate an RU to the non-AP STA.

In this case, the non-AP STA may receive only a U-SIG field and an EHT-SIG field which are transmitted at its own virtual primary 20 MHz among a total PPDU bandwidth, and through this, may recognize the RU allocated thereto.

As such, when the virtual primary channel is configured for the non-P80 segment, the non-AP STA may receive the U-SIG field through the configured virtual primary channel, and may decode at least one specific field (e.g., an SIG-structure field or a puncturing pattern (or mode) field) included in the received U-SIG, so as to recognize the types, number, and transmission positions of EHT-SIG content channels for the EHT-SIG field transmitted in the non-P80 segment. In this case, the configuration and interpretation method of the EHT-SIG field is the same as or similar to the aforementioned adaptive signaling field configuration.

<Segment-Specific Signaling Field Reception Method 2—Receiving all 20 MHz Sub-Channels>

As another embodiment of receiving a preamble (signaling field) for each segment, each non-AP STA may decode all four 20 MHz sub-channels existing in an 80 MHz segment to which the non-AP STA itself is bound.

In this case, in order to identify PPDU transmission, each non-AP STA may receive four 20 MHz channels existing in the 80 MHz segment to which the non-AP STA itself is bound, and may decode each of the U-SIG field and the EHT-SIG field via channels in which the PPDU is identified. The EHT-SIG field received through each of the four 20 MHz channels may be one type, two types, or four types of EHT-SIG content channel(s) as in the aforementioned adaptive signaling field embodiment.

When three types of EHT-SIG content channels for the EHT-SIG field are transmitted through three of 20 MHz sub-channels of the 80 MHz segment, it may be understood that, in the aforementioned adaptive signaling field embodiment, three types of EHT-SIG content channels constitute four types of EHT-SIG content channels, and one type of EHT-SIG content channel is punctured and is not shown.

<Interpretation Method of RU Allocation Subfield for Each Segment>

Unlike the RU allocation subfields of 802.11ax, in the RU allocation subfields shown in the EHT-SIG field of the aforementioned 80 MHz segment structure, positions of RUs implied by the same RU allocation subfield may vary depending on the 80 MHz segment in which the RU allocation subfields are shown. In an existing 802.11ax 160 MHz OFDMA-MU PPDU, two types of EHT-SIG content channels are shown. In one among respective two types of EHT-SIG content channels, an RU allocation subfield that signals an RU located in a first 20 MHz sub-channel (first in ascending order of frequencies) of the PPDU BW and RU allocation subfields that signal RUs located in a third, a fifth, and a seventh 20 MHz sub-channel are shown sequentially. In the other one among the respective two types of EHT-SIG content channels, an RU allocation subfield that signals an RU located in a second 20 MHz sub-channel (second in ascending order of frequencies) of the PPDU BW and RU allocation subfields that signal RUs located in a fourth, a sixth, and an eighth 20 MHz sub-channel are shown sequentially.

However, the EHT-SIG content channels of the EHT-SIG field shown in each 80 MHz segment structure of 11be are not shown based on the PPDU BW, but may be configured based on the bandwidth of the 80 MHz segment including the EHT-SIG content channels. Therefore, even if the EHT-SIG content channels of the EHT-SIG field transmitted in two segments of the 160 MHz OFDMA-MU PPDU have the same RU allocation subfield, RUs indicated by the RU allocation subfields are interpreted as RUs located at different frequencies according to the positions of the segments in which the EHT-SIG content channels of the EHT-SIG field are transmitted.

In other words, the RU allocation subfields of the EHT-SIG field may be interpreted based on a center frequency of a segment in which the EHT-SIG field received by the reception device is transmitted, rather than a center frequency of the bandwidth in which the PPDU is transmitted. For example, the total bandwidth in which the PPDU is transmitted may be divided into two segments (a primary segment with primary 20 MHz and a secondary segment without primary 20 MHz).

The RU resource allocation subfields included in the EHT-SIG content channels of the EHT-SIG field transmitted in the primary segment may be interpreted based on a center frequency of the primary segment, rather than a center frequency of the total bandwidth. In this case, RUs indicated by the RU allocation subfields of respective EHT-SIG content channels may be interpreted based on the center frequency of the primary segment. Similarly, the RU resource allocation subfields included in the EHT-SIG content channels of the EHT-SIG field transmitted in the secondary segment may be interpreted based on a center frequency of the secondary segment, rather than a center frequency of the total bandwidth.

In this case, the formats of the PPDU transmitted in respective multiple segments may be different. That is, when the total bandwidth for PPDU transmission is divided into multiple segments, formats of the PPDU transmitted in the respective segments may be different, and such PPDUs may be combined and transmitted in the form of an aggregated PPDU (A-PPDU). For example, when the total bandwidth for transmitting the PPDU is divided into three segments of 160 MHz, 80 MHz, and 80 MHz, a high-efficiency (HE) PPDU may be transmitted in a 160 MHz bandwidth, and EHT PPDUs may be transmitted at two 80 MHz, respectively. In this case, the HE PPDU and the EHT PPDUs may be combined and transmitted to a reception device in the form of an A-PPDU.

Figure 36:
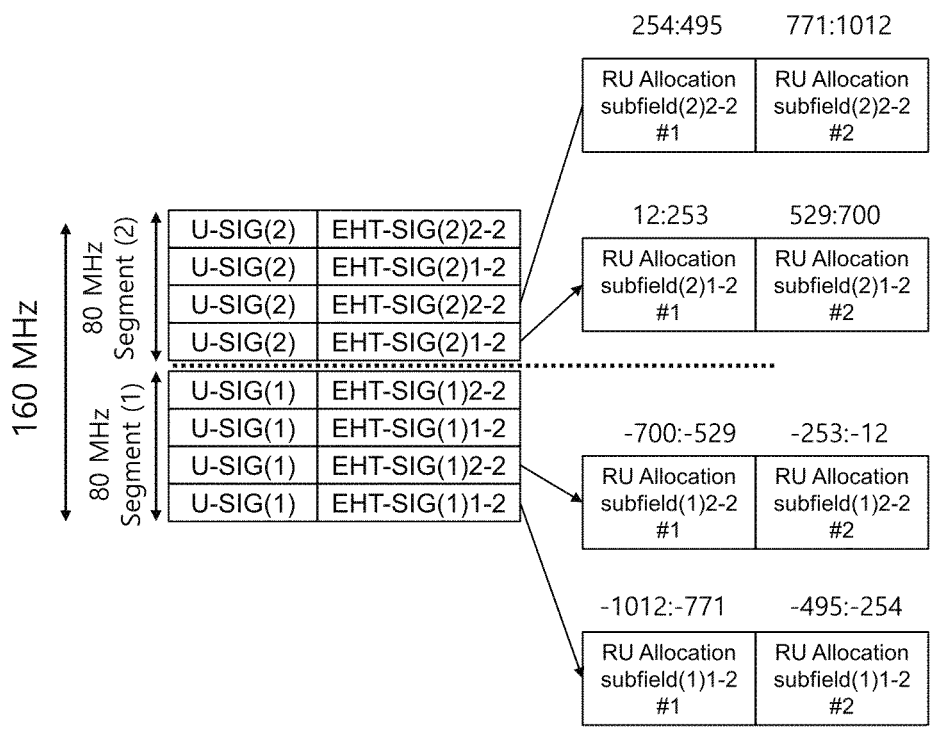
FIG. 36 illustrates a sub-carrier index corresponding to an RU allocation subfield according to an embodiment of the present disclosure.

FIG. 36 illustrates a sub-carrier index corresponding to an RU allocation subfield according to an embodiment of the present disclosure.

Referring to FIG. 36, when 160 MHz is divided into two 80 MHz segments, an RU may be allocated via a sub-carrier index corresponding to an RU allocation subfield transmitted in an 80 MHz segments.

Specifically, a first RU allocation subfield included a first EHT-SIG content channel of the EHT-SIG field shown in a first (based on low frequency) segment among two 80 MHz segments included in an OFDMA-MU PPDU of a 160 MHz BW allocates an RU-which is located in a PPDU subcarrier-based −1012:−771 subcarrier area or includes the subcarrier area. A second RU allocation subfield shown in the first EHT-SIG content channel allocates an RU which is located in a PPDU subcarrier-based −495:−254 subcarrier area or includes the subcarrier area. A first RU allocation subfield included in a first EHT-SIG content channel of the EHT-SIG field shown in a second segment among the two 80 MHz segments allocates an RU which is located in a PPDU subcarrier-based 12:253 subcarrier area or includes the subcarrier area, and a second RU allocation subfield shown subsequent to the RU allocation subfield allocates an RU which is located in a PPDU subcarrier-based 529:700 subcarrier area or includes the subcarrier area.

In the same way, it may be described that subcarrier areas allocated by RU allocation subfields are −700:−529, −253:−12, 254:495, and 771:1012, respectively, wherein the RU allocation subfields are shown in respective second EHT-SIG content channels of the two EHT-SIG fields shown respectively in two 80 MHz segments included in the 160 MHz OFDMA-MU PPDU.

In the same manner as above, respective EHT-SIG content channels of two EHT-SIG fields shown in each of three/four 80 MHz segments included in the 240 MHz/320 MHz OFDMA-MU PPDU may be interpreted.

When RUs exceeding 80 MHz are used in the OFDMA-MU PPDU, RUs exceeding 80 MHz may be allocated together via the EHT-SIG existing in two or more 80 MHz segments.

Figure 37:
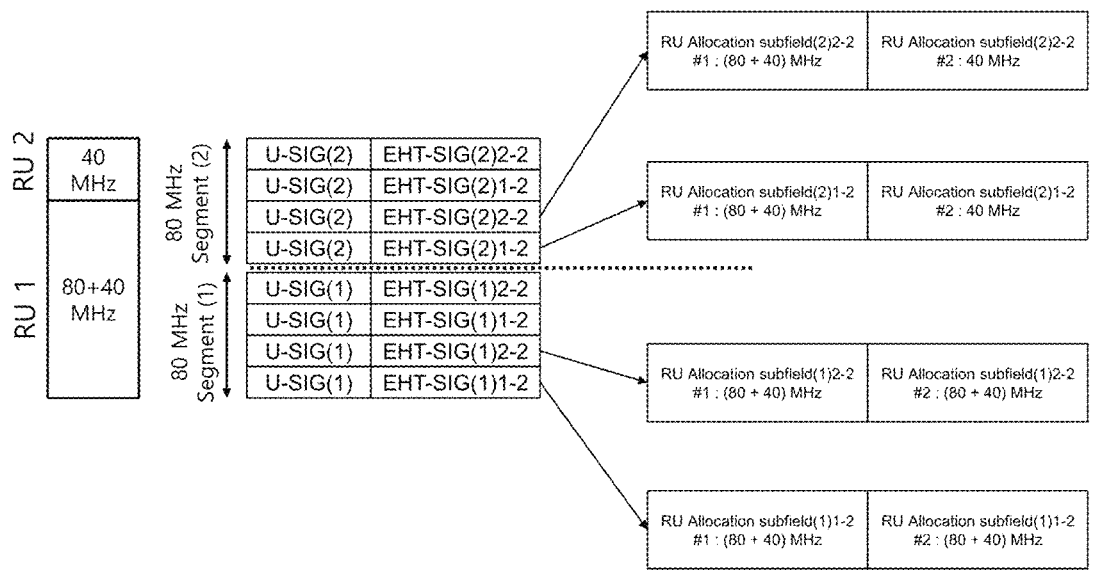
FIG. 37 illustrates a segment in which, when multiple RUs are combined and allocated, an RU allocation subfield for allocation of the combined RUs is transmitted, according to an embodiment of the present disclosure.

FIG. 37 illustrates a segment in which, when multiple RUs are combined and allocated, an RU allocation subfield for allocation of the combined RUs is transmitted, according to an embodiment of the present disclosure.

Referring to FIG. 37, when a total bandwidth for transmitting a PPDU is 160 MHz, the PPDU transmitted by applying OFDMA-MU may be transmitted via a CRU (or MRU) of 80+40 MHz allocated via an RU allocation subfield.

Specifically, when 160 MHz is divided into two 80 MHz segments as illustrated in FIG. 37, two types of EHT-SIG fields may be transmitted in each segment. In this case, RU 1 may be constructed by an MRU of an 80+40 MHz size, so that both BW areas of segment (1) and segment (2) may be used.

Since RU 1 uses all subcarriers existing in 80 MHz segment (1), both an EHT-SIG(1)1-2 content channel and an EHT-SIG(1)2-2 content channel may include the same RU allocation subfield twice in order to indicate RU 1 including subcarrier areas thereof.

A low 40 MHz area of 80 MHz segment (2) is an area included in RU 1, and therefore an RU allocation subfield indicating RU 1 may be included once in EHT-SIG(2)1-2 and EHT-SIG(2)2-2 of the 80 MHz segment (2).

RU 1 is shown over 80 MHz segments (1) and (2), and therefore STAs bound to the 80 MHz segments (1) and (2) may be allocated with RU 1 at the same time.

On the other hand, RU 2 includes only a subcarrier area of 80 MHz segment (2) so as to be allocated only to STAs bound to the 80 MHz segment (2).

Figure 38:
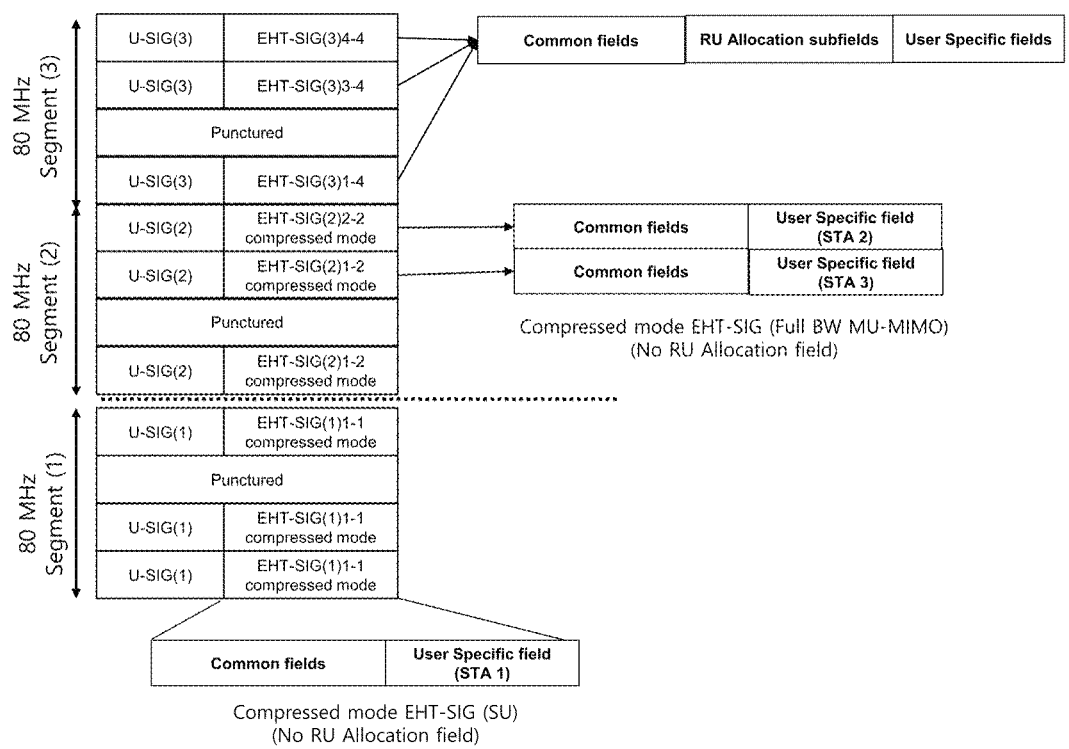
FIG. 38 illustrates a configuration of an SIG field of an MU PPDU, to which OFDMA is applied, according to an embodiment of the present disclosure.

FIG. 38 illustrates a configuration of an SIG field of an MU PPDU, to which OFDMA is applied, according to an embodiment of the present disclosure.

When there are two or more 80 MHz segments included in an OFDMA MU PPDU of 11be, each segment may have a format of an SU PPDU.

As illustrated in FIG. 38, two segments constituting a 160 MHz OFDMA MU PPDU may include only SU transmission or may be a segment including only full-band multi-user (full BW MU) transmission. The segment including SU and full BW MU transmission appears to perform non-OFDMA transmissions, but the entire PPDU including segments may be shown in an OFDMA-MU form.

In a case of SU in which an 80 MHz segment included in the OFDMA-MU PPDU services only one STA (see segment (1) in FIG. 20), the U-SIG field of the 80 MHz segment follows a field configuration of an SU PPDU format, and may signal that a mode is a compressed mode in which an EHT-SIG field has been compressed and is not included.

The segment that services only one STA may encode a preamble puncturing mode in order to indicate a discontiguous channel type of the segment bandwidth. In this case, the preamble puncturing mode may be signaled by being included in the bandwidth field, or may be signaled via a separate preamble puncturing mode field.

STA 1 receiving the PPDU from 80 MHz segment (1) may identify, via the U-SIG, information that the bandwidth is 80 MHz and a third 20 MHz sub-channel is a punctured SU PPDU. It may be seen that the information identified by STA 1 via the U-SIG field is information of the PUDD transmitted via the bandwidth of 80 MHz segment (1), other than information on the 160 MHz OFDMA-MU PPDU including 80 MHz segment (1).

STA 1 receives its own data included in the PPDU via the RU included in the OFDMA-MU PPDU, but the STA may recognize that reception of the data is the same as receiving data via an 80 MHz SU PPDU.

The EHT-SIG content channels of the EHT-SIG field of the SU PPDU are all the same, and therefore the same EHT-SIG(1)1-1 content channel is shown repeatedly in each 20 MHz channel that is not punctured, in the 80 MHz segment (1). The repeated transmission of the same EHT-SIG(1)1-1 content channel may be interpreted as another embodiment of the one-type EHT-SIG content channel configuration in the aforementioned adaptive signaling field embodiment.

STAs 2 and 3 receiving the PPDU from 80 MHz segment (2) may identify, via the U-SIG field, information that the bandwidth is 80 MHz and a second 20 MHz sub-channel is a punctured full BW MU PPDU. It may be seen that the information identified by STAs 2 and 3 via the U-SIG is information of the PUDD shown via the BW of 80 MHz segment (2), other than information on the 160 MHz OFDMA-MU PPDU including 80 MHz segment (2).

As illustrated in FIG. 38, each segment included in the OFDMA-MU PPDU may be shown as a segment performing SU, Full-BW MU, and OFDMA-MU, and the U-SIG field and the EHT-SIG field of each segment may be shown in formats, such as SU, Full-BW MU, and OFDMA-MU, according to an operation performed by the segment in which the U-SIG field and the EHT-SIG field are shown.

In this case, since the types (whether compressed or not) and lengths of the EHT-SIGs of respective segments may be different from each other, EHT-SIG field lengths of all segments in the PPDU may be configured to be the same by using padding or PE.

Instead of matching a length of an EHT-SIG field of a specific segment with a length of an EHT-SIG field of another segment, a larger number of EHT-LTF fields are included in the specific segment, so that only EHT-LTF field end times between respective segments may be matched. An additional EHT-LTF field shown in the specific segment may be interpreted as being inserted instead of a PAD, and every time one EHT-LTF field is added, 1 symbol length (4 us) is adjusted.

In one embodiment, when the EHT-SIG field of segment (1) is 6 us and the EHT-SIG field of segment (2) is 12 symbols, it may be configured that a 2 us-length PAD is added to the EHT-SIG field of segment (1), and then one EHT-LTF field is additionally indicated so that the EHT-LTF is terminated at the same time point as segment (2).

Figure 39:
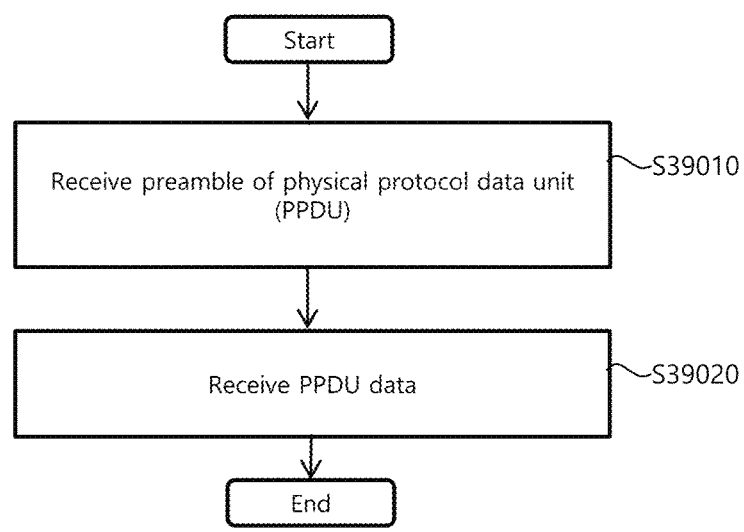
FIG. 39 is a flowchart illustrating a PPDU reception method according to an embodiment of the present disclosure.

FIG. 39 is a flowchart illustrating a PPDU reception method according to an embodiment of the present disclosure.

First, a non-AP STA, which is a reception device may receive a preamble of a physical protocol data unit (PPDU) from an AP, in operation S39010.

If a total bandwidth includes multiple segments, the preamble may be transmitted in a primary 20 MHz sub-channel as described in FIG. 35, or in a segment that does not include the primary 20 MHz sub-channel, the preamble may be transmitted in preconfigured specific 20 MHz of a segment in which the PPDU is transmitted. In this case, the preconfigured 20 MHz may be configured via negotiation between the non-AP STA and the AP, or the AP may indicate a preconfigured specific channel to the non-AP STA via a specific frame (e.g., a management frame or a control frame). Alternatively, the non-AP STA may discover the preconfigured specific channel by decoding the segment in units of 20 MHz, or a fixed specific 20 MHz sub-channel may be used.

In this case, an RU allocation subfield of an EHT-SIG field may be interpreted based on a center frequency of each segment, as described above.

Field configurations between content channels having the same index among multiple EHT-SIG content channels transmitted in the same segment among multiple segments may be the same, and field configurations between content channels having the same index among multiple EHT-SIG content channels transmitted in respective different segments among the multiple segments may be different from each other.

When the total bandwidth includes multiple segments, formats of the PPDU transmitted in respective segments may be different from each other. For example, each of an EHT PPDU and an HE PPDU may be transmitted via different segments, and may be transmitted via each segment in the form of an A-PPDU in which the EHT PPDU and the HE PPDU are combined with each other.

The preamble includes a universal signal (U-SIG) field and an extremely high throughput (EHT)-SIG field, wherein the EHT-SIG field may be configured by at least one content channel on a frequency axis. The number of the at least one content channel may be recognized based on a U-SIG field.

The non-AP STA may recognize, via a bandwidth field included in the U-SIG field, a total bandwidth in which the PPDU is transmitted and a frequency band punctured by applying of a puncturing mode in the total bandwidth. If the punctured bandwidth is not indicated via the bandwidth field, the punctured frequency band may be indicated via a separate puncturing mode field.

The Non-AP STA may recognize the number of EHT-SIG content channels including contents of the EHT-SIG field, via a field included in the U-SIG field. For example, the non-AP STA may recognize the format (e.g., whether OFDMA is applied, whether transmission is MU transmission, etc.) of the PPDU transmitted via a specific field (e.g., an EHT-structure, UL/DL or PPDU type/EHT-SIG compressed, etc.) included in the U-SIG field. The Non-AP STA may recognize the number of EHT-SIG content channels including contents of the EHT-SIG field according to the recognized PPDU format.

For example, in a case of a PPDU to which OFDMA is applied or a PPDU to which non-OFDMA is applied but which is MU transmission for transmission to multiple non-AP STAs, the number of EHT-SIG content channels may be two, and one EHT-SIG channel may be transmitted as for the non-OFDMA PPDU.

Then, the non-AP STA may recognize constructs of RUs via the RU allocation subfield of the RU allocation field included in the EHT-SIG content channel. The RUs may be configured by the aforementioned CRUs (or MRUs).

Thereafter, the non-AP STA may recognize an RU allocated thereto, based on its own STA ID included in a user field of a user specific field of the EHT-SIG content channel, and may receive data of the PPDU via the recognized RU in operation S39020.

In this case, when an MRU is allocated to the non-AP STA, as described in FIG. 16, in the RU allocation subfield, a construct of the MRU may be allocated to the non-AP STA via a bit stream.

Figure 40:
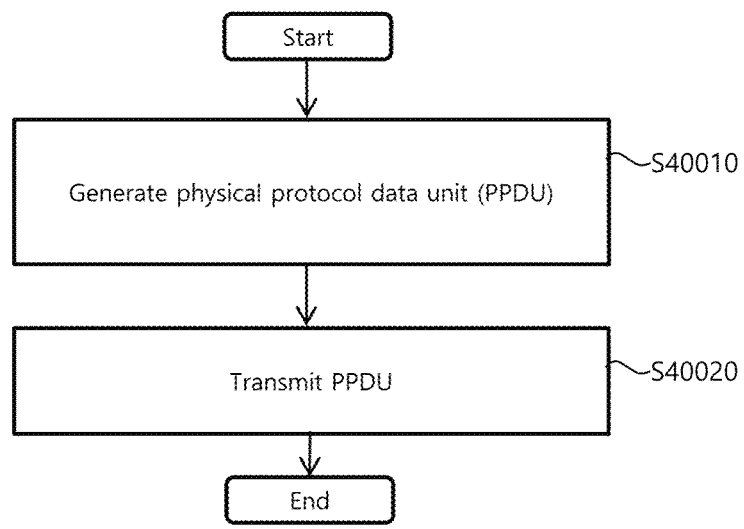
FIG. 40 is a flowchart illustrating a method of generating and transmitting a PPDU according to an embodiment of the present disclosure.

FIG. 40 is a flowchart illustrating a method of generating and transmitting a PPDU according to an embodiment of the present disclosure.

First, an AP may generate a PPDU preamble and may allocate an RU or an MRU to each non-AP STA, based on the generated preamble. Then, the AP may generate PPDU data and generate a PPDU in operation S40010.

Subsequently, the AP may transmit the generated PPDU preamble and data via the RU or MRU allocated to each non-AP STA, in operation S40020.

If a total bandwidth includes multiple segments, the preamble may be received in a primary 20 MHz sub-channel as described in FIG. 35, or in a segment that does not include the primary 20 MHz sub-channel, the preamble may be received in preconfigured specific 20 MHz of a segment in which the PPDU is transmitted. In this case, the preconfigured 20 MHz may be configured via negotiation between the non-AP STA and the AP, or the AP may indicate a preconfigured specific channel to the non-AP STA via a specific frame (e.g., a management frame or a control frame). Alternatively, the non-AP STA may discover the preconfigured specific channel by decoding the segment in units of 20 MHz, or a fixed specific 20 MHz sub-channel may be used.

In this case, an RU allocation subfield of an EHT-SIG field may be interpreted based on a center frequency of each segment, as described above.

Field configurations between content channels having the same index among multiple EHT-SIG content channels transmitted in the same segment among multiple segments may be the same, and field configurations between content channels having the same index among multiple EHT-SIG content channels transmitted in respective different segments among the multiple segments may be different from each other.

When the total bandwidth includes multiple segments, formats of the PPDU transmitted in respective segments may be different from each other. For example, each of an EHT PPDU and an HE PPDU may be transmitted via different segments, and may be transmitted via each segment in the form of an A-PPDU in which the EHT PPDU and the HE PPDU are combined with each other.

The preamble includes a universal signal (U-SIG) field and an extremely high throughput (EHT)-SIG field, wherein the EHT-SIG field may be configured by at least one content channel on a frequency axis. The number of the at least one content channel may be recognized based on a U-SIG field.

The non-AP STA may recognize, via a bandwidth field included in the U-SIG field, a total bandwidth in which the PPDU is transmitted and a frequency band punctured by applying of a puncturing mode in the total bandwidth. If the punctured bandwidth is not indicated via the bandwidth field, the punctured frequency hand may be indicated via a separate puncturing mode field.

The Non-AP STA may recognize the number of EHT-SIG content channels including contents of the EHT-SIG field, via a field included in the U-SIG field. For example, the non-AP STA may recognize the format (e.g., whether OFDMA is applied, whether transmission is MU transmission, etc.) of the PPDU transmitted via a specific field (e.g., an EHT-structure, UL/DL or PPDU type/EHT-SIG compressed, etc.) included in the U-SIG field. The Non-AP STA may recognize the number of EHT-SIG content channels including contents of the EHT-SIG field according to the recognized PPDU format.

For example, in a case of a PPDU to which OFDMA is applied or a PPDU to which non-OFDMA is applied but which is MU transmission for transmission to multiple non-AP STAs, the number of EHT-SIG content channels may be two, and one EHT-SIG content channel may be transmitted as for the non-OFDMA PPDU.

Then, the non-AP STA may recognize constructs of RUs via the RU allocation subfield of the RU allocation field included in the EHT-SIG content channel. The RUs may be configured by the aforementioned CRUs (or MRUs).

If an MRU is allocated to the non-AP STA, as described in FIG. 16, in the RU allocation subfield, a construct of the MRU may be allocated to the non-AP STA via a bit stream.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A terminal of a wireless communication system, the terminal comprising:
a communication module; and
a processor configured to control the communication module,
wherein the processor is configured to,
receive a preamble of a physical protocol data unit (PPDU) from an access point (AP),
wherein the preamble comprises a universal signal (U-SIG) field and an extremely high throughput (EHT)-SIG field,
wherein the U-SIG field includes an uplink (UL)/downlink (DL) field indicating whether the PPDU is an unlink PPDU or a downlink PPDU, and a type field indicating a type of the PPDU, and
wherein the UL/DL field and the type field are used to identify whether the EHT-SIG field includes a resource unit (RU) allocation subfield, and
receive a data of the PPDU, based on the U-SIG field and the EHT-SIG field.

2. The terminal of claim 1,
wherein the EHT-SIG field comprises at least one content channel on a frequency domain, and
wherein the number of the at least one content channel is recognized based on the U-SIG field.

3. The terminal of claim 2,
wherein, when the type field indicates an orthogonal frequency division multiple access (OFDMA) transmission, the number of the at least one content channel is two.

4. The terminal of claim 1,
wherein the EHT-SIG field includes the RU allocation subfield when i) the UL/DL field indicates a downlink and ii) the type field indicates that a downlink OFDMA is applied.

5. The terminal of claim 1,
wherein the EHT-SIG field does not include the RU allocation subfield when i) the UL/DL field indicates a downlink and ii) the type field indicates that a downlink OFDMA is not applied.

6. The terminal of claim 1,
wherein a modulation scheme of a second symbol of the U-SIG field is used to differentiate an extended range (ER) preamble from a multi user (MU) PPDU or a trigger based (TB) PPDU.

7. The terminal of claim 1,
wherein the preamble of the PPDU is an extended range (ER) preamble when the modulation scheme of the second symbol is a quadrature binary phase shift keying (QBPSK).

8. The terminal of claim 1,
wherein the type field is used to differentiate whether the PPDU is a multi user (MU) PPDU related to a single user or a trigger based (TB) PPDU.

9. A method for receiving data by a terminal in a wireless communication system, the method comprising:
receiving a preamble of a physical protocol data unit (PPDU) from an access point (AP),
wherein the preamble comprises a universal signal (U-SIG) field and an extremely high throughput (EHT)-SIG field,
wherein the U-SIG field includes an uplink (UL)/downlink (DL) field indicating whether the PPDU is an uplink PPDU or a downlink PPDU, and a type field indicating a type of the PPDU, and
wherein the UL/DL field and the type field are used to identify whether the EHT-SIG field includes a resource unit (RU) allocation subfield; and
receiving a data of the PPDU, based on the U-SIG field and the EHT-SIG field.

10. The method of claim 9,
wherein the EHT-SIG field comprises at least one content channel on a frequency domain, and
wherein the number of the at least one content channel is recognized based on the U-SIG field.

11. The method of claim 10,
wherein, when the type field indicates an orthogonal frequency division multiple access (OFDMA) transmission, the number of the at least one content channel is two.

12. The method of claim 9,
wherein the EHT-SIG field includes the RU allocation subfield when i) the UL/DL field indicates a downlink and ii) the type field indicates that a downlink OFDMA is applied.

13. The method of claim 9,
wherein the EHT-SIG field does not include the RU allocation subfield when i) the UL/DL field indicates a downlink and ii) the type field indicates that a downlink OFDMA is not applied.

14. The method of claim 9,
wherein a modulation scheme of a second symbol of the U-SIG field is used to differentiate an extended range (ER) preamble from a multi user (MU) PPDU or a trigger based (TB) PPDU.

15. The method of claim 9,
wherein the preamble of the PPDU is an extended range (ER) preamble when the modulation scheme of the second symbol is a quadrature binary phase shift keying (QBPSK).

16. The method of claim 9,
wherein the type field is used to differentiate whether the PPDU is a multi user (MU) PPDU related to a single user or a trigger based (TB) PPDU.

\* \* \* \* \*